US011072684B2

(12) United States Patent
Crawford et al.

(10) Patent No.: US 11,072,684 B2
(45) Date of Patent: *Jul. 27, 2021

(54) POLYESTER COMPOSITIONS WHICH COMPRISE TETRAMETHYLCYCLOBUTANDIOL AND ETHYLENE GLYCOL, WITH IMPROVED CATALYST SYSTEM

(71) Applicant: Eastman Chemical Company, Kingsport, TN (US)

(72) Inventors: Emmett Dudley Crawford, Kingsport, TN (US); James Thomas Goetz, Kingsport, TN (US); Michael Keith Coggins, Jonesborough, TN (US); Douglas Weldon Carico, Jr., Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/326,292

(22) PCT Filed: Aug. 17, 2017

(86) PCT No.: PCT/US2017/047367
§ 371 (c)(1),
(2) Date: Feb. 18, 2019

(87) PCT Pub. No.: WO2018/035337
PCT Pub. Date: Feb. 22, 2018

(65) Prior Publication Data
US 2020/0165379 A1    May 28, 2020

Related U.S. Application Data

(60) Provisional application No. 62/376,557, filed on Aug. 18, 2016, provisional application No. 62/520,211, filed on Jun. 15, 2017, provisional application No. 62/546,185, filed on Aug. 16, 2017.

(51) Int. Cl.
*C08G 63/183*  (2006.01)
*C08G 63/199*  (2006.01)
*C08G 63/85*   (2006.01)
*C08J 5/18*    (2006.01)

(52) U.S. Cl.
CPC ......... *C08G 63/183* (2013.01); *C08G 63/199* (2013.01); *C08G 63/85* (2013.01); *C08J 5/18* (2013.01)

(58) Field of Classification Search
USPC .................. 528/271, 272, 273, 274, 279
See application file for complete search history.

(56) References Cited

U.S. PATENT DOCUMENTS

| | | |
|---|---|---|
| 2,720,507 A | 10/1955 | Caldwell |
| 3,249,652 A | 5/1966 | Quisenberry |
| 3,313,777 A | 4/1967 | Elam et al. |
| 3,426,754 A | 2/1969 | Bierenbaum et al. |
| 3,772,405 A | 11/1973 | Hamb |
| 3,907,754 A | 9/1975 | Tershansy et al. |
| 3,944,699 A | 3/1976 | Mathews et al. |
| 4,138,459 A | 2/1979 | Brazinsky et al. |
| 4,263,425 A | 4/1981 | Rothe et al. |
| 4,582,752 A | 4/1986 | Duncan |
| 4,632,869 A | 12/1986 | Park et al. |
| 4,745,174 A | 5/1988 | Pruett et al. |
| 4,770,931 A | 9/1988 | Pollock et al. |
| 5,017,680 A | 5/1991 | Sublett |
| 5,106,944 A | 4/1992 | Sublett |
| 5,176,954 A | 1/1993 | Keller et al. |

(Continued)

FOREIGN PATENT DOCUMENTS

| | | |
|---|---|---|
| CA | 740050 A | 8/1966 |
| EP | 0 214 859 A2 | 3/1987 |

(Continued)

OTHER PUBLICATIONS

ASTM D256; "Standard Test Methods for Determining the Izod Pendulum Impact Resistance of Plastics"; Published Nov. 2018.
ASTM D790; "Standard Test Methods for Flexural Properties of Unreinforced and Reinforced Plastics and Electrical Insulating Materials"; Published Jul. 2017.
ASTM D882; "Standard Test Method for Tensile Properties of Thin Plastic Sheeting"; Published Aug. 2018.
ASTM D4440; "Standard Test Method for Plastics: Dynamic Mechanical Properties Melt Rheology"; Published Feb. 2015.

(Continued)

*Primary Examiner* — Terressa Boykin
(74) *Attorney, Agent, or Firm* — Robert C. Morriss

(57) ABSTRACT

Described as one aspect of the invention are polyester compositions comprising at least one polyester which comprises:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component comprising:
(i) about 30 to about 42 mole % 2,2,4,4-tetramethyl-1,3-cyclobutanediol residues; and
(ii) about 58 to about 70 mole % ethylene glycol residues;
wherein the total mole % of the dicarboxylic acid component is 100 mole %, and
wherein the total mole % of the glycol component is 100 mole %;
wherein the inherent viscosity of the polyester is from 0.50 to 0.70 dL/g as determined in 60/40 (wt/wt) phenol/tetrachloroethane at a concentration of 0.25 g/50 ml at 25° C.; and wherein the L* color values for the polyester is 90 or greater. The polyesters may be manufactured into articles.

20 Claims, 7 Drawing Sheets

(56) References Cited

U.S. PATENT DOCUMENTS

| | | | |
|---|---|---|---|
| 5,372,864 | A | 12/1994 | Weaver et al. |
| 5,384,377 | A | 1/1995 | Weaver et al. |
| 5,435,955 | A | 7/1995 | Kamei et al. |
| 5,654,347 | A | 8/1997 | Khemani et al. |
| 5,696,176 | A | 12/1997 | Khemani et al. |
| 5,705,575 | A | 1/1998 | Kelsey |
| 5,843,578 | A | 12/1998 | Sasaki et al. |
| 5,955,565 | A | 9/1999 | Morris et al. |
| 5,989,663 | A | 11/1999 | Morris et al. |
| 5,998,005 | A | 12/1999 | Kanno |
| 6,004,664 | A | 12/1999 | Sasaki et al. |
| 6,068,910 | A | 5/2000 | Flynn et al. |
| 6,096,854 | A | 8/2000 | Morris et al. |
| 6,187,898 | B1 | 2/2001 | Wagner et al. |
| 6,287,680 | B1 | 9/2001 | Sasaki et al. |
| 6,500,533 | B1 | 12/2002 | Kong et al. |
| 6,500,915 | B1 | 12/2002 | Fujimori et al. |
| 6,551,688 | B2 | 4/2003 | Moskala et al. |
| 6,559,272 | B1 | 5/2003 | Jeon et al. |
| 6,632,390 | B1 | 10/2003 | Shelby et al. |
| 6,649,731 | B2 | 11/2003 | Hori et al. |
| 6,667,383 | B2 | 12/2003 | Fujimori et al. |
| 6,720,085 | B2 | 4/2004 | Ito et al. |
| 6,777,099 | B2 | 8/2004 | Tano et al. |
| 6,998,463 | B2 | 2/2006 | Fujimori et al. |
| 7,030,181 | B2 | 4/2006 | Moskala et al. |
| 7,084,234 | B2 | 7/2006 | Wilhelm |
| 7,235,623 | B2 | 6/2007 | Strand et al. |
| 7,300,999 | B2 | 11/2007 | Deiss et al. |
| 7,332,564 | B2 | 2/2008 | Fujimori |
| RE40,571 | E | 11/2008 | Ohmatsuzawa et al. |
| 7,772,362 | B2 | 8/2010 | Beall et al. |
| 7,834,128 | B2 | 11/2010 | Fujimori |
| 9,169,388 | B2 | 10/2015 | Germroth et al. |
| 9,315,653 | B2 | 4/2016 | Takegami |
| 2001/0036545 | A1 | 11/2001 | Nishi et al. |
| 2003/0068453 | A1 | 4/2003 | Kong |
| 2003/0165671 | A1 | 9/2003 | Hashimoto et al. |
| 2003/0170427 | A1 | 9/2003 | Ito et al. |
| 2005/0096453 | A1 | 5/2005 | Flynn et al. |
| 2005/0113556 | A1 | 5/2005 | Strand et al. |
| 2006/0094858 | A1 | 5/2006 | Turner |
| 2006/0121219 | A1 | 6/2006 | Shelby et al. |
| 2007/0142511 | A1 | 6/2007 | Crawford |
| 2007/0142615 | A1 | 6/2007 | Crawford |
| 2014/0162042 | A1 | 6/2014 | Shih et al. |
| 2014/0221599 | A1 | 8/2014 | Hishimoto |
| 2019/0211145 | A1* | 7/2019 | Strand ............... C08K 5/01 |
| 2019/0211146 | A1* | 7/2019 | Williams ............ B29C 55/18 |
| 2019/0211147 | A1* | 7/2019 | Crawford ........... C08K 5/005 |

FOREIGN PATENT DOCUMENTS

| | | |
|---|---|---|
| EP | 0 581 970 B1 | 8/1998 |
| JP | S5523136 A | 2/1980 |
| JP | 61 037827 A | 2/1986 |
| JP | 63 193822 A | 8/1988 |
| JP | 11 158358 A | 6/1999 |
| JP | 2002 053740 A | 2/2002 |
| JP | 2002 121362 A | 4/2002 |
| JP | 2003 128894 | 5/2003 |
| JP | 3423062 B2 | 7/2003 |
| JP | 2004 181863 A | 7/2004 |
| JP | 3582887 B2 | 8/2004 |
| WO | WO 99 47605 A1 | 9/1999 |
| WO | WO 2002 28967 A1 | 4/2002 |
| WO | WO 2008 051320 A1 | 5/2008 |
| WO | WO 2008 051321 A1 | 5/2008 |

OTHER PUBLICATIONS

ASTM D6290; "Standard Test Method for Color Determination of Plastic Pellets"; Published Oct. 2018.

ASTM E308; "Standard Practice for Computing the Colors of Objects by Using the CIE System"; Published Sep. 2018.

Bullard, Ralph H., et al.; "Methylphenyl-Stannanes"; Journal of the American Chemical Society, 49(5), 1927, pp. 1369-1373.

Butschli, Jim; "Gauging demand for calendered plastics"; Packaging World, May 31, 1997; retrieved from https://www.packworld.com/article/machinery/fillingsealing/dry-filling/guaging-demand-calendered-plastics on Jun. 18, 2018; 4 pages.

Chambers, Robert F., et al.; "Phenyltin Compounds"; Journal of American Chemical Society, 48(4), 1926, pp. 1054-1062HA.

Clariant International Ltd, "An extensive range of wax additives for engineering resins" / Waxes Overview Publication No. DA 8240 E; May 2013.

Clariant International Ltd, "Licowax OP Flakes, Partly saponified, ester wax"; Product Data Sheet, edition date Sep. 11, 2015, edition No. 8.

Clariant International Ltd, "Licowax S Flakes, acid wax"; Product Data Sheet, edition date May 7, 2015, edition No. 7.

Dealy, John M. and Kim, Seungoh; "Chapter 7 Gross Melt Fracture in Extrusion"; Polymer Processing Instabilities, Control and Understanding; 2005 pp. 207-236 editors:Hatzikiriakos, Savvas G. and Migler, Kalman B.

Fox, T. G.; "J5. Influence of Diluent and of Copolymer Composition on the Glass Temperature of a Polymer System"; Bull. Am. Phys. Soc., 1, 123 (1956).

Kelsey, Donald R., et al.; "High Impact, Amorphous Terephthalate Copolyesters of Rigid 2,2,4,4-Tetramethyl-1,3-cyclobutanediol with Flexible Diols"; Macromolecules, 33; 2000; pp. 5810-5818.

Kocheshkov, K.A.; "Untersuchungen über metallorganische Verbindungen, I. Mitteilung: Eine neue Klasse von Arylzinnverbindungen: Phenyl-trihalogen-stannane"; Berichte der deutschen chemischen Gesellschaft (A and B Series); Issue 4, vol. 62; pp. 996-999 (1929)—Original Language.

Krause, Charles A. and Greer, Willard N.; "The Dimethyltin Group and Some of its Reactions"; Journal of the American Chemical Society, 47(10), 1925, pp. 2568-2575.

Krause, Erich and Grosse, A.V.; "Die Chemie Der Metall—Organischen Verbindungen"; Recent Books; 1937, p. 148; 1937, Gobroder-Borntrager.

Meerwein, Hans and Bersin, Theodor; "Investigation of Metal Alcoholates and Orth acid Esters. I. Alkoxo Acids and Their Salts"; Annalen der Chemie, vol. 476; pp. 113-150; Sep. 20, 1929.

Tadmor, Zehev and Gogos, Costas G.; "Chaper 15.1 The Calendering Process"; Principles of Polymers Processing, Second Edition; pp. 865-866; 2006.

Titow, W. V.; "Calendering of PVC, Chaper 18"; PVC Technology, 4th Edition, pp. 803-848 (1984), Elsevier Publishing Co.

Co-pending U.S. Appl. No. 16/326,297, filed Feb. 18, 2019; Emmett Dudley Crawford.

Co-pending U.S. Appl. No. 16/326,283, filed Feb. 18, 2019; Marc Alan Strand.

Co-pending U.S. Appl. No. 16/326,287, filed Feb. 18, 2019; James Carl Williams.

Notification of Transmittal of the International Search Report and the Written Opinion of the International Searching Authority, or the Declaration dated Nov. 7, 2017 received in International Application No. PCT/US2017/047364.

Notification of Transmittal of the International Search Report and the Written Opinion of the International Searching Authority, or the Declaration dated Nov. 7, 2017 received in International Application No. PCT/US2017/047367.

Invitation to Pay Additional Fees and, Where Applicable, Protest Fee date of mailing Nov. 2, 2017 received in International Application No. PCT/US2017/047374.

Notification of Transmittal of the International Search Report and the Written Opinion of the International Searching Authority, or the Declaration dated Feb. 6, 2018 received in International Application No. PCT/US2017/047374.

Notification of Transmittal of the International Search Report and the Written Opinion of the International Searching Authority, or the Declaration dated Nov. 3, 2017 received in International Application No. PCT/US2017/047382.

(56) References Cited

OTHER PUBLICATIONS

UPSTO Office Action dated Oct. 26, 2020 received in co-pending U.S. Appl. No. 16/326,297.
USPTO Office Action dated Nov. 5, 2020 received in co-pending U.S. Appl. No. 16/326,283.

* cited by examiner

POLYESTER COMPOSITIONS WHICH COMPRISE TETRAMETHYLCYCLOBUTANDIOL AND ETHYLENE GLYCOL, WITH IMPROVED CATALYST SYSTEM

This application is the national stage filing under 35 U.S.C. § 371 of PCT/US2017/047367, filed Aug. 17, 2017, which claims priority to U.S. Provisional Application No. 62/376,557, filed Aug. 18, 2016, and to U.S. Provisional Application No. 62/520,211, filed Jun. 15, 2017, and to U.S. Provisional Application No. 62/546,185, filed Aug. 16, 2017, the contents of which are incorporated herein by reference in their entirety.

FIELD OF THE INVENTION

The present invention relates to polyester compositions made from terephthalic acid, 2,2,4,4-tetramethyl-1,3-cyclobutanediol (TMCD) and ethylene glycol (EG), and having good TMCD incorporation, good color, and a desired inherent viscosity (IV) over a broad compositional range. The polyester compositions can be catalyzed by a unique catalyst system that contains titanium or a mixture of titanium and manganese, and is stabilized by phosphorus compounds, resulting in good TMCD incorporation, improved color, and reactivity to achieve desired IV over the compositional range.

BACKGROUND OF THE INVENTION

Tin based catalysts are typically the most efficient at incorporating TMCD into a polyester (Caldwell et al. CA 740050, and Kelsey et al., Macromolecules 2000, 33, 581). However, tin based catalysts typically produce a yellow to amber colored copolyester in the presence of EG (Kelsey, U.S. Pat. No. 5,705,575, see example 2; Morris et al., U.S. Pat. No. 5,955,565 see examples call polymer "amber").

Titanium based catalysts are reported to be ineffective at incorporating 2,2,4,4-tetramethyl-1,3-cyclobutanediol (TMCD) into a polyester (Caldwell et al. CA 740050, Kelsey et al., Macromolecules 2000, 33, 5810).

While titanium and phosphorus alone can be useful at preparing certain copolyesters with relatively low TMCD levels that have desired attributes, such a catalyst system cannot be used to prepare materials containing higher levels of TMCD at the same preparation conditions. Further, while Sn based catalysts with phosphorus can achieve good TMCD incorporation at higher TMCD levels, the materials are typically more colored and are more sluggish to build IV at the same preparation conditions.

US Patent Application No. 2007/0142511 discloses that polyesters with a glycol component comprising TMCD and EG, and optionally CHDM, can be prepared with titanium based catalysts. It indicates that TMCD incorporation can be further improved by use of tin based catalysts in addition to titanium based catalysts. It further indicates that the color of these copolyesters can be improved with the addition of certain levels of phosphorus containing compounds. This publication discloses a wide compositional range with a glycol component comprising: (i) about 1 to about 90 mole % TMCD residues; and (ii) about 99 to about 10 mole % EG residues. However, whenever relatively high levels of EG were present, e.g., polymers with only TMCD and EG, the catalyst system included a significant amount of Sn relative to Ti.

There is a commercial need for a polymeric material with a combination of properties making it ideal for thermoplastic applications including a combination of two or more of certain notched Izod impact strength, certain inherent viscosities, certain glass transition temperature ($T_g$), certain flexural modulus, good clarity, and good color.

In addition, there is a commercial need for a polymeric material with a combination of properties making it desirable for thermoplastic applications including a combination of three or more of certain notched Izod impact strength, certain glass transition temperature ($T_g$), certain flexural modulus, good clarity, and good color.

SUMMARY OF THE INVENTION

It has been found that significant amounts of TMCD can be incorporated into a polymer when DMT, EG and TMCD are catalyzed with a titanium catalyst in combination with a manganese catalyst. It has also been found that significant amounts of TMCD can be incorporated into a polymer when DMT, EG and TMCD are catalyzed with a titanium catalyst in combination with a small amount of tin catalyst, e.g., less than 25 or less than 20 ppm, as measured in the final polymer. It has further been found that manganese in conjunction with titanium catalyst can be used to prepare polyesters based on DMT, TMCD, and EG containing more than 25 mol %, or more than 30 mol %, or more than 35 mol % TMCD, which have very good color and mechanical properties.

In embodiments of the invention, copolyesters containing TMCD and EG can be prepared using catalysts chosen from: Sn, Ti, Mn, Co, Sb, Ge or combinations thereof, in amounts that provide good TMCD incorporation, as well as good color. In certain embodiments, copolyesters containing TMCD and EG can be prepared through a combination of titanium based catalysts, manganese based catalysts, and phosphorus based compounds resulting in a copolyester with acceptable color, good TMCD incorporation, and reactivity to achieve the desired IV over an entire desired compositional range. In embodiments, the combination of titanium, manganese, and phosphorus at certain levels results in a copolyester with improved color, durability and mechanical properties, good TMCD incorporation, and reactivity to achieve the desired IV over the entire compositional range that includes: (a) a dicarboxylic acid component comprising: (i) 90 to 100 mole % terephthalic add residues; and (ii) about 0 to about 10 mole % of aromatic and/or aliphatic dicarboxylic add residues having up to 20 carbon atoms; and (b) a glycol component comprising: (i) about 30 to about 42 mole % 2,2,4,4-tetramethyl-1,3-cyclobutanediol (TMCD) residues; and (ii) about 70 to about 58 mole % ethylene glycol (EG) residues.

In an embodiment, approximately equivalent total molar quantities of catalyst and phosphorus, wherein the catalyst is a combination of manganese and titanium catalyst, is superior to tin and phosphorus alone, titanium and phosphorus alone, or a combination of titanium, tin and phosphorus, with regards to TMCD incorporation, good color, and reactivity to achieve desired inherent viscosity (IV) over a compositional range of TMCD from about 30 to about 42 mole %, or about 32 to about 42 mole %, or about 32 to about 38 mole %, or about 34 to about 39 mole %, or greater than 34 to about 39 mole %, or 34.2 to about 39 mole %, or about 35 to about 39 mole %, based on the glycol component.

In embodiments, the invention is directed to a thermoplastic polyester composition comprised of: a) a dicarboxylic acid component comprising: (i) 90 to 100 mole % terephthalic acid residues; and (ii) about 0 to about 10 mole % of aromatic and/or aliphatic dicarboxylic acid residues having up to 20 carbon atoms; and (b) a glycol component comprising: (i) about 30 to about 42 mole % 2,2,4,4-tetramethyl-1,3-cyclobutanediol (TMCD) residues; and (ii) about 70 to about 58 mole % ethylene glycol residues; and wherein the total mole % of the dicarboxylic acid component is 100 mole %, and wherein the total mole % of the glycol component is 100 mole %; and wherein the inherent viscosity (IV) of the polyester is from 0.50 to 0.70 dL/g as determined in 60/40 (wt/wt) phenol/tetrachloroethane at a concentration of 0.25 g/50 ml at 25° C.; and wherein the L* color values for the polyester is 90 or greater, as determined by the L*a*b* color system measured following ASTM D 6290-98 and ASTM E308-99, performed on polymer granules ground to pass a 1 mm sieve. In embodiments, the L* color values for the polyester is greater than 90, as determined by the L*a*b* color system measured following ASTM D 6290-98 and ASTM E308-99, performed on polymer granules ground to pass a 1 mm sieve.

In certain embodiments, the glycol component comprises: (i) about 32 to about 42 mole % 2,2,4,4-tetramethyl-1,3-cyclobutanediol (TMCD) residues, and (ii) about 68 to about 58 mole % ethylene glycol residues; or (i) about 34 to about 40 mole % 2,2,4,4-tetramethyl-1,3-cyclobutanediol (TMCD) residues, and (ii) about 66 to about 60 mole % ethylene glycol residues; or (i) greater than 34 to about 40 mole % 2,2,4,4-tetramethyl-1,3-cyclobutanediol (TMCD) residues, and (ii) less than 66 to about 60 mole % ethylene glycol residues; or (i) 34.2 to about 40 mole % 2,2,4,4-tetramethyl-1,3-cyclobutanediol (TMCD) residues, and (ii) 65.8 to about 60 mole % ethylene glycol residues; or (i) about 35 to about 39 mole % 2,2,4,4-tetramethyl-1,3-cyclobutanediol (TMCD) residues, and (ii) about 65 to about 61 mole % ethylene glycol residues; or (i) about 36 to about 37 mole % 2,2,4,4-tetramethyl-1,3-cyclobutanediol (TMCD) residues; and (ii) about 64 to about 63 mole % ethylene glycol residues.

In certain embodiments, the polyester composition further comprises: (c) a catalyst/stabilizer component comprising: (i) titanium atoms in the range of 10-60 ppm based on polymer weight, (ii) manganese atoms in the range of 10-100 ppm based on polymer weight, and (iii) phosphorus atoms in the range of 10-200 ppm based on polymer weight. In certain embodiments, the catalyst/stabilizer can comprise tin atoms in the range of 5 to less than 25 ppm, or 5 to 20 ppm, based on polymer weight. In certain embodiments, the catalyst/stabilizer component comprises no tin, or, if present, less than 5 ppm tin, or less than 2 ppm tin, or less than 1 ppm tin. In certain embodiments, the catalyst/stabilizer does not comprise any intentionally added tin atoms, but may include tin in low levels as an impurity. The catalyst/stabilizer component can result in a good combination of TMCD incorporation, reactivity to achieve a desired target IV, increased brightness, and reduced yellowness, that cannot be achieved by titanium/phosphorus alone, or tin/phosphorus alone.

In certain embodiments, the invention relates to a catalyst/stabilizer/copolyester composition resulting in copolyesters containing ethylene glycol (EG), 2,2,4,4-tetramethyl-1,3-cyclobutanediol (TMCD), and optionally, a small amount of 1,4-cyclohexanedimethanol (CHDM), e.g., less than 5 mole %, or less than 3 mole %, or less than 2 mole %, or less than 1 mole % CHDM, with good TMCD incorporation, reduced yellowness, and inherent viscosities in the range from 0.5 dL/g to 0.7 dL/g. In an embodiment, the catalyst/stabilizer system is useful for all compositions with a glycol component comprising: (i) about 30 to about 42 mole % TMCD residues; and (ii) about 70 to about 58 mole % EG residues.

It is believed that certain polyester compositions formed from terephthalic acid, an ester thereof, and/or mixtures thereof, ethylene glycol, and 2,2,4,4-tetramethyl-1,3-cyclobutanediol, comprising certain catalysts and thermal stabilizers, reaction products thereof, and mixtures thereof, are superior to certain commercial polymers with respect to one or more of certain Notched Izod impact strength, certain inherent viscosities, certain glass transition temperature ($T_g$), certain flexural modulus, good clarity, good color, good thermal stability, good ultrasonic weld strength, and good dish washer durability and mechanical properties for a selected IV.

In other embodiments of the invention, there is a commercial need for a polymeric material with a combination of properties making it desirable for certain applications, for example, injection molding, blow molding, extrusion, and thermoformed film and sheet applications, including a combination of two or more of the following properties: certain notched Izod impact strength (>1 ft/lb-in), certain glass transition temperature ($T_g$>100° C.), certain flexural modulus (>300,000 psi), good clarity, and good color.

In one aspect, the processes of making the polyesters useful in the invention can comprise a batch or continuous process.

In one aspect, the processes of making the polyesters useful in the invention comprise a continuous process.

In one aspect, the invention relates to a polyester composition comprising at least one polyester which comprises:
  (a) a dicarboxylic acid component comprising:
    (i) about 90 to about 100 mole % of terephthalic acid residues;
    (ii) about 0 to about 10 mole % of aromatic and/or aliphatic dicarboxylic acid residues having up to 20 carbon atoms; and
  (b) a glycol component comprising:
    (i) about 30 to about 42 mole % 2,2,4,4-tetramethyl-1,3-cyclobutanediol residues; and
    (ii) about 70 to about 58 mole % ethylene glycol residues, and
    (iv) less than about 5 mole %, or less than 2 mole %, of any other modifying glycols;
wherein the total mole % of the dicarboxylic acid component is 100 mole %, and
wherein the total mole % of the glycol component is 100 mole %; and
wherein the inherent viscosity of the polyester is from 0.50 to 0.70 dlg as determined in 60/40 (wt/wt) phenol/tetrachloroethane at a concentration of 0.25 g/50 ml at 25° C.

In one aspect, this invention relates to a polyester composition comprising at least one polyester which comprises:
  (a) a dicarboxylic acid component comprising:
    (i) about 90 to about 100 mole % of terephthalic acid residues;
    (ii) about 0 to about 10 mole % of aromatic and/or aliphatic dicarboxylic acid residues having up to 20 carbon atoms; and
  (b) a glycol component comprising:
    (i) about 30 to about 42 mole % 2,2,4,4-tetramethyl-1,3-cyclobutanediol residues; and
    (ii) about 58 to about 70 mole % ethylene glycol residues;
wherein the total mole % of the dicarboxylic acid component is 100 mole %; and
wherein the total mole % of the glycol component is 100 mole %;

wherein the inherent viscosity of the polyester is from 0.50 to 0.70 dL/g as determined in 60/40 (wt/wt) phenol/tetrachloroethane at a concentration of 0.25 g/50 ml at 25° C.; and optionally, wherein at least one branching agent is added before and/or during polymerization of the polyester.

In one aspect, the invention relates to a polyester composition comprising at least one polyester which comprises:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component comprising:
(i) about 32 to about 42 mole % 2,2,4,4-tetramethyl-1,3-cyclobutanediol residues; and
(ii) about 58 to about 68 mole % ethylene glycol residues;
wherein the total mole % of the dicarboxylic acid component is 100 mole %, and
wherein the total mole % of the glycol component is 100 mole %;
wherein the inherent viscosity of the polyester is from 0.50 to 0.70 dL/g as determined in 60/40 (wt/wt) phenol/tetrachloroethane at a concentration of 0.25 g/50 ml at 25° C.; and wherein the polyester has at least one of the following properties chosen from: a $T_g$ of from about 100 to about 110° C. as measured by a TA 2100 Thermal Analyst Instrument at a scan rate of 20° C./min, a flexural modulus at 23° C. of equal to or greater than 2000 MPa (about 290,000 psi), or greater than 2200 MPa (319,000 psi) as defined by ASTM D790, a notched Izod impact strength of about 30 J/m (0.56 ft-lb/in) to about 80 J/m (1.50 ft-lb/in) according to ASTM D256 with a 10-mil notch using a ⅛-inch thick bar at 23° C., and less than 5% loss in inherent viscosity after being held at a temperature of 293° C. (560° F.) for 2 minutes. In one embodiment, the L* color values for the polyester composition is 90 or greater, or greater than 90, as determined by the L*a*b* color system measured following ASTM D 6290-98 and ASTM E308-99, performed on polymer granules ground to pass a 1 mm sieve.

In one aspect, this invention relates to a polyester composition comprising:
(I) at least one polyester which comprises which comprises:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component comprising:
(i) about 30 to about 42 mole % 2,2,4,4-tetramethyl-1,3-cyclobutanediol residues; and
(ii) about 58 to about 70 mole % ethylene glycol residues; and
wherein the total mole % of the dicarboxylic acid component is 100 mole %, and
wherein the total mole % of the glycol component is 100 mole %; and
wherein the inherent viscosity of the polyester is from 0.50 to 0.70 dL/g as determined in 60/40 (wt/wt) phenol/tetrachloroethane at a concentration of 0.25 g/50 ml at 25° C.; wherein the L* color values for the polyester is 90 or greater, or greater than 90, as determined by the L*a*b* color system measured following ASTM D 6290-98 and ASTM E308-99, performed on polymer granules ground to pass a 1 mm sieve; and
wherein the polyester has at least one of the following properties chosen from: a $T_g$ of from about 100 to about 110° C. as measured by a TA 2100 Thermal Analyst Instrument at a scan rate of 20° C./min, a flexural modulus at 23° C. of equal to or greater than 2000 MPa (about 290,000 psi), or greater than 2200 MPa (319,000 psi) as defined by ASTM D790, a notched Izod impact strength of about 30 J/m (0.56 ft-lb/in) to about 80 J/m (1.50 ft-lb/in) according to ASTM D256 with a 10-mil notch using a ⅛-inch thick bar at 23° C., and less than 5% loss in inherent viscosity after being held at a temperature of 293° C. (560° F.) for 2 minutes. In one embodiment, the polyester composition further comprises: (II) a catalyst/stabilizer component comprising: (i) titanium atoms in the range of 10-60 ppm based on polymer weight, (ii) manganese atoms in the range of 10-100 ppm based on polymer weight, and (iii) phosphorus atoms in the range of 10-200 ppm based on polymer weight. In one embodiment, the 2,2,4,4-tetramethyl-1,3-cyclobutanediol residues is a mixture comprising more than 50 mole % of cis-2,2,4,4-tetramethyl-1,3-cyclobutanediol residues and less than 50 mole % of trans-2,2,4,4-tetramethyl-1,3-cyclobutanediol residues.

In one aspect, the invention relates to a process for making a polyester comprising the following steps:
(I) heating a mixture at at least one temperature chosen from 150° C. to 250° C., under at least one pressure chosen from the range of 0 psig to 75 psig wherein said mixture comprises:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component comprising:
(i) about 30 to about 42 mole % 2,2,4,4-tetramethyl-1,3-cyclobutanediol residues; and
(ii) about 58 to about 70 mole % ethylene glycol residues;
wherein the molar ratio of glycol component/dicarboxylic acid component added in Step (I) is 1.01-3.0/1.0 and wherein TMCD is added in an amount from about 30 to 84 mole %, to allow for about 50 to 100% conversion of TMCD in the reaction and to arrive at a final polymer having about 30 to 42 mole % 2,2,4,4-tetramethyl-1,3-cyclobutanediol residues;
wherein the mixture in Step (I) is heated in the presence of:
(i) at least one catalyst chosen from Sn, Ti, Mn, Co, Sb, Ge or combinations thereof; and (ii) at least one phosphorus compound;
(II) heating the product of Step (I) at a temperature of 230° C. to 320° C. for 1 to 6 hours, under at least one pressure chosen from the range of the final pressure of Step (I) to 0.02 torr absolute, to form a final polyester;
wherein the total mole % of the dicarboxylic acid component of the final polyester is 100 mole %; and
wherein the total mole % of the glycol component of the final polyester is 100 mole %;
wherein the inherent viscosity of the polyester is from 0.50 to 0.70 dig as determined in 60/40 (wt/wt) phenol/tetrachloroethane at a concentration of 0.25 g/50 ml at 25° C.; and wherein the L* color values for the polyester is 90 or greater, or greater than 90, as determined by the L*a*b* color system measured following ASTM 0 629098 and ASTM E308-99, performed on polymer granules ground to pass al rum sieve. In certain embodiments, the catalyst comprises at least one catalyst comprising at least one manganese compound and at least one titanium compound. In certain embodiments, the at least one catalyst can further comprise, at least one additional compound selected from tin, gallium, zinc, antimony, cobalt, magnesium, germanium, lithium, aluminum compounds and an aluminum compound with lithium hydroxide or sodium hydroxide. In embodiments, the additional compound(s) are present in minor amounts in weight percent relative to the titanium and manganese compounds. In certain embodiments, the additional compounds are present in an amount to provide less than 20 ppm, or less than 10 ppm, or less than 5 ppm, of the additional selected metal in the final polymer.

In one aspect, the invention relates to a process for making a polyester comprising the following steps:
(I) heating a mixture at at least one temperature chosen from 150° C. to 250° C., under at least one pressure chosen from the range of 0 psig to 75 psig wherein said mixture comprises:
  (a) a dicarboxylic acid component comprising:
    (i) about 90 to about 100 mole % of terephthalic acid residues;
    (ii) about 0 to about 10 mole % of aromatic and/or aliphatic dicarboxylic acid residues having up to 20 carbon atoms; and
  (b) a glycol component comprising:
    (i) about 30 to about 42 mole % 2,2,4,4-tetramethyl-1,3-cyclobutanediol residues; and
    (ii) about 58 to about 70 mole % ethylene glycol residues;
wherein the molar ratio of glycol component/dicarboxylic acid component added in Step (I) is 1.01-3.0/1.0 and wherein TMCD is added in an amount from about 30 to 84 mole %, to allow for about 50 to 100% conversion of TMCD in the reaction and to arrive at a final polymer having about 30 to 42 mole % 2,2,4,4-tetramethyl-1,3-cyclobutanediol residues;
wherein the mixture in Step (I) is heated in the presence of:
  (i) at least one catalyst comprising at least one manganese compound and at least one titanium compound; and (ii) at least one phosphorus compound;
(II) heating the product of Step (I) at a temperature of 230° C. to 320° C. for 1 to 6 hours, under at least one pressure chosen from the range of the final pressure of Step (I) to 0.02 torr absolute, to form a final polyester;
wherein the total mole % of the dicarboxylic acid component of the final polyester is 100 mole %; and
wherein the total mole % of the glycol component of the final polyester is 100 mole %;
wherein the inherent viscosity of the polyester is from 0.50 to 0.70 dL/g as determined in 60/40 (wt/wt) phenol/tetrachloroethane at a concentration of 0.25 g/50 ml at 25° C.; and wherein the L* color values for the polyester is 90 or greater, or greater than 90, as determined by the L*a*b* color system measured following ASTM E 6290-98 and ASTM E308-99, performed on polymer granules ground to pass a 1 mm sieve. In one embodiment, the 2,2,4,4-tetramethyl-1,3-cyclobutanediol residues is a mixture comprising more than 50 mole % of cis-2,2,4,4-tetramethyl-1,3-cyclobutanediol residues and less than 50 mole % of trans-2,2,4,4-tetramethyl-1,3-cyclobutanediol residues.

In one aspect, for the polyester(s) useful in the invention and for the processes useful in the invention, the b* values for the polyesters useful in the invention [in one embodiment, in the presence of toner(s), and, in one embodiment in the absence of toner(s)] can be from −12 to less than 10 as determined by the L*a*b* color system of the CIE (International Commission on Illumination) (translated), wherein L* represents the lightness coordinate, a* represents the red/green coordinate, and b* represents the yellow/blue coordinate. In one embodiment, the b* values for the polyesters useful in the invention [in one embodiment, in the presence of and/or in the absence of toner(s)] can be from 0 to 10. In one embodiment, the b* values for the polyesters useful in the invention [in one embodiment, in the presence of and/or in the absence of toner(s)] can be from 0 to 5.

In one aspect, the invention includes thermoplastic articles which can comprise any of the polyester compositions of the invention.

In one aspect, the polyesters useful in the invention can comprise at least one phosphate ester whether or not present as a thermal stabilizer.

In one aspect, the polyesters useful in the invention can comprise at least one phosphate ester described herein which is present as a thermal stabilizer.

In one aspect, the polyesters useful in the invention contain no branching agent, or alternatively, at least one branching agent is added either prior to or during polymerization of the polyester.

In one aspect, the polyesters useful in the invention contain at least one branching agent without regard to the method or sequence in which it is added.

In one aspect, certain polyesters useful in the invention may be amorphous or semicrystalline. In one aspect, certain polyesters useful in the invention can have a relatively low crystallinity. Certain polyesters useful in the invention can thus have a substantially amorphous morphology, meaning that the polyesters comprise substantially unordered regions of polymer.

In one aspect, the polyesters, polyester compositions and/or processes of the invention can comprise phosphorus atoms, manganese atoms, and titanium atoms.

In one aspect, any of the polyester(s), polyester compositions and/or processes of the invention can comprise at least one manganese compound, at least on titanium compound, and at least one phosphorus compound.

In one aspect, at least one phosphorus compound useful in the invention comprises phosphoric acid, phosphorus acid, phosphonic acid, phosphinic acid, phosphonous acid, and various esters and salts thereof. The esters can be alkyl, branched alkyl, substituted alkyl, difunctional alkyl, alkyl ethers, aryl, and substituted aryl.

In one aspect, at least one phosphorus compound useful in the invention comprise at least one phosphorus compound chosen from at least one of substituted or unsubstituted alkyl phosphate esters, substituted or unsubstituted aryl phosphate esters, substituted or unsubstituted mixed alkyl aryl phosphate esters, diphosphites, salts of phosphoric acid, phosphine oxides, and mixed alkyl aryl phosphites, reaction products thereof, and mixtures thereof. The phosphate esters include esters in which the phosphoric acid is fully esterified or only partially esterified.

In one aspect, at least one phosphorus compound useful in the invention comprise at least one phosphorus compound chosen from at least one of substituted or unsubstituted alkyl phosphate esters, substituted or unsubstituted aryl phosphate esters, mixed substituted or unsubstituted alkyl aryl phosphate esters, reaction products thereof, and mixtures thereof. The phosphate esters include esters in which the phosphoric acid is fully esterified or only partially esterified.

In one aspect, at least one phosphorus compound useful in the invention are chosen from at least one of alkyl phosphate esters, aryl phosphate esters, mixed alkyl aryl phosphate esters, reaction products, thereof, and mixtures thereof.

In one aspect, at least one phosphorus compound useful in the invention may comprise at least one aryl phosphate ester.

In one aspect, at least one phosphorus compound useful in the invention may comprise at least one unsubstituted aryl phosphate ester.

In one aspect, at least one phosphorus compound useful in the invention may comprise at least one aryl phosphate ester which is not substituted with benzyl groups.

In one aspect, at least one phosphorus compound useful in the invention may comprise at least one triaryl phosphate ester.

In one aspect, at least one phosphorus compound useful in the invention may comprise at least one triaryl phosphate ester which is not substituted with benzyl groups.

In one aspect, at least one phosphorus compound useful in the invention may comprise at least one alkyl phosphate ester.

In one aspect, at least one phosphorus compound useful in the invention may comprise triphenyl phosphate and/or Merpol A. In one embodiment, any of the polyester compositions of the invention may comprise triphenyl phosphate.

In one aspect, any of the processes described herein for making any of the polyester compositions and/or polyesters can comprise at least one mixed alkyl aryl phosphite, such as, for example, bis(2,4-dicumylphenyl)pentaerythritol diphosphite also known as Doverphos S-9228 (Dover Chemicals, CAS #154862-43-8).

In one aspect, any of the processes described herein for making any of the polyester compositions and/or polyesters can comprise at least one one phosphine oxide.

In one aspect, any of the processes described herein for making any of the polyester compositions and/or polyesters can comprise at least one salt of phosphoric acid such as, for example, $KH_2PO_4$ and $Zn_3(PO_4)_2$.

It is believed that any of the processes of making the polyesters useful in the invention may be used to make any of the polyesters useful in the invention.

In one aspect, the pressure used in Step (I) of any of the processes of the invention consists of at least one pressure chosen from 0 psig to 75 psig. In one embodiment, the pressure used in Step (I) of any of the processes of the invention consists of at least one pressure chosen from 0 psig to 50 psig.

In one aspect, the pressure used in Step (II) of any of the processes of the invention consists of at least one pressure chosen from 20 torr absolute to 0.02 torr absolute; in one embodiment, the pressure used in Step (II) of any of the processes of the invention consists of at least one pressure chosen from 10 torr absolute to 0.02 torr absolute; in one embodiment, the pressure used in Step (II) of any of the processes of the invention consists of at least one pressure chosen from 5 torr absolute to 0.02 torr absolute; in one embodiment, the pressure used in Step (II) of any of the processes of the invention consists of at least one pressure chosen from 3 torr absolute to 0.02 torr absolute; in one embodiment, the pressure used in Step (II) of any of the processes of the invention consists of at least one pressure chosen from 20 torr absolute to 0.1 torr absolute; in one embodiment, the pressure used in Step (II) of any of the processes of the invention consists of at least one pressure chosen from 10 torr absolute to 0.1 torr absolute; in one embodiment, the pressure used in Step (II) of any of the processes of the invention consists of at least one pressure chosen from 5 torr absolute to 0.1 torr absolute; in one embodiment, the pressure used in Step (II) of any of the processes of the invention consists of at least one pressure chosen from 3 torr absolute to 0.1 torr absolute.

In one aspect, the molar ratio of glycol component/dicarboxylic acid component added in Step (I) of any of the processes of the invention is 1.0-3.0/1.0; in one aspect, the molar ratio of glycol component/dicarboxylic acid component added in Step (I) of any of the processes of the invention is 1.0-2.5/1.0; in one aspect, the molar ratio of glycol component/dicarboxylic acid component added in Step (I) of any of the processes of the invention is 1.0-2.0/1.0; in one aspect, the molar ratio of glycol component/dicarboxylic acid component added in Step (I) of any of the processes of the invention is 1.0-1.75/1.0; in one aspect, the molar ratio of glycol component/dicarboxylic acid component added in Step (I) of any of the processes of the invention is 1.0-1.5/1.0.

In one aspect, the molar ratio of glycol component/dicarboxylic acid component added in Step (I) of any of the processes of the invention is 1.01-3.0/1.0; in one aspect, the molar ratio of glycol component/dicarboxylic acid component added in Step (I) of any of the processes of the invention is 1.01-2.5/1.0; in one aspect, the molar ratio of glycol component/dicarboxylic acid component added in Step (I) of any of the processes of the invention is 1.01-2.0/1.0; in one aspect, the molar ratio of glycol component/dicarboxylic acid component added in Step (I) of any of the processes of the invention is 1.01-1.75/1.0; in one aspect, the molar ratio of glycol component/dicarboxylic acid component added in Step (I) of any of the processes of the invention is 1.01-1.5/1.0.

In any of the process embodiments for making the polyesters useful in the invention, the heating time of Step (II) may be from 1 to 5 hours. In any of the process embodiments for making the polyesters useful in the invention, the heating time of Step (II) may be from 1 to 4 hours. In any of the process embodiments for making the polyesters useful in the invention, the heating time of Step (II) may be from 1 to 3 hours. In any of the process embodiments for making the polyesters useful in the invention, the heating time of Step (II) may be from 1.5 to 3 hours. In any of the process embodiments for making the polyesters useful in the invention, the heating time of Step (II) may be from 1 to 2 hours.

In one aspect, the addition of the phosphorus compound(s) in the process(es) of the invention can result in a weight ratio of total phosphorus atoms to total titanium atoms in the final polyester of 0.1-2.5:1. In one embodiment, the addition of the phosphorus compound(s) in the process(es) of the invention can result in a weight ratio of total phosphorus atoms to total titanium atoms in the final polyester of 0.1-1.5:1.

For example, the weight of titanium atoms and phosphorus atoms present in the final polyester can be measured in ppm and can result in a weight ratio of total phosphorus atoms to total titanium atoms in the final polyester of any of the aforesaid weight ratios.

In one aspect, the addition of the phosphorus compound(s) in the process(es) of the invention can result in a weight ratio of total phosphorus atoms to total titanium atoms in the final polyester of 0.1-2.5:1. In one embodiment, the addition of the phosphorus compound(s) in the process(es) of the invention can result in a weight ratio of total phosphorus atoms to total titanium atoms in the final polyester of 0.1-1.5:1.

For example, the weight of titanium atoms and phosphorus atoms present in the final polyester can be measured in ppm and can result in a weight ratio of total phosphorus atoms to total titanium atoms in the final polyester of any of the aforesaid weight ratios.

In one aspect, the amount of titanium atoms in the polyesters useful in the invention can be from 10 to 60 ppm titanium atoms based on the weight of the final polyester.

In one aspect, the amount of titanium atoms in the polyesters useful in the invention can be from 25 to 55 ppm titanium atoms based on the weight of the final polyester.

In one aspect, the amount of manganese atoms in the polyesters useful in the invention can be from 10 to 100 ppm manganese atoms based on the weight of the final polyester.

In one aspect, the amount of manganese atoms in the polyesters useful in the invention can be from 15 to 60 ppm manganese atoms based on the weight of the final polyester.

In one aspect, the amount of phosphorus atoms in the polyesters useful in the invention can be from 1 to 200 ppm phosphorus atoms based on the weight of the final polyester.

In one embodiment, the amount of phosphorus atoms in the polyesters useful in the invention can be from 5 to 100 ppm, or 5 to 80 ppm, or 10 to 65 ppm phosphorus atoms based on the weight of the final polyester and the amount of titanium atoms in the polyester can be from 10 to 60 ppm titanium atoms based on the weight of the final polyester.

In one embodiment, the amount of phosphorus atoms in the polyesters useful in the invention can be from 1 to 100 ppm, or 5 to 80 ppm, or 10 to 65 ppm phosphorus atoms based on the weight of the final polyester and the amount of manganese atoms in the polyester can be from 10 to 100 ppm manganese atoms based on the weight of the final polyester.

In one aspect, the polyester compositions are useful in shaped articles, including, but not limited to, extruded, and/or molded articles including, but not limited to, injection molded articles, extruded articles, cast extrusion articles, profile extrusion articles, melt spun articles, thermoformed articles, extrusion molded articles, injection blow molded articles, injection stretch blow molded articles, extrusion blow molded articles and extrusion stretch blow molded articles. These articles can include, but are not limited to, films, bottles, containers, drinkware, medical parts, sheet and/or fibers.

In one aspect, the polyester compositions useful in the invention may be used in various types of film and/or sheet, including but not limited to extruded film(s) and/or sheet(s), calendered film(s) and/or sheet(s), compression molded film(s) and/or sheet(s), solution casted film(s) and/or sheet(s). Methods of making film and/or sheet include but are not limited to extrusion, calendering, compression molding, and solution casting.

In one aspect, the invention is related to molded and extruded articles, thermoformed film(s) and/or sheet(s), or calendered film(s) and/or sheet(s), comprising the polyester(s) and/or polyester compositions of the invention.

In one aspect, the invention is related to articles of manufacture which incorporate the molded and extruded articles, thermoformed film and/or sheet of the invention.

In one aspect, the invention provides a process for preparing polyesters containing ethylene glycol and 2,2,4,4-tetramethyl-1,3-cyclobutanediol, with improved color and/or clarity. In embodiments of the invention, the polyester contains less than about 10, or less than about 5 mole % of a modifying glycol having from 3 to 16 carbon atoms. In embodiments, the polyester contains less than about 10, or less than about 5 mole % of any modifying glycols. In embodiments, the polyester contains no other added modifying glycols. It should be understood that some other glycol residues may be formed in situ during processing.

In one aspect, the polyesters useful in the invention can be amorphous or semicrystalline. In one aspect, certain polyesters useful in the invention can have a relatively low crystallinity. Certain polyesters useful in the invention can thus have a substantially amorphous morphology, meaning that the polyesters comprise substantially unordered regions of polymer.

BRIEF DESCRIPTION OF THE FIGURES

Embodiments of the present disclosure are described herein with reference to the following figures, wherein.

DETAILED DESCRIPTION OF THE INVENTION

Figure 1:
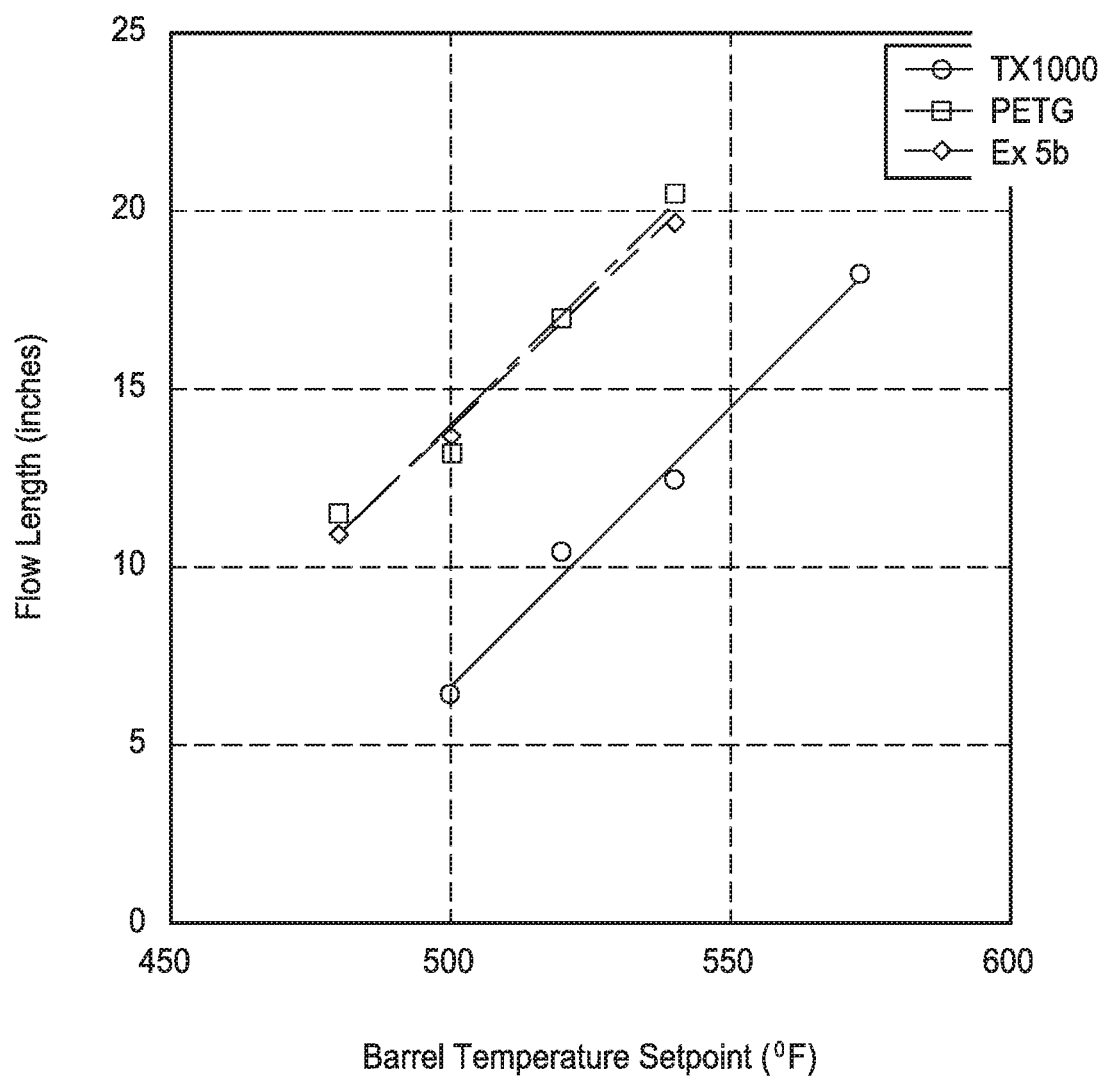
FIG. 1 is a graph depicting flow length as a function of barrel temperature for different polymer compositions in accordance with spiral flow testing in Example 11.

The present invention may be understood more readily by reference to the following detailed description of certain embodiments of the invention and the working examples. In accordance with the purpose(s) of this invention, certain embodiments of the invention are described in the Summary of the Invention and are further described herein below. Also, other embodiments of the invention are described herein.

It is believed that certain polyesters and/or polyester composition(s) of the invention formed from terephthalic acid, an ester thereof, and/or mixtures thereof, ethylene glycol and 2,2,4,4-tetramethyl-1,3-cyclobutanediol, and, further comprising certain catalysts and stabilizers, reaction products thereof, and mixtures thereof, can have a unique combination of two or more of the following properties: certain notched Izod impact strengths, certain inherent viscosities, certain glass transition temperature ($T_g$); certain flexural modulus, good clarity, good color, good thermal stability, good ultrasonic weld strength, and good dish washer durability and mechanical properties for a selected IV. In certain embodiments of the invention, certain polyesters and/or polyester compositions of the invention can have a unique combination of three or more of certain notched Izod impact strengths, certain inherent viscosities, certain glass transition temperature ($T_g$); certain flexural modulus, good clarity, good color, good thermal stability, good ultrasonic weld strength, and good dish washer durability and mechanical properties for a selected IV.

In one embodiment, copolyesters containing 2,2,4,4-tetramethyl-1,3-cyclobutanediol and ethylene glycol over a range of compositions can be prepared with a mixture of titanium and manganese or alternately titanium and low levels of tin catalysts.

It is believed that the color of these copolyesters can be improved with the addition during polymerization of certain levels of phosphorus containing compounds/stabilizers. In certain embodiments, the present invention relates to polyesters based on terephthalic acid, 2,2,4,4-tetramethyl-1,3-cyclobutanediol and ethylene glycol catalyzed by a unique combination of titanium and manganese catalysts stabilized by phosphorus compounds resulting in good TMCD incorporation, improved color (higher brightness and/or less yellow), and reactivity to achieve desired inherent viscosity (IV) over the compositional range described herein.

When titanium is added to the polyesters and/or polyester compositions and/or process of making the polyesters of the invention, it is added to the process of making the polyester in the form of a titanium compound. The amount of the titanium compound added to the polyesters of the invention and/or polyester compositions of the invention and/or processes of the invention can be measured in the form of titanium atoms present in the final polyester, for example, by weight measured in ppm.

When manganese is added to the polyesters and/or polyester compositions and/or process of making the polyesters of the invention, it is added to the process of making the polyester in the form of a manganese compound. The amount of the manganese compound added to the polyesters of the invention and/or polyester compositions of the invention and/or processes of the invention can be measured in the form of manganese atoms present in the final polyester, for example, by weight measured in ppm.

When phosphorus is added to the polyesters and/or polyester compositions and/or process of making the polyesters of the invention, it is added to the process of making the polyester in the form of a phosphorus compound. In one embodiment, this phosphorus compound can comprise at least one phosphate ester(s). The amount of phosphorus compound, [for example, phosphate ester(s)] added to the polyesters of the invention and/or polyester compositions of the invention and/or processes of the invention can be measured in the form of phosphorus atoms present in the final polyester, for example, by weight measured in ppm.

The term "polyester", as used herein, is intended to include "copolyesters" and is understood to mean a synthetic polymer prepared by the reaction of one or more difunctional carboxylic acids and/or multifunctional carboxylic acids with one or more difunctional hydroxyl compounds and/or multifunctional hydroxyl compounds, for example, branching agents. Typically, the difunctional carboxylic acid can be a dicarboxylic acid and the difunctional hydroxyl compound can be a dihydric alcohol such as, for example, glycols and diols. The term "glycol" as used herein includes, but is not limited to, diols, glycols, and/or multifunctional hydroxyl compounds, for example, branching agents. Alternatively, the difunctional carboxylic acid may be a hydroxy carboxylic acid such as, for example, p-hydroxybenzoic acid, and the difunctional hydroxyl compound may be an aromatic nucleus bearing 2 hydroxyl substituents such as, for example, hydroquinone. The term "residue", as used herein, means any organic structure incorporated into a polymer through a polycondensation and/or an esterification reaction from the corresponding monomer. The term "repeating unit", as used herein, means an organic structure having a dicarboxylic acid residue and a diol residue bonded through a carbonyloxy group. Thus, for example, the dicarboxylic acid residues may be derived from a dicarboxylic acid monomer or its associated acid halides, esters, salts, anhydrides, and/or mixtures thereof. Furthermore, as used herein, the term "diacid" includes multifunctional acids, for example, branching agents. As used herein, therefore, the term "dicarboxylic acid" is intended to include dicarboxylic acids and any derivative of a dicarboxylic acid, including its associated acid halides, esters, half-esters, salts, half-salts, anhydrides, mixed anhydrides, and/or mixtures thereof, useful in a reaction process with a diol to make polyester. As used herein, the term "terephthalic acid" is intended to include terephthalic acid itself and residues thereof as well as any derivative of terephthalic acid, including its associated acid halides, esters, half-esters, salts, half-salts, anhydrides, mixed anhydrides, and/or mixtures thereof or residues thereof useful in a reaction process with a diol to make polyester.

The polyesters used in the present invention typically can be prepared from dicarboxylic acids and diols which react in substantially equal proportions and are incorporated into the polyester polymer as their corresponding residues. The polyesters of the present invention, therefore, can contain substantially equal molar proportions of acid residues (100 mole %) and diol (and/or multifunctional hydroxyl compound) residues (100 mole %) such that the total moles of repeating units is equal to 100 mole %. The mole percentages provided in the present disclosure, therefore, may be based on the total moles of acid residues, the total moles of diol residues, or the total moles of repeating units. For example, a polyester containing 10 mole % isophthalic acid, based on the total acid residues, means the polyester contains 10 mole % isophthalic acid residues out of a total of 100 mole % acid residues. Thus, there are 10 moles of isophthalic acid residues among every 100 moles of acid residues. In another example, a polyester containing 30 mole % 2,2,4,4-tetramethyl-1,3-cyclobutanediol, based on the total diol residues, means the polyester contains 30 mole % 2,2,4,4-tetramethyl-1,3-cyclobutanediol residues out of a total of 100 mole % diol residues. Thus, there are 30 moles of 2,2,4,4-tetramethyl-1,3-cyclobutanediol residues among every 100 moles of diol residues.

In other aspects of the invention, the glycol component for the polyesters useful in the invention includes but are not limited to at least one of the following combinations of ranges: about 30 to about 42 mole % 2,2,4,4-tetramethyl-1,3-cyclobutanediol and about 58 to 70 mole % ethylene glycol; about 32 to about 42 mole % 2,2,4,4-tetramethyl-1,3-cyclobutanediol and about 58 to 68 mole % ethylene glycol; about 32 to about 38 mole % 2,2,4,4-tetramethyl-1,3-cyclobutanediol and about 64 to 68 mole % ethylene glycol; about 33 to about 41 mole % 2,2,4,4-tetramethyl-1,3-cyclobutanediol and about 59 to 67 mole % ethylene glycol; about 34 to about 40 mole % 2,2,4,4-tetramethyl-1,3-cyclobutanediol and about 60 to 66 mole % ethylene glycol; greater than 34 to about 40 mole % 2,2,4,4-tetramethyl-1,3-cyclobutanediol and 60 to less than 66 mole % ethylene glycol; 34.2 to 40 mole % 2,2,4,4-tetramethyl-1,3-cyclobutanediol and about 60 to 65.8 mole % ethylene glycol; about 35 to about 39 mole % 2,2,4,4-tetramethyl-1, 3-cyclobutanediol and about 61 to 65 mole % ethylene glycol; about 35 to about 38 mole % 2,2,4,4-tetramethyl-1,3-cyclobutanediol and about 62 to 65 mole % ethylene glycol; or about 36 to about 37 mole % 2,2,4,4-tetramethyl-1,3-cyclobutanediol and about 63 to 64 mole % ethylene glycol.

For embodiments of the invention, the polyesters useful in the invention may exhibit at least one of the following inherent viscosities as determined in 60/40 (wt/wt) phenol/tetrachloroethane at a concentration of 0.25 g/50 ml at 25° C. from 0.50 to 0.70 dL/g; 0.55 to 0.65 dL/g; 0.56 to 0.64 dL/g; 0.56 to 0.63 dL/g; 0.56 to 0.62 dL/g; 0.56 to 0.61 dL/g; 0.57 to 0.64 dL/g; 0.58 to 0.64 dL/g; 0.57 to 0.63 dL/g; 0.57 to 0.62 dL/g; 0.57 to 0.61 dL/g; 0.58 to 0.60 dL/g or about 0.59 dL/g.

In one embodiment, terephthalic acid may be used as the starting material. In another embodiment, dimethyl terephthalate may be used as the starting material. In yet another embodiment, mixtures of terephthalic acid and dimethyl terephthalate may be used as the starting material and/or as an intermediate material.

In certain embodiments, terephthalic acid or an ester thereof, such as, for example, dimethyl terephthalate or a mixture of terephthalic acid residues and an ester thereof can make up a portion or all of the dicarboxylic acid component used to form the polyesters useful in the invention. In certain embodiments, terephthalic acid residues can make up a portion or all of the dicarboxylic acid component used to form the polyesters useful in the invention. In certain embodiments, higher amounts of terephthalic acid can be used in order to produce a higher impact strength polyester. For purposes of this disclosure, the terms "terephthalic acid" and "dimethyl terephthalate" are used interchangeably herein. In one embodiment, dimethyl terephthalate is part or all of the dicarboxylic acid component used to make the polyesters useful in the present invention. In embodiments, ranges of from 70 to 100 mole %; or 80 to 100 mole %; or 90 to 100 mole %; or 99 to 100 mole %; or 100 mole % terephthalic acid and/or dimethyl terephthalate and/or mixtures thereof may be used.

In addition to terephthalic acid, the dicarboxylic acid component of the polyesters useful in the invention can comprise up to 10 mole %, up to 5 mole %, or up to 1 mole % of one or more modifying aromatic dicarboxylic acids. Yet another embodiment contains 0 mole % modifying aromatic dicarboxylic acids. Thus, if present, it is contemplated that the amount of one or more modifying aromatic dicarboxylic acids can range from any of these preceding endpoint values including, for example, 0.01 to 10 mole %, from 0.01 to 5 mole % and from 0.01 to 1 mole %. In one embodiment, modifying aromatic dicarboxylic acids that may be used in the present invention include but are not limited to those having up to 20 carbon atoms, and which can be linear, para-oriented, or symmetrical. Examples of modifying aromatic dicarboxylic acids which may be used in this invention include, but are not limited to, isophthalic acid, 4,4'-biphenyldicarboxylic acid, 1,4-, 1,5-, 2,6-, 2,7-naphthalenedicarboxylic acid, and trans-4,4'-stilbenedicarboxylic acid, and esters thereof. In one embodiment, the modifying aromatic dicarboxylic acid is isophthalic acid.

The carboxylic acid component of the polyesters useful in the invention can be further modified with up to 10 mole %, such as up to 5 mole % or up to 1 mole % of one or more aliphatic dicarboxylic acids containing 2-16 carbon atoms, such as, for example, cyclohexanedicarboxylic, malonic, succinic, glutaric, adipic, pimelic, suberic, azelaic and dodecanedioic dicarboxylic acids. Certain embodiments can also comprise 0.01 to 10 mole %, such as 0.1 to 10 mole %, 1 or 10 mole %, 5 to 10 mole % of one or more modifying aliphatic dicarboxylic acids. Yet another embodiment contains 0 mole % modifying aliphatic dicarboxylic acids. The total mole % of the dicarboxylic acid component is 100 mole %. In one embodiment, adipic acid and/or glutaric acid are provided in the modifying aliphatic dicarboxylic acid component of the invention.

Esters of terephthalic acid and the other modifying dicarboxylic acids or their corresponding esters and/or salts may be used instead of the dicarboxylic acids. Suitable examples of dicarboxylic acid esters include, but are not limited to, the dimethyl, diethyl, dipropyl, diisopropyl, dibutyl, and diphenyl esters. In one embodiment, the esters are chosen from at least one of the following: methyl, ethyl, propyl, isopropyl, and phenyl esters.

For the desired polyester, the molar ratio of cis/trans 2,2,4,4-tetramethyl-1,3-cyclobutanediol can vary from the pure form of each and mixtures thereof. In certain embodiments, the molar percentages for cis and/or trans 2,2,4,4,-tetramethyl-1,3-cyclobutanediol are greater than 50 mole % cis and less than 50 mole % trans; or greater than 55 mole % cis and less than 45 mole % trans; or 50 to 70 mole % cis and 50 to 30 mole % trans; or 60 to 70 mole % cis and 30 to 40 mole % trans; or greater than 70 mole % cis and less than 30 mole % trans; wherein the total mole percentages for cis- and trans-2,2,4,4-tetramethyl-1,3-cyclobutanediol is equal to 100 mole %. In an additional embodiment, the molar ratio of cis/trans 2,2,4,4-tetramethyl-1,3-cyclobutanediol can vary within the range of 50/50 to 0/100, for example, between 40/60 to 20/80.

In one embodiment, the glycol component of the polyester portion of the polyester compositions useful in the invention can contain up to 30 mole % of one or more modifying glycols which are not 2,2,4,4-tetramethyl-1,3-cyclobutanediol or ethylene glycol. In one embodiment, the glycol component of the polyester portion of the polyester compositions useful in the invention can contain up to 10 mole %, or 9 mole %, or 8 mole %, or 7 mole %, or 6 mole %, or less of one or more modifying glycols which are not 2,2,4,4-tetramethyl-1,3-cyclobutanediol or ethylene glycol. In one embodiment, the glycol component of the polyester portion of the polyester compositions useful in the invention can contain up to 5 mole %, or 4 mole %, or 3 mole %, or 2 mole %, or 1 mole %, or less of one or more modifying glycols which are not 2,2,4,4-tetramethyl-1,3-cyclobutanediol or ethylene glycol. In certain embodiments, the polyesters useful in the invention can contain 3 mole % or less of one or more modifying glycols. In another embodiment, the polyesters useful in the invention can contain 2 mole % or less of one or more modifying glycols. In another embodiment, the polyesters useful in the invention can contain 0 mole % modifying glycols. It is contemplated however that some other glycol residuals may form in situ. For example, a certain amount of DEG will typically form in situ during the polymerization reactions. In some embodiments, DEG can be intentionally added as a monomer to the reaction mixture, and in other embodiments no DEG is intentionally added, but a small amount of DEG residues may be present in the final copolymer due to in situ formation.

In embodiments, modifying glycols for use in the polyesters can include diols other than 2,2,4,4-tetramethyl-1,3-cyclobutanediol and ethylene glycol and can contain 2 to 16 carbon atoms. Examples of modifying glycols include, but are not limited to, cyclohexanedimethanol, diethylene glycol, 1,2-propanediol, 1,3-propanediol, neopentyl glycol, 1,4- butanediol, 1,5-pentanediol, 1,6-hexanediol, p-xylene glycol, polytetramethylene glycol, and mixtures thereof. In another embodiment, the modifying glycols include, but are not limited to, at least one of 1,3-propanediol and 1,4-butanediol. In one embodiment, at least one modifying glycol is diethylene glycol. In one embodiment, the diethylene glycol is not added as a separate monomer but is formed during polymerization.

In some embodiments, the polyesters according to the invention can comprise from 0 to 10 mole percent, for example, from 0.01 to 5 mole percent, from 0.01 to 1 mole percent, from 0.05 to 5 mole percent, from 0.05 to 1 mole percent, or from 0.1 to 0.7 mole percent, based the total mole percentages of either the diol or diacid residues; respectively, of one or more residues of a branching monomer, also referred to herein as a branching agent, having 3 or more carboxyl substituents, hydroxyl substituents, or a combination thereof. In certain embodiments, the branching monomer or agent may be added prior to and/or during and/or after the polymerization of the polyester. In embodiments, the polyester(s) useful in the invention can thus be linear or branched.

Examples of branching monomers include, but are not limited to, multifunctional acids or multifunctional alcohols such as trimellitic acid, trimellitic anhydride, pyromellitic dianhydride, trimethylolpropane, glycerol, pentaerythritol, citric acid, tartaric acid, 3-hydroxyglutaric acid and the like. In one embodiment, the branching monomer residues can comprise 0.1 to 0.7 mole percent of one or more residues chosen from at least one of the following: trimellitic anhydride, pyromellitic dianhydride, glycerol, sorbitol, 1,2,6-hexanetriol, pentaerythritol, trimethylolethane, and/or trimesic acid. The branching monomer may be added to the polyester reaction mixture or blended with the polyester in the form of a concentrate as described, for example, in U.S. Pat. Nos. 5,654,347 and 5,696,176, whose disclosure regarding branching monomers is incorporated herein by reference.

The polyesters of the invention can comprise at least one chain extender. Suitable chain extenders include, but are not limited to, multifunctional (including, but not limited to, bifunctional) isocyanates, multifunctional epoxides, including for example epoxylated novolacs, and phenoxy resins. In certain embodiments, chain extenders may be added at the end of the polymerization process or after the polymerization process. If added after the polymerization process, chain extenders can be incorporated by compounding or by addition during conversion processes such as injection molding or extrusion. The amount of chain extender used can vary depending on the specific monomer composition used and the physical properties desired but is generally about 0.1 percent by weight to about 10 percent by weight, such as about 0.1 to about 5 percent by weight, based on the total weight of the polyester.

In one embodiment, certain polyesters useful in this invention can be visually clear. The term "visually clear" is defined herein as an appreciable absence of cloudiness, haziness, and/or muddiness, when inspected visually.

In one embodiment, the polyesters useful in the invention and/or the polyester compositions of the invention can have color values $L^*$, $a^*$ and $b^*$ which can be determined using a Hunter Lab Ultrascan Spectra Colorimeter manufactured by Hunter Associates Lab Inc., Reston, Va. The color determinations are averages of values measured on either pellets of the polyesters or plaques or other items injection molded or extruded from them. They are determined by the $L^*a^*b^*$ color system of the CIE (International Commission on Illumination) (translated), wherein $L^*$ represents the lightness coordinate, $a^*$ represents the red/green coordinate, and $b^*$ represents the yellow/blue coordinate. In various embodiments, the color values can be determined for polymers having the presence of and/or in the absence of toner(s).

Deleterious color interactions are believed to occur with tin catalysts or with titanium catalysts used to prepare polyesters containing ethylene glycol. In one embodiment of this invention, the $b^*$ color values for the polyesters useful in the invention made using at least one titanium compound and at least one manganese compound in combination with at least one phosphorus compound as described herein are believed to be a significant improvement over using tin catalysts or titanium catalysts alone or in conjunction with phosphorus in the production of these polyesters with regard to good TMCD incorporation (>50%), improved color ($L^*$>90 and/or $b^*$<10), and ability to build IV.

In one embodiment, the phosphorus compound(s) can be an organic compound such as, for example, a phosphorus acid ester containing halogenated or non-halogenated organic substituents. In embodiments, the phosphorus compound(s) can comprise a wide range of phosphorus compounds, for example, phosphines, phosphites, phosphinites, phosphonites, phosphinates, phosphonates, phosphine oxides, and phosphates.

Examples of phosphorus compounds that may be useful in the invention can include tributyl phosphate, triethyl phosphate, tri-butoxyethyl phosphate, t-butylphenyl diphenyl phosphate, 2-ethylhexyl diphenyl phosphate, ethyl dimethyl phosphate, isodecyl diphenyl phosphate, trilauryl phosphate, triphenyl phosphate, tricresyl phosphate, trixylenyl phosphate, t-butylphenyl diphenylphosphate, resorcinol bis(diphenyl phosphate), tribenzyl phosphate, phenyl ethyl phosphate, trimethyl thionophosphate, phenyl ethyl thionophosphate, dimethyl methylphosphonate, diethyl methylphosphonate, diethyl pentylphosphonate, dilauryl methylphosphonate, diphenyl methylphosphonate, dibenzyl methylphosphonate, diphenyl cresylphosphonate, dimethyl cresylphosphonate, dimethyl methylthionophosphonate, phenyl diphenylphosphinate, benzyl diphenylphosphinate, methyl diphenylphosphinate, trimethyl phosphine oxide, triphenyl phosphine oxide, tribenzyl phosphine oxide, 4-methyl diphenyl phosphine oxide, triethyl phosphite, tributyl phosphite, trilauryl phosphite, triphenyl phosphite, tribenzyl phosphite, phenyl diethyl phosphite, phenyl dimethyl phosphite, benzyl dimethyl phosphite, dimethyl methylphosphonite, diethyl pentylphosphonite, diphenyl methylphosphonite, dibenzyl methylphosphonite, dimethyl cresylphosphonite, methyl dimethylphosphinite, methyl diethylphosphinite, phenyl diphenylphosphinite, methyl diphenylphosphinite, benzyl diphenylphosphinite, triphenyl phosphine, tribenzyl phosphine, and methyl diphenyl phosphine. In one embodiment, triphenyl phosphine oxide is excluded as a thermal stabilizer in the process(es) of making the polyesters of the invention and/or in the polyester composition(s) of the invention.

In one embodiment, phosphorus compounds useful in the invention can be any of the previously described phosphorus-based acids wherein one or more of the hydrogen atoms of the acid compound (bonded to either oxygen or phosphorus atoms) are replaced with alkyl, branched alkyl, substituted alkyl, alkyl ethers, substituted alkyl ethers, alkyl-aryl, alkyl-substituted aryl, aryl, substituted aryl, and mixtures thereof. In another embodiment, phosphorus compounds useful in the invention, include but are not limited to, the above described compounds wherein at least one of the hydrogen atoms bonded to an oxygen atom of the compound is replaced with a metallic ion or an ammonium ion.

The esters can contain alkyl, branched alkyl, substituted alkyl, alkyl ethers, aryl, and/or substituted aryl groups. The esters can also have at least one alkyl group and at least one aryl group. The number of ester groups present in the particular phosphorus compound can vary from zero up to the maximum allowable based on the number of hydroxyl groups present on the phosphorus compound used. For example, an alkyl phosphate ester can include one or more of the mono-, di-, and tri alkyl phosphate esters; an aryl phosphate ester includes one or more of the mono-, di-, and tri aryl phosphate esters; and an alkyl phosphate ester and/or an aryl phosphate ester also include, but are not limited to, mixed alkyl aryl phosphate esters having at least one alkyl and one aryl group.

In one embodiment, the phosphorus compounds useful in the invention include but are not limited to alkyl, aryl or mixed alkyl aryl esters or partial esters of phosphoric acid, phosphorus acid, phosphinic acid, phosphonic acid, or phosphonous acid. The alkyl or aryl groups can contain one or more substituents.

In one aspect, the phosphorus compounds useful in the invention comprise at least one phosphorus compound chosen from at least one of substituted or unsubstituted alkyl phosphate esters, substituted or unsubstituted aryl phosphate esters, substituted or unsubstituted mixed alkyl aryl phosphate esters, diphosphites, salts of phosphoric acid, phosphine oxides, and mixed aryl alkyl phosphites, reaction products thereof, and mixtures thereof. The phosphate esters include esters in which the phosphoric acid is fully esterified or only partially esterified.

In one embodiment, for example, the phosphorus compounds useful in the invention can include at least one phosphate ester.

In one aspect, the phosphorus compounds useful in the invention comprise at least one phosphorus compound chosen from at least one of substituted or unsubstituted alkyl phosphate esters, substituted or unsubstituted aryl phosphate esters, substituted or unsubstituted mixed alkyl aryl phosphate esters, reaction products thereof, and mixtures thereof. The phosphate esters include esters in which the phosphoric acid is fully esterified or only partially esterified.

In one embodiment, for example, the phosphorus compounds useful in the invention can include at least one phosphate ester.

In another embodiment, the phosphate esters useful in the invention can include but are not limited to alkyl phosphate esters, aryl phosphate esters, mixed alkyl aryl phosphate esters, and/or mixtures thereof.

In certain embodiments, the phosphate esters useful in the invention are those where the groups on the phosphate ester include are alkyl, alkoxy-alkyl, phenyl, or substituted phenyl groups. These phosphate esters are generally referred to herein as alkyl and/or aryl phosphate esters. Certain preferred embodiments include trialkyl phosphates, triaryl phosphates, alkyl diaryl phosphates, dialkyl aryl phosphates, and mixtures of such phosphates, wherein the alkyl groups are preferably those containing from 2 to 12 carbon atoms, and the aryl groups are preferably phenyl.

Representative alkyl and branched alkyl groups are preferably those containing from 1-12 carbon atoms, including, but not limited to, ethyl, propyl, isopropyl, butyl, hexyl, cyclohexyl, 2-ethylhexyl, octyl, decyl and dodecyl. Substituted alkyl groups include, but are not limited to, those containing at least one of carboxylic acid groups and esters thereof, hydroxyl groups, amino groups, keto groups, and the like.

Representative of alkyl-aryl and substituted alkyl-aryl groups are those wherein the alkyl portion contains from 1-12 carbon atoms, and the aryl group is phenyl or substituted phenyl wherein groups such as alkyl, branched alkyl, aryl, hydroxyl, and the like are substituted for hydrogen at any carbon position on the phenyl ring. Preferred aryl groups include phenyl or substituted phenyl wherein groups such as alkyl, branched alkyl, aryl, hydroxyl and the like are substituted for hydrogen at any position on the phenyl ring.

In one embodiment, the phosphate esters useful in the invention include but are not limited to dibutylphenyl phosphate, triphenyl phosphate, tricresyl phosphate, tributyl phosphate, tri-2-ethylhexyl phosphate, trioctyl phosphate, and/or mixtures thereof, including particularly mixtures of tributyl phosphate and tricresyl phosphate, and mixtures of isocetyl diphenyl phosphate and 2-ethylhexyl diphenyl phosphate.

In one embodiment, at least one phosphorus compound useful in the invention comprises at least one aryl phosphate ester.

In one embodiment, at least one phosphorus compound useful in the invention comprises at least one unsubstituted aryl phosphate ester.

In one aspect, at least one phosphorus compound useful in the invention comprises at least one aryl phosphate ester which is not substituted with benzyl groups.

In one aspect, any of the phosphorus compounds useful in the invention may comprise at least one alkyl phosphate ester.

In one embodiment, the phosphate esters useful in the invention as thermal stabilizers and/or color stabilizers include but are not limited to, at least one of the following: trialkyl phosphates, triaryl phosphates, alkyl diaryl phosphates, and mixed alkyl aryl phosphates.

In one embodiment, the phosphate esters useful in the invention as thermal stabilizers and/or color stabilizers include but are not limited to, at least one of the following: triaryl phosphates, alkyl diaryl phosphates, and mixed alkyl aryl phosphates.

In one embodiment, the phosphate esters useful as thermal stabilizers and/or color stabilizers in the invention can include but are not limited to, at least one of the following: triaryl phosphates and mixed alkyl aryl phosphates.

In one embodiment, at least one phosphorus compound useful in the invention can comprise, but is not limited to, triaryl phosphates, such as, for example, triphenyl phosphate. In one embodiment, at least one thermal stabilizer comprises, but is not limited to Merpol A. In one embodiment, at least one thermal stabilizer useful in the invention comprises, but is not limited to, at least one of triphenyl phosphate and Merpol A. Merpol A is a phosphate ester commercially available from Stepan Chemical Co and/or E.I. duPont de Nemours & Co. The CAS Registry number for Merpol A is believed to be CAS Registry #37208-27-8.

In one aspect, any of the phosphorus compounds useful in the invention may comprise at least one triaryl phosphate ester which is not substituted with benzyl groups.

In one embodiment, the polyester compositions and/or processes of the invention may comprise 2-ethylhexyl diphenyl phosphate.

In one embodiment, any of the processes described herein for making any of the polyester compositions and/or polyesters can comprise at least one mixed alkyl aryl phosphite, such as, for example, bis(2,4-dicumylphenyl)pentaerythritol diphosphite also known as Doverphos S-9228 (Dover Chemicals, CAS #15486243-8).

In one embodiment, any of the processes described herein for making any of the polyester compositions and/or polyesters can comprise at least one phosphine oxide.

In one embodiment, any of the processes described herein for making any of the polyester compositions and/or polyesters can comprise at least one salt of phosphoric acid such as, for example, $KH_2PO_4$ and $Zn_3(PO_4)_2$.

The term "thermal stabilizer" is intended to include the reaction product(s) thereof. The term "reaction product" as used in connection with the thermal stabilizers of the invention refers to any product of a polycondensation or esterification reaction between the thermal stabilizer and any of the monomers used in making the polyester as well as the product of a polycondensation or esterification reaction between the catalyst and any other type of additive.

In one embodiment of the invention, the phosphorus compounds useful in the invention may act as thermal stabilizers. In one embodiment of the invention, the phosphorus compounds useful in the invention may not act as a thermal stabilizer but may act as a color stabilizer. In one embodiment of the invention, the phosphorus compounds useful in the invention may act as both a thermal stabilizer and a color stabilizer.

When phosphorus is added to the polyesters and/or polyester compositions and/or process of making the polyesters of the invention, it is added in the form of a phosphorus compound, for example, at least one phosphate ester(s). The amount of phosphorus compound(s), (for example, at least one phosphate ester), is added to the polyesters of the invention and/or polyester compositions of the invention and/or processes of the invention can be measured in the form of phosphorus atoms present in the final polyester, for example, by weight measured in ppm.

In one embodiment, amounts of the phosphate ester of the invention added during polymerization are chosen from the following: 10 to 200 ppm based on the total weight of the polyester composition and as measured in the form of phosphorus atoms in the final polyester. In embodiments of the invention, phosphorus can be present in an amount of 5 to 100, or 5 to 80, or 10 to 80, or 10 to 75, or 10 to 70, or 10 to 65 ppm, based on the total weight of the polyester composition and as measured in the form of phosphorus atoms in the final polyester.

In one embodiment, the catalyst mixture contains a titanium compound. In one embodiment, the titanium compound can be used in either the esterification reaction or the polycondensation reaction or both reactions. In one embodiment, the catalyst mixture contains a titanium compound used in the esterification reaction. In one embodiment, the catalyst mixture contains a titanium compound used in the polycondensation reaction. In one embodiment, less than about 60 ppm elemental titanium can be present as residue in the polyester based on the total weight of the polyester.

In embodiments, titanium amounts can range from 10 ppm to 70 ppm based on the catalyst metal and based on the weight of the final polymer.

In embodiments of the invention, titanium can be present in an amount of 10 to 65, or 10 to 60, or 10 to 55, or 20 to 60, or 20 to 55 ppm, or 25 to 55 ppm based on the total weight of the polyester composition and as measured in the form of titanium atoms in the final polyester. The process can be carried out in either a batch or continuous process. In one embodiment, the process is carried out in a continuous process.

When titanium is added to the polyesters and/or polyester compositions and/or process of making the polyesters of the invention, it is added to the process of making the polyester in the form of a titanium compound. The amount of the titanium compound added to the polyesters of the invention and/or polyester compositions of the invention and/or processes of the invention can be measured in the form of titanium atoms present in the final polyester, for example, by weight measured in ppm.

In another embodiment, the catalyst mixture contains a titanium compound used in the esterification reaction in the amount of 10 ppm to 60 ppm based on the weight of the final polyester, as measured in the form of titanium atoms in the final polyester.

The titanium-containing compounds useful in this invention include any compound containing titanium including but not limited to: tetraethyl titanate, acetyltripropyl titanate, tetrapropyl titanate, tetrabutyl titanate, polybutyl titanate, 2-ethylhexyltitanate, octyleneglycol titanate, lactate titanate, triethanolamine titanate, acetylacetonate titanate, ethylacetoacetic ester titanate, isostearyl titanate, acetyl triisopropyl titanate, titanium tetraisopropoxide titanium glycolates, titanium butoxide, hexylene glycol titanate, and tetraisooctyl titanate, titanium dioxide, titanium dioxide/silicon dioxide coprecipitates, and titanium dioxide/zirconium dioxide coprecipitates. This invention includes but is not limited to the titanium dioxide/silicon dioxide coprecipitate catalyst described in U.S. Pat. No. 6,559,272.

In one embodiment, the catalyst mixture contains a manganese compound. In one embodiment, the manganese compound can be used in either the esterification reaction or the polycondensation reaction or both reactions. In one embodiment, the catalyst mixture contains a manganese compound used in the esterification reaction. In one embodiment, the catalyst mixture contains a manganese compound used in the polycondensation reaction. Generally, in one embodiment, less than about 100 ppm elemental manganese can be present as residue in the polyester based on the total weight of the polyester.

Manganese amounts can range from 10 ppm to 100 ppm based on the catalyst metal and based on the weight of the final polymer. In embodiments of the invention, manganese can be present in an amount of 10 to 100, 10 to 80, 10 to 70, 10 to 60, or 15 to 60, or 15 to 55, or 15 to 50 ppm, based on the total weight of the polyester composition and as measured in the form of manganese atoms in the final polyester. The process can be carried out in either a batch or continuous process. In one embodiment, the process is carried out in a continuous process.

The manganese-containing compounds useful in this invention can include any compound containing manganese. In embodiments, manganese can be added in the form of a manganese salt. In embodiments, examples of useful manganese salts include manganese(II) diacetate, manganese benzoate, manganese octoate, manganese caproate, manganese 2-diethyl hexoate, manganese lineolate, manganese stearate, manganese napthenate, and combinations thereof.

In one embodiment, suitable catalysts for use in the processes of the invention to make the polyesters useful in the invention include at least one titanium compound and one manganese compound. In certain embodiments, other catalysts could possibly be used in the invention in combination with the at least one titanium compound and the at least one manganese compound. In one embodiment, other catalysts can include, but are not limited to, those based on tin, gallium, zinc, antimony, cobalt, manganese, magnesium, germanium, lithium, aluminum compounds, and an aluminum compound with lithium hydroxide or sodium hydroxide.

In one embodiment, the polyesters of the invention can be prepared using at least one tin compound in addition to the titanium compound as catalyst(s), wherein the tin is present in an amount less than 25 ppm, or less than 20 ppm, based on the catalyst metal and based on the weight of the final polymer. In one embodiment, this combination of titanium and low level tin catalysts can contain less than 5 ppm, or less than 2 ppm, of any other intentionally added catalysts, including magnesium, based on the catalyst metal and based on the weight of the final polymer. In one embodiment, this combination of titanium and low level tin catalysts can be in the absence of any other intentionally added catalysts, including magnesium.

In one embodiment, the invention is directed to a thermoplastic polyester composition comprised of: a) a dicarboxylic acid component comprising: (i) 90 to 100 mole % terephthalic acid residues; and (ii) about 0 to about 10 mole % of aromatic and/or aliphatic dicarboxylic acid residues having up to 20 carbon atoms; and (b) a glycol component comprising: (i) about 30 to about 42 mole % 2,2,4,4-tetramethyl-1,3-cyclobutanediol (TMCD) residues; and (ii) about 70 to about 58 mole % ethylene glycol residues; and (c) a catalyst/stabilizer component comprising: (i) titanium atoms in the range of 10-60 ppm based on polymer weight, (ii) additional metal catalyst atoms selected from the group consisting of: manganese atoms in the range of 10-100 ppm based on polymer weight, tin atoms in the range of 5 to 20 ppm based on polymer weight, and a combination of the manganese and tin atoms, and (iii) phosphorus atoms in the range of 10-200 ppm based on polymer weight, wherein the total mole % of the dicarboxylic acid component is 100 mole %, and wherein the total mole % of the glycol component is 100 mole %; and wherein the inherent viscosity (IV) of the polyester is from 0.50 to 0.70 dL/g as determined in 60/40 (wt/wt) phenol/tetrachloroethane at a concentration of 0.25 g/50 ml at 25° C.

In embodiments where the catalyst system comprises titanium and tin (low level), or where it comprises titanium, manganese and tin, a wide variety of tin compounds can be used. For example, see U.S. Pat. No. 2,720,507, where the portion concerning tin catalysts is incorporated herein by reference. These catalysts are tin compounds containing at least one organic radical. These catalysts include compounds of both divalent or tetravalent tin which have the general formulas set forth below:

| A. | M$_2$(Sn(OR)$_4$) |
|---|---|
| B. | MH(Sn(OR)$_4$) |
| C. | M'(Sn(OR)$_4$) |
| D. | M'(HSn(OR)$_4$)$_2$ |
| E. | M$_2$(Sn(OR)$_6$) |
| F. | MH(Sn(OR)$_6$) |
| G. | M'(Sn(OR)$_6$) |
| H. | M'(HSn(OR)$_6$)$_2$) |
| I. | Sn(OR)$_2$ |
| J. | Sn(OR)$_4$ |

-continued

| K. | SnR'$_2$ |
|---|---|
| L. | SnR'$_4$ |
| M. | R'$_2$SnO |

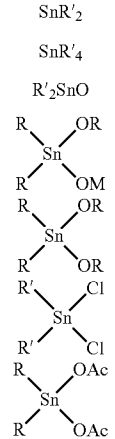

| N. | |
| O. | |
| P. | |
| Q. | | wherein M is an alkali metal, e.g. lithium, sodium, or potassium, M' is an alkaline earth metal such as Mg, Ca or Sr, each R represents an alkyl radical containing from 1 to 8 carbon atoms, each R' radical represents a substituent selected from those consisting of alkyl radicals containing from 1 to 8 carbon atoms (i.e. R radicals) and aryl radicals of the benzene series containing from 6 to 9 carbon atoms (e.g. phenyl, tolyl, benzyl, phenylethyl, etc., radicals), and Ac represents an acyl radical derived from an organic acid containing from 2 to 18 carbon atoms (e.g. acetyl, butyryl, lauroyl, benzoyl, stearoyl, etc.).

Bimetallic alkoxide catalysts can be made as described by Meerwein, Ann. 476, 113 (1929). As shown by Meerwein, these catalysts are not merely mixtures of the two metallic alkoxides. They are definite compounds having a salt-like structure. These are the compounds depicted above by the Formulas A through H. Those not specifically described by Meerwein can be prepared by procedures analogous to the working examples and methods set forth by Meerwein.

Other tin compounds can also be made by various methods such as those described in the following literature: For the preparation of diaryl tin dihalides (Formula P) see Ber. 62, 996 (1929); J. Am. Chem. Soc. 49, 1369 (1927). For the preparation of dialkyl tin dihalides (Formula P) see J. Am. Chem. Soc. 47, 2568 (1925); C.A. 41, 90 (1947). For the preparation of diaryl tin oxides (Formula M) see J. Am. Chem. Soc. 48, 1054 (1926). For the preparation of tetraaryl tin compounds (Formula K) see C.A. 32, 5387 (1938). For the preparation of tin alkoxides (Formula J) see C.A. 24, 586 (1930). For the preparation of alkyl tin salts (Formula Q) see C.A. 31, 4290. For the preparation of alkyl tin compounds (Formula K and L) see C.A. 35, 2470 (1941): C.A. 33, 5357 (1939). For the preparation of mixed alkyl aryl tin (Formulas K and L) see C.A. 31, 4290 (1937): C.A. 38, 331 (1944). For the preparation of other tin compounds not covered by these citations see "Die Chemie der Metal-Organischen Verbindungen." by Krause and V. Grosse, published in Berlin, 1937, by Gebroder-Borntrager.

The tin alkoxides (Formulas I and J) and the bimetallic alkoxides (Formulas A through H) contain R substituents which can represent both straight chain and branched chain alkyl radicals, e.g. diethoxide, tetramethoxide, tetrabutoxide, tetra-tert-butoxide, tetrahexoxide, etc.

The alkyl derivatives (Formulas K and L) contain one or more alkyl radicals attached to a tin atom through a direct C—Sn linkage, e.g. dibutyl tin, dihexyl tin, tetra-butyl tin, tetraethyl tin, tetramethyl tin, dioctyl tin, etc. Two of the tetraalkyl radicals can be replaced with an oxygen atom to form compounds having Formula M, e.g. dimethyl tin oxide, diethyl tin oxide, dibutyl tin oxide, diheptyl tin oxide, etc. In one embodiment, the tin catalyst comprises dimethyl tin oxide.

Complexes can be formed by reacting dialkyl tin oxides with alkali metal alkoxides in an alcohol solution to form compounds having Formula N, which compounds are especially useful catalysts, e.g. react dibutyl tin oxide with sodium ethoxide, etc. This formula is intended to represent the reaction products described. Tin compounds containing alkyl and alkoxy radicals are also useful catalysts (see Formula O), e.g. diethyl tin diethoxide, dibutyl tin dibutoxide, dihexyl tin dimethoxide, etc.

Salts derived from dialkyl tin oxides reacted with carboxylic acids or hydrochloric acid are also of particular value as catalysts; see Formulas P and Q. Examples of these catalytic condensing agents include dibutyl tin diacetate, diethyl tin dibutyrate, dibutyl tin dilauroate, dimethyl tin dibenzoate, dibutyl tin dichloride, diethyl tin dichloride, dioctyl tin dichloride, dihexyl tin distearate, etc.

The tin compounds having Formulas K, L and M can be prepared wherein one or more of the R' radicals represents an aryl radical of the benzene series, e.g. phenyl, tolyl, benzyl, etc. Examples include diphenyl tin, tetraphenyl tin, diphenyl dibutyl tin, ditolyl diethyl tin, diphenyl tin oxide, dibenzyl tin, tetrabenzyl tin, di([B-phenylethyl) tin oxide, dibenzyl tin oxide, etc.

Examples of catalysts useful in the present invention include, but are not limited to, one of more of the following: butyltin tris-2-ethylhexanoate, dibutyltin diacetate, dibutyltin oxide, and dimethyl tin oxide.

In one embodiment, catalysts useful in the present invention include, but are not limited to, one or more of the following: butyltin tris-2-ethylhexanoate, dibutyltin diacetate, dibutyltin oxide, and dimethyl tin oxide.

Processes for preparing polyesters using tin-based catalysts are well known and described in the aforementioned U.S. Pat. No. 2,720,507.

The polyester portion of the polyester compositions useful in the invention can be made by processes known from the literature such as, for example, by processes in homogenous solution, by transesterification processes in the melt, and by two phase interfacial processes. Suitable methods include, but are not limited to, the steps of reacting one or more dicarboxylic acids with one or more glycols at a temperature of 100° C. to 315° C. at a pressure of 0.1 to 760 mm Hg for a time sufficient to form a polyester. See U.S. Pat. No. 3,772,405 for methods of producing polyesters, the disclosure regarding such methods is hereby incorporated herein by reference.

The polyester in general may be prepared by condensing the dicarboxylic acid or dicarboxylic acid ester with the glycol in the presence of the titanium catalyst and manganese catalysts described herein at elevated temperatures increased gradually during the course of the condensation up to a temperature of about 225°-310° C., in an inert atmosphere, and conducting the condensation at low pressure during the latter part of the condensation, as described in further detail in U.S. Pat. No. 2,720,507 incorporated herein by reference.

In another aspect, this invention relates to a process for preparing copolyesters of the invention. In one embodiment, the process relates to preparing copolyesters comprising terephthalic acid, 2,2,4,4-tetramethyl-1,3-cyclobutanediol, and ethylene glycol. This process comprises the steps of:

(A) heating a mixture comprising the monomers useful in the polyesters of the invention in the presence of at least one titanium catalyst and at least one manganese catalyst, and at least one phosphate ester, at a temperature of 150 to 250° C. for a time sufficient to produce an initial polyester;
(B) polycondensing the product of Step (A) by heating it at a temperature of 230 to 320° C. for 1 to 6 hours; and
(C) removing any unreacted glycols.

Reaction times for the esterification Step (A) are dependent upon the selected temperatures, pressures, and feed mole ratios of glycol to dicarboxylic acid.

In one embodiment, step (A) can be carried out until 50% by weight or more of the 2,2,4,4-tetramethyl-1,3-cyclobutanediol has been reacted. Step (A) may be carried out under pressure, ranging from 0 psig to 100 psig. The term "reaction product" as used in connection with any of the catalysts useful in the invention refers to any product of a polycondensation or esterification reaction with the catalyst and any of the monomers used in making the polyester as well as the product of a polycondensation or esterification reaction between the catalyst and any other type of additive.

In embodiments, Step (B) and Step (C) can be conducted at the same time. These steps can be carried out by methods known in the art such as by placing the reaction mixture under a pressure ranging, from 0.002 psig to below atmospheric pressure, or by blowing hot nitrogen gas over the mixture.

In one embodiment, the invention relates to a process, hereinafter referred to as "PROCESS COMPRISING MANGANESE AND TITANIUM", for making a polyester comprising the following steps:

(I) heating a mixture at least one temperature chosen from 150° C. to 250° C., under at least one pressure chosen from the range of 0 psig to 75 psig wherein said mixture comprises:
  (a) a dicarboxylic acid component comprising:
    (i) about 90 to about 100 mole % of terephthalic acid residues;
    (ii) about 0 to about 10 mole % of aromatic and/or aliphatic dicarboxylic acid residues having up to 20 carbon atoms; and
  (b) a glycol component comprising:
    (i) about 30 to 42 mole % 2,2,4,4-tetramethyl-1,3-cyclobutanediol residues; and
    (ii) about 58 to about 70 mole % ethylene glycol residues, and
    (iii) less than about 2 mole % of a modifying glycol having from 3 to 16 carbon atoms;
  wherein the molar ratio of glycol component/dicarboxylic acid component added in Step (I) is 1.01-3.0/1.0 and wherein TMCD is added in an amount from about 30 to 84 mole %, to allow for about 50 to 100% conversion of TMCD in the reaction and to arrive at a final polymer having about 30 to 42 mole % 2,2,4,4-tetramethyl-1,3-cyclobutanediol residues;
  wherein the mixture in Step (I) is heated in the presence of:
    (i) at least one catalyst comprising at least one titanium compound and at least one manganese compound; and (ii) at least one phosphorus compound, reaction products thereof, and mixtures thereof;
(II) heating the product of Step (I) at a temperature of 230° C. to 320° C. for 1 to 6 hours, under at least one pressure chosen from the range of the final pressure of Step (I) to 0.02 torr absolute, to form a final polyester;

wherein the total mole % of the dicarboxylic acid component of the final polyester is 100 mole %; and
wherein the total mole % of the glycol component of the final polyester is 100 mole %; and
wherein the inherent viscosity of the polyester is from 0.50 to 0.70 dL/g as determined in 60/40 (wt/wt) phenol/tetrachloroethane at a concentration of 0.25 g/50 ml at 25° C.

In the processes of the invention referred to as "PROCESS COMPRISING MANGANESE AND TITANIUM", at least one phosphorus compound, for example, at least one phosphate ester, can be added to Step (I), Step (II) and/or Steps (I) and (II) and/or after Steps (I) and/or (II). In certain embodiments, at least one phosphorus compound can be added to only Step (I) or only Step (II).

In embodiments of the invention, at least one phosphorus compound, reaction products thereof, and mixtures thereof can be added either during esterification, polycondensation, or both and/or it can be added post-polymerization. In one embodiment, the phosphorus compound useful in any of the processes of the invention can be added during esterificaton. In one embodiment, if the phosphorus compound added after both esterification and polycondensation, it is added in the amount of 0 to 2 weight % based on the total weight of the final polyester. In one embodiment, if the phosphorus compound added after both esterification and polycondensation, it is added in the amount of 0.01 to 2 weight % based on the total weight of the final polyesterin one embodiment, the phosphorus compound can comprise at least one phosphate ester. In one embodiment, the phosphorus compound can comprise at least one phosphorus compound which is added during the esterificaton step. In one embodiment, the phosphorus compound can comprise at least one phosphate ester, for example, which is added during the esterificaton step.

It is believed that the processes of making the polyesters described herein may be used to make the polyesters useful in the invention.

Reaction times for the esterification Step (I) of any of the processes of the invention are dependent upon the selected temperatures, pressures, and feed mole ratios of glycol to dicarboxylic acid.

In one embodiment, the pressure used in Step (II) of any of the processes of the invention consists of at least one pressure chosen from 20 torr absolute to 0.02 torr absolute; in one embodiment, the pressure used in Step (II) of any of the processes of the invention consists of at least one pressure chosen from 10 torr absolute to 0.02 torr absolute; in one embodiment, the pressure used in Step (II) of any of the processes of the invention consists of at least one pressure chosen from 5 torr absolute to 0.02 torr absolute; in one embodiment, the pressure used in Step (II) of any of the processes of the invention consists of at least one pressure chosen from 3 torr absolute to 0.02 torr absolute; in one embodiment, the pressure used in Step (II) of any of the processes of the invention consists of at least one pressure chosen from 20 torr absolute to 0.1 torr absolute; in one embodiment, the pressure used in Step (II) of any of the processes of the invention consists of at least one pressure chosen from 10 torr absolute to 0.1 torr absolute; in one embodiment, the pressure used in Step (II) of any of the processes of the invention consists of at least one pressure chosen from 5 torr absolute to 0.1 torr absolute; in one embodiment, the pressure used in Step (II) of any of the processes of the invention consists of at least one pressure chosen from 3 torr absolute to 0.1 torr absolute.

In one embodiment, the molar ratio of glycol component/dicarboxylic acid component added in Step (I) of a process of the invention is 1.0-2.0/1.0; in one embodiment, the molar ratio of glycol component/dicarboxylic acid component added in Step (I) of a process of the invention is 1.01-2.0/1.0; in one embodiment, the molar ratio of glycol component/dicarboxylic acid component added in Step (I) of a process of the invention is 1.01-1.75/1.0; in one embodiment, the molar ratio of glycol component/dicarboxylic acid component added in Step (I) of a process of the invention is 1.01-1.7/1.0; in one embodiment, the molar ratio of glycol component/dicarboxylic acid component added in Step (I) of a process of the invention is 1.01-1.5/1.0; in one embodiment, the molar ratio of glycol component/dicarboxylic acid component added in Step (I) of a process of the invention is 1.01-1.2/1.0.

In embodiments of the invention for the process for making the polyesters, the heating time of Step (II) may be from 1 to 5 hours or 1 to 4 hours or 1 to 3 hours or 1.5 to 3 hours or 1 to 2 hours. In one embodiment, the heating time of Step (II) can be from 1.5 to 3 hours.

In one aspect, the polyesters, polyester compositions and/or processes of the invention useful in the invention can comprise phosphorus atoms, manganese atoms, and titanium atoms.

In one embodiment, the polyester(s), polyester compositions and/or processes of making the polyesters useful in the invention may comprise at least one manganese compound, at least one titanium compound, and at least one phosphorus compound.

In one embodiment, the addition of the phosphorus compound(s) in the process(es) of the invention can result in a weight ratio of total phosphorus atoms to total manganese and titanium atoms in the final polyester of 0.1-5:1. In embodiments of the invention, phosphorus is present in a weight ratio of total phosphorus atoms to total manganese and titanium atoms in the final polyester of 0.1-2.0:1, or 0.1-1.5:1, or 0.1-1.0:1, or 0.15-2.0:1, or 0.15-1.0:1, or 0.2-1.0:1, or 0.2-0.9:1.

In one embodiment, the amount of manganese atoms in the polyesters useful in the invention can be from 10 to 100 ppm manganese atoms based on the weight of the final polyester.

In one embodiment, the amount of titanium atoms in the polyesters useful in the invention can be from 10 to 60 ppm titanium atoms based on the weight of the final polyester.

In one embodiment, the amount of phosphorus atoms in the polyesters useful in the invention can be from 10 to 200 ppm phosphorus atoms based on the weight of the final polyester.

The invention further relates to the polyester compositions made by the process(es) described above.

In embodiments of the invention, certain agents which colorize the polymer can be added to the melt. In one embodiment, a bluing toner is added to the melt in order to reduce the b* of the resulting polyester polymer melt phase product. Such bluing agents include blue inorganic and organic toner(s). In addition, red toner(s) can also be used to adjust the a* color. Organic toner(s), e.g., blue and red organic toner(s), such as those toner(s) described in U.S. Pat. Nos. 5,372,864 and 5,384,377, which are incorporated by reference in their entirety, can be used. The organic toner(s) can be fed as a premix composition. The premix composition may be a neat blend of the red and blue compounds or the composition may be pre-dissolved or slurried in one of the polyester's raw materials, e.g., ethylene glycol.

The total amount of toner components added can depend on the amount of inherent yellow color in the base polyester and the efficacy of the toner. In one embodiment, a concentration of up to about 15 ppm of combined organic toner components and a minimum concentration of about 0.5 ppm are used. In one embodiment, the total amount of bluing additive can range from 0.5 to 10 ppm. In an embodiment, the toner(s) can be added to the esterification zone or to the polycondensation zone. Preferably, the toner(s) are added to the esterification zone or to the early stages of the polycondensation zone, such as to a prepolymerization reactor.

The invention further relates to a polymer blend. In embodiments, the blend comprises:
(a) from 5 to 95 weight % of at least one of the polyesters described above; and
(b) from 5 to 95 weight % of at least one of the polymeric components.

Suitable examples of the polymeric components include, but are not limited to, nylon; polyesters different than those described herein such as PET; polyamides such as ZYTEL® from DuPont; polystyrene; polystyrene copolymers; styrene acrylonitrile copolymers; acrylonitrile butadiene styrene copolymers; poly(methylmethacrylate); acrylic copolymers; poly(ether-imides) such as ULTEM® (a poly(ether-imide) from General Electric); polyphenylene oxides such as poly (2,6-dimethylphenylene oxide) or poly(phenylene oxide)/polystyrene blends such as NORYL 1000® (a blend of poly(2,6-dimethylphenylene oxide) and polystyrene resins from General Electric); polyphenylene sulfides; polyphenylene sulfide/sulfones; poly(ester-carbonates); polycarbonates such as LEXAN® (a polycarbonate from General Electric); polysulfones; polysulfone ethers; and poly(ether-ketones) of aromatic dihydroxy compounds; or mixtures of any of the foregoing polymers. The blends can be prepared by conventional processing techniques known in the art, such as melt blending or solution blending.

In embodiments, the polyester compositions and the polymer blend compositions can also contain from 0.01 to 25% by weight of the overall composition common additives such as colorants, toner(s), dyes, mold release agents, flame retardants, plasticizers, nucleating agents, stabilizers, including but not limited to, UV stabilizers, thermal stabilizers other than the phosphorus compounds describe herein, and/or reaction products thereof, fillers, and impact modifiers. Examples of commercially available impact modifiers include, but are not limited to, ethylene/propylene terpolymers, functionalized polyolefins such as those containing methyl acrylate and/or glycidyl methacrylate, styrene-based block copolymeric impact modifiers, and various acrylic core/shell type impact modifiers. Residues of such additives are also contemplated as part of the polyester composition.

Reinforcing materials may be added to the compositions of this invention. The reinforcing materials may include, but are not limited to, carbon filaments, silicates, mica, clay, talc, titanium dioxide, Wollastonite, glass flakes, glass beads and fibers, and polymeric fibers and combinations thereof. In one embodiment, the reinforcing materials include glass, such as, fibrous glass filaments, mixtures of glass and talc, glass and mica, and glass and polymeric fibers.

In one aspect, the invention relates to thermoplastic articles comprising the polyester compositions and/or polymer blends of the invention. In certain embodiments, the invention relates to film(s) and/or sheets comprising the polyester compositions and/or polymer blends of the invention. Methods of forming the polyesters and/or blends into film(s) and/or sheet(s) are well known in the art. Examples of film(s) and/or sheet(s) of the invention can include, without limitation, extruded film(s) and/or sheet(s), calendered film(s) and/or sheet(s), compression molded film(s) and/or sheet(s), solution casted film(s) and/or sheet(s), shrink films, pressure sensitive labels, stretched or stretchable films or sheets, uniaxially or biaxially oriented films, and/or multiwall films or sheets. Methods of making film and/or sheet include but are not limited to extrusion, calendering, compression molding, and solution casting.

In one embodiment, polyester compositions containing TMCD and EG that provide improved calendering processes without the need for a branching monomer or branching agent are provided. In embodiments, the polyester compositions for calendering comprise: (a) at least one polyester comprising diacid residues, diol residues in which the polyester has a crystallization half time of at least 5 minutes and an inherent viscosity of about 0.50 to about 0.80 dL/g: and (b) at least one release additive effective to prevent sticking of the polyester to calendering rolls. It is believed the polyester compositions of the present disclosure have an unexpected combination of excellent melt strength and melt viscosity with a good shear response that allows higher calendering line speeds before melt fracture occurs. Higher calendering line speeds, in turn, provides for more economical production of polyester sheet or film in commercial applications. In various embodiments, any of the types and/or amounts of diacid residues and diol residues discussed herein can be used for the polyester calendering compositions. In one embodiment, the polyester calendering composition does not contain any branching monomers or agents.

In one aspect, the invention relates to injection molded and/or blow molded articles comprising the polyester compositions and/or polymer blends of the invention.

In embodiments of the invention, certain polyesters and/or polyester compositions of the invention can have a unique combination of all of the following properties: certain notched Izod impact strength, certain inherent viscosities, certain glass transition temperature ($T_g$), certain flexural modulus, good clarity, good color, and good dishwasher durability and mechanical properties.

In one embodiment, the processes of making the polyesters useful in the invention can comprise a batch or continuous process.

In one embodiment, the processes of making the polyesters useful in the invention comprise a continuous process.

In embodiments of the invention, the $T_g$ of the polyesters can be chosen from one of the following ranges: 95 to 110° C.; 97 to 108° C.; 97 to 106° C.; 100 to 110° C.; 100 to 108° C.; 100 to 106° C.; 102 to 110° C.; 102 to 108° C.; 102 to 106° C.; 103 to 110° C.; 103 to 108° C.; 103 to 107° C.; 103 to 106° C.; 104 to 110° C.; 104 to 108° C., 104 to 107° C.; 104 to 106° C., and about 105° C.

In aspects of the invention, the glycol component for the polyesters includes but is not limited to at least one of the following combinations of ranges: 30 to 45 mole % 2,2,4,4-tetramethyl-1,3-cyclobutanediol and 55 to 70 mole % ethylene glycol; 32 to 45 mole % 2,2,4,4-tetramethyl-1,3-cyclobutanediol and 55 to 68 mole % ethylene glycol; 32 to 42 mole % 2,2,4,4-tetramethyl-1,3-cyclobutanediol and 58 to 68 mole % ethylene glycol; 32 to 38 mole % 2,2,4,4-tetramethyl-1,3-cyclobutanediol and 64 to 68 mole % ethylene glycol; 33 to 41 mole % 2,2,4,4-tetramethyl-1,3-cyclobutanediol and 59 to 67 mole % ethylene glycol; 34 to 40 mole % 2,2,4,4-tetramethyl-1,3-cyclobutanediol and 60 to 66 mole % ethylene glycol; greater than 34 to 40 mole % 2,2,4,4-tetramethyl-1,3-cyclobutanediol and 60 to less than 66 mole % ethylene glycol; 34.2 to 40 mole % 2,2,4,4- tetramethyl-1,3-cyclobutanediol and 60 to 65.8 mole % ethylene glycol; 35 to 39 mole % 2,2,4,4-tetramethyl-1,3-cyclobutanediol and 61 to 65 mole % ethylene glycol; 35 to 38 mole % 2,2,4,4-tetramethyl-1,3-cyclobutanediol and 62 to 65 mole % ethylene glycol; 36 to 37 mole % 2,2,4,4-tetramethyl-1,3-cyclobutanediol and 63 to 64 mole % ethylene glycol.

For embodiments of the invention, the polyesters useful in the invention may exhibit at least one of the following inherent viscosities as determined in 60/40 (wt/wt) phenol/tetrachloroethane at a concentration of 0.25 g/50 ml at 25° C.: 0.50 to 0.70 dL/g; 0.52 to 0.68 dL/g; 0.53 to 0.67 dL/g; 0.54 to 0.66 dL/g; 0.55 to 0.65 dL/g; 0.56 to 0.65 dL/g; 0.51 to 0.65 dL/g; 0.52 to 0.65 dL/g; 0.53 to 0.65 dL/g; 0.57 to 0.65 dL/g; 0.57 to 0.64 dL/g; 0.57 to 0.63 dL/g; 0.57 to 0.62 dL/g; 0.57 to 0.61 dL/g.

In embodiments of the invention, the polyesters may exhibit at least one of the following inherent viscosities as determined in 60/40 (wt/wt) phenol/tetrachloroethane at a concentration of 0.25 g/50 ml at 25° C.: 0.51 to 0.65 dL/g; 0.52 to 0.65 dL/g; 0.53 to 0.65 dL/g; 0.54 to 0.65 dL/g; 0.55 to 0.62 dL/g; 0.57 to 0.62 dL/g; about 0.59 dL/g.

It is contemplated that compositions useful in the invention can possess at least one of the inherent viscosity ranges described herein and at least one of the monomer ranges for the compositions described herein unless otherwise stated. It is also contemplated that compositions useful in the invention can possess at least one of the $T_g$ ranges described herein and at least one of the monomer ranges for the compositions described herein unless otherwise stated. It is also contemplated that compositions useful in the invention can possess at least one of the inherent viscosity ranges described herein, at least one of the $T_g$ ranges described herein, and at least one of the monomer ranges for the compositions described herein unless otherwise stated.

In embodiments of the invention, the polyester can comprise: a glycol component that includes 31 to 42 mole % 2,2,4,4-tetramethyl-1,3-cyclobutanediol and 58 to 70 mole % ethylene glycol, an inherent viscosity of 0.51 to 0.65 dL/g, a $T_g$ of 100 to 110° C., a b* value less than 7.5, or less than 5.0, and an L* values of 90 or greater, or greater than 90; or a glycol component that includes 33 to 41 mole % 2,2,4,4-tetramethyl-1,3-cyclobutanediol and 59 to 67 mole % ethylene glycol, an inherent viscosity of 0.51 to 0.65 dL/g, a $T_g$ of 100 to 110° C., a b* value less than 7.2, or less than 5.0, and an L* values of 90 or greater, or greater than 90; or a glycol component that includes 35 to 41 mole % 2,2,4,4-tetramethyl-1,3-cyclobutanediol and 59 to 65 mole % ethylene glycol, an inherent viscosity of 0.51 to 0.65 dig, a $T_g$ of 102 to 110° C., a b* value less than 7.2, or less than 5.0, and an L* values of 90 or greater, or greater than 90.

The glass transition temperature ($T_g$) of the polyesters is determined using a TA DSC 2920 from Thermal Analyst Instrument at a scan rate of 20° C./min.

Because of the long crystallization half-times (e.g., greater than 5 minutes) at 170° C. exhibited by certain polyesters useful in the present invention, it can be possible to produce articles, including but not limited to, injection molded parts, injection blow molded articles, injection stretch blow molded articles, extruded film, extruded sheet, calendered film, shrink films, pressure sensitive labels, stretched or stretchable films or sheets, uniaxially or biaxially oriented films, multiwall films or sheets, extrusion blow molded articles, extrusion stretch blow molded articles, and fibers. A thermoformable sheet is an example of an article of manufacture provided by this invention. The polyesters of the invention can be amorphous or semicrystalline. In one aspect, certain polyesters useful in the invention can have relatively low crystallinity. Certain polyesters useful in the invention can thus have a substantially amorphous morphology, meaning that the polyesters comprise substantially unordered regions of polymer.

In certain embodiments, the b* values for the polyesters useful in the invention can be from −12 to less than 12 and the L* values can be from greater than 80, or greater than 85, or greater than 90, or greater than 91, or greater than 92, or greater than 93, or greater than 94, or greater than 95. In other embodiments, the b* values for the polyesters useful in the invention can be present in one of the following ranges: from −10 to 10; −10 to less than 10; −10 to 9; −10 to 8; −10 to 7; −10 to 6; −10 to 5; −10 to 4; −10 to 3; −10 to 2; from −5 to 9; −5 to 8; −5 to 7; −5 to 6; −5 to 5; −5 to 4; −5 to 3; −5 to 2; 0 to 9; 0 to 8; 0 to 7; 0 to 6; 0 to 5; 0 to 4; 0 to 3; 0 to 2; 1 to 10; 1 to 9; 1 to 8; 1 to 7; 1 to 6; 1 to 5; 1 to 4; 1 to 3; and 1 to 2. In other embodiments, the L* value for the polyesters useful in the invention can be present in one of the following ranges: 80 to 98; 85 to 98; 90 to 98; greater than 90 to 98; 91 to 98; 92 to 98; 93 to 98; 94 to 98; 95 to 98; 91 to 97; 92 to 97; 93 to 97; 94 to 97; 95 to 97; 91 to 96; 92 to 96; 93 to 96; or 94 to 96.

Notched Izod impact strength, as described in ASTM D256, is a common method of measuring toughness. Notched Izod impact strength is measured herein at 23° C. with a 10-mil notch in a 3.2 mm (⅛-inch) thick bar determined according to ASTM D256. In one embodiment, certain polyesters useful in the invention can exhibit a notched Izod impact strength of at least 30 J/m (0.56 ft-lb/in) at 23° C. with a 10-mil notch in a 3.2 mm (⅛-inch) thick bar determined according to ASTM D256. In one embodiment, certain polyesters useful in the invention can exhibit a notched Izod impact strength of from about 30 J/m (0.56 ft-lb/in) to about 80 J/m (1.50 ft-lb/in) at 23° C. with a 10-mil notch in a 3.2 mm (⅛-inch) thick bar determined according to ASTM D256.

In one embodiment, certain polyesters useful in the invention can exhibit at least one of the following densities: a density of greater than 1.2 g/ml at 23° C.

In one embodiment, certain polyesters useful in the invention can exhibit a flexural modulus at 23° C. equal to or greater than 2000 MPa (about 290,000 psi) as defined by ASTM D790. In another embodiment, certain polyesters useful in the invention can exhibit a flexural modulus at 23° C. from about 2000 MPa (about 290,000 psi) to about 2750 MPa (about 400,000 psi) as defined by ASTM D790. In another embodiment, certain polyesters useful in the invention can exhibit a flexural modulus at 23° C. from about 2200 MPa (319,000 psi) to about 2600 MPa (377,100 psi) as defined by ASTM D790.

Certain polyesters useful in the invention can possess at least one of the following properties: a $T_g$ of from about 100 to about 110° C. as measured by a TA 2100 Thermal Analyst Instrument at a scan rate of 20° C./min; a flexural modulus at 23° C. equal to or greater than 2000 MPa (about 290,000 psi), or greater than 2200 MPa (319,000 psi), as defined by ASTM D790; and a notched Izod impact strength equal to or greater than 30 J/m (0.56 ft-lb/in) according to ASTM D256 with a 10-mil notch using a ⅛-inch thick bar at 23° C.

Other polyesters useful in the invention can possess at least one of the following properties: a $T_g$ of from about 100 to about 110° C. as measured by a TA 2100 Thermal Analyst Instrument at a scan rate of 20° C./min; a flexural modulus at 23° C. from about 2200 MPa (319,000 psi) to about 2600 MPa (377,100 psi) as defined by ASTM D790; and a notched Izod impact strength of about 30 J/m (0.56 ft-lb/in)

to about 80 J/m (1.50 ft-lb/in) according to ASTM D256 with a 10-mil notch using a ⅛-inch thick bar at 23° C.

In one embodiment, the melt viscosity of the polyester(s) useful in the invention can be less than 30,000 poise as measured a 1 radian/second on a rotary melt rheometer at 290° C. In another embodiment, the melt viscosity of the polyester(s) useful in the invention can be less than 20,000 poise as measured a 1 radian/second on a rotary melt rheometer at 290° C.

In one embodiment, the melt viscosity of the polyester(s) useful in the invention can be less than 15,000 poise as measured at 1 radian/second (rad/sec) on a rotary melt rheometer at 290° C. In one embodiment, the melt viscosity of the polyester(s) useful in the invention can be less than 12,000 poise as measured at 1 radian/second (rad/sec) on a rotary melt rheometer at 290° C. In one embodiment, the melt viscosity of the polyester(s) useful in the invention in can be less than 10,000 poise as measured at 1 radian/second (rad/sec) on a rotary melt rheometer at 290° C.

In some embodiments, use of the polyester compositions useful in the invention minimizes and/or eliminates the drying step prior to melt processing and/or thermoforming.

In certain embodiments, the polyester compositions and/or polymer blends of the invention can be used in one or more of the following applications: graphic arts film, multiwall film or sheets, extruded articles, appliance parts, and glass laminates.

Graphic art films can be used in a variety of applications, such as, for example, in-mold decorated articles, embossed articles, hard-coated articles. The graphic art film can be smooth or textured.

Multiwall film or sheet refers to sheet extruded as a profile consisting of multiple layers that are connected to each other by means of vertical ribs. Examples of multiwall film or sheet include but are not limited to outdoor shelters (for example, greenhouses and commercial canopies).

Examples of extruded articles comprising the polyester compositions useful in this invention include, but are not limited to, profile extruded tubing or channels, extrusion blow molded bottles, thermoformed sheet, film for graphic arts applications, outdoor signs, skylights, multiwall film, plastic film for plastic glass laminates, and liquid crystal display (LCD) films, including but not limited to, diffuser sheets, compensation films, and protective films for LCDs.

In one embodiment, the present invention comprises a thermoplastic article, typically in the form of sheet material, having a decorative material embedded therein which comprise any of the compositions described herein.

"Outdoor sign," as used herein, refers to a surface formed from the polyester described herein, or containing symbols (e.g., numbers, letters, words, pictures, etc.), patterns, or designs coated with the polyester or polyester film described herein. In one embodiment, the outdoor sign comprises a polyester containing printed symbols, patterns, or designs. In one embodiment, the sign is capable of withstanding typical weather conditions, such as rain, snow, ice, sleet, high humidity, heat, wind, sunlight, or combinations thereof, for a sufficient period of time, e.g., ranging from one day to several years or more.

"Appliance parts," as used herein, refers to a rigid piece used in conjunction with an appliance. In one embodiment, the appliance part is partly or wholly separable from the appliance. In another embodiment, the appliance part is one that is typically made from a polymer. In one embodiment, the appliance part is visually clear.

Exemplary appliance parts include those requiring toughness and durability, such as cups and bowls used with food processers, mixers, blenders, and choppers; parts that can withstand refrigerator and freezer temperatures (e.g., refrigerator temperatures ranging from greater than 0° C. (e.g., 2° C.) to 5° C., or freezer temperatures, e.g., at temperatures less than 0° C., such as temperatures ranging from −20 to 0° C., e.g., −18° C.), such as refrigerator and freezer trays, bins, and shelves; parts having sufficient hydrolytic stability at temperatures up to 90° C., such as washing machine doors, steam cleaner canisters, tea kettles, and coffee pots; and vacuum cleaner canisters and dirt cups.

In one embodiment, these appliance parts have at least one property chosen from toughness, clarity, chemical resistance, $T_g$, hydrolytic stability, and dishwasher stability. The appliance part can also be chosen from steam cleaner canisters, which, in one embodiment, can have at least one property chosen from toughness, clarity, chemical resistance, $T_g$, and hydrolytic stability.

In one embodiment, the polyesters useful in the appliance part has a $T_g$ of 105 to 140° C.

For the purposes of this invention, the term "wt" means "weight".

The following examples further illustrate how the polyesters of the invention can be made and evaluated, and are intended to be purely exemplary of the invention and are not intended to limit the scope thereof. Unless indicated otherwise, parts are parts by weight, temperature is in degrees C. or is at room temperature, and pressure is at or near atmospheric.

EXAMPLES

The following examples illustrate in general how copolyesters of this invention are prepared and the effect of using 2,2,4,4-tetramethyl-1,3-cyclobutanediol and ethylene glycol, and certain catalyst and stabilizers, on various copolyester properties such as color and IV.

Measurement Methods

The inherent viscosity of the polyesters was determined in 60/40 (wt/wt) phenol/tetrachloroethane at a concentration of 0.5 g/100 ml at 25° C., and is reported in dL/g.

The glycol content and the cis/trans ratio of the compositions were determined by proton nuclear magnetic resonance (NMR) spectroscopy. All NMR spectra were recorded on a JEOL Eclipse Plus 600 MHz nuclear magnetic resonance spectrometer using either chloroform-trifluoroacetic acid (70-30 volume/volume) for polymers or, for oligomeric samples, 60/40 (wt/wt) phenol/tetrachloroethane with deuterated chloroform added for lock. Peak assignments for 2,2,4,4-tetramethyl-1,3-cyclobutanediol resonances were made by comparison to model mono- and dibenzoate esters of 2,2,4,4-tetramethyl-1,3-cyclobutanediol. These model compounds closely approximate the resonance positions found in the polymers and oligomers.

Color values reported herein are CIELAB L*, a*, and b* values measured following ASTM D 6290-98 and ASTM E308-99, using measurements from a Hunter Lab Ultrascan XE Spectrophotometer (Hunter Associates Laboratory Inc., Reston, Va.) with the following parameters: (1) D65 illuminant, (2) 10 degree observer, (3) reflectance mode with specular angle included, (4) large area view, (5) 1" port size. Unless stated otherwise, the measurements were performed on polymer granules ground to pass a 1 mm sieve.

The amount of tin (Sn), titanium (Ti) and manganese (Mn) in the examples below is reported in parts per million (ppm) of metal and was measured by x-ray fluorescence (xrf) using a PANanalytical Axios Advanced wavelength dispersive x-ray fluorescence spectrometer. The amount of phosphorus is similarly reported as ppm of elemental phosphorus and was also measured by xrf using the same instrument. The values reported in the column "P measured" in the following examples were obtained by measuring phosphorus as described above.

Unless otherwise specified, the cis/trans ratio of the 2,2,4,4-tetramethyl-1,3-cyclobutanediol used in the following examples was approximately 50/50 and could range from 45/55 to 55/45.

The dimethyl terephthalate (DMT) was purchased from Cape Industries, the ethylene glycol (EG), and the 2,2,4,4-tetramethyl-1,3-cyclobutanediol (TMCD) were from Eastman Chemical Company. The tin compound was butyltin tris (2-ethylhexanoate) purchased from Aldrich. The titanium compound was titanium (IV) isopropoxide purchased from Aldrich. The phosphorus compound was Merpol A from Stepan Co. Unless otherwise indicated below, the source of phosphorus was added upfront, with the rest of the polyester reagents. A solution was made with titanium isopropoxide and EG to facilitate the addition of Ti catalyst. The concentration of the Ti catalyst solution was 0.92 wt atomic Ti/vol %. A solution was made with butyltin tris(2-ethylhexanoate) and n-butanol to facilitate the addition of Sn catalyst. The concentration of the Sn catalyst solution was 1.57 atomic Sn/vol %. A solution was made with Merpol A and EG to facilitate the addition of phosphorus stabilizer. The concentration of the P stabilizer solution was 0.22 atomic P/vol %.

Example 1a (Sn and Ti)

A mixture of 77.68 g (0.4 mol) of DMT, 42.51 g (0.68 mol) of EG, and 16.61 g (0.12 mol) of TMCD, was placed in a 500-milliliter flask equipped with an inlet for nitrogen, a metal stirrer, and a short distillation column. In addition, 0.22 ml of the Ti catalyst solution (targeting 25 ppm Ti), 0.08 ml of the Sn catalyst solution (targeting 15 ppm Sn), and 1.51 ml of the P stabilizer solution (targeting 40 ppm P) were added to the flask. The flask was placed in a Wood's metal bath already heated to 200° C. The stirring speed was set to 200 RPM at the beginning of the experiment. The contents of the flask were heated at 200° C. for 5 minutes and then the temperature was gradually increased to 275° C. over 240 minutes. The reaction mixture was then held at 275° C. for 20 minutes as the stirrer was slowed down to 100 rpm and a vacuum was gradually applied to 0.3 torr. The temperature of 275° C., vacuum of 0.3 torr, and stirring at 100 rpm was maintained for a total time of 100 minutes to remove excess unreacted diols. After 100 minutes, the run was complete and the polymer was allowed to cool and later removed from the reaction flask. The polymer was ground to 1 mm. The actual catalyst amounts were determined and shown in Table 1. The mol % TMCD in the polymer and b* of the ground polymer is shown in Table 2. The % TMCD incorporation reported in Table 2 was determined by taking the mol % TMCD in the polymer divided by the (mol of TMCD charged/DMT charged). For example 1a that would be 16.9/(0.12/0.40) resulting in 58.6%. The resulting polymer IV is also reported in Table 2.

Example 1b (Ti Only)

A mixture of 77.68 g (0.4 mol) of DMT, 42.51 g (0.68 mol) of EG, and 16.61 g (0.12 mol) of TMCD, was placed in a 500-milliliter flask equipped with an inlet for nitrogen, a metal stirrer, and a short distillation column. In addition, 0.29 ml of the Ti catalyst solution (targeting 32 ppm Ti) and 1.51 ml of the P stabilizer solution (targeting 40 ppm P) were added to the flask. The choice of 32 ppm Ti was to give the equivalent molar concentration of the total catalyst used in experiment 1a. The flask was placed in a Wood's metal bath already heated to 200° C. The stirring speed was set to 200 RPM at the beginning of the experiment. The contents of the flask were heated at 200° C. for 5 minutes and then the temperature was gradually increased to 275° C. over 240 minutes. The reaction mixture was then held at 275° C. for 20 minutes as the stirrer was slowed down to 100 rpm and a vacuum was gradually applied to 0.3 torr. The temperature of 275° C., vacuum of 0.3 torr, and stirring at 100 rpm was maintained for a total time of 100 minutes to remove excess unreacted diols. After 100 minutes, the run was complete and the polymer was allowed to cool and later removed from the reaction flask. The polymer was ground to 1 mm. The actual catalyst amounts were determined and shown in Table 1. The mol % TMCD in the polymer and b* of the ground polymer is shown in Table 2. The % TMCD incorporation reported in Table 2 was determined by taking the mol % TMCD in the polymer divided by the (mol of TMCD charged/DMT charged). The resulting polymer IV is also reported in Table 2.

Example 1c (Sn Only)

A mixture of 77.68 g (0.4 mol) of DMT, 42.51 g (0.68 mol) of EG, and 16.61 g (0.12 mol) of TMCD, was placed in a 500-milliliter flask equipped with an inlet for nitrogen, a metal stirrer, and a short distillation column. In addition, 0.41 ml of the Sn catalyst solution (targeting 77 ppm Sn), and 1.51 ml of the P stabilizer solution (targeting 40 ppm P) were added to the flask. The choice of 77 ppm Sn was to give the equivalent molar concentration of the total catalyst used in experiment 1a. The flask was placed in a Wood's metal bath already heated to 200° C. The stirring speed was set to 200 RPM at the beginning of the experiment. The contents of the flask were heated at 200° C. for 5 minutes and then the temperature was gradually increased to 275° C. over 240 minutes. The reaction mixture was then held at 275° C. for 20 minutes as the stirrer was slowed down to 100 rpm and a vacuum was gradually applied to 0.3 torr. The temperature of 275° C., vacuum of 0.3 torr, and stirring at 100 rpm was maintained for a total time of 100 minutes to remove excess unreacted diols. After 100 minutes, the run was complete and the polymer was allowed to cool and later removed from the reaction flask. The polymer was ground to 1 mm. The actual catalyst amounts were determined and shown in Table 1. The mol % TMCD in the polymer and b* of the ground polymer is shown in Table 2. The % TMCD incorporation reported in Table 2 was determined by taking the mol % TMCD in the polymer divided by the (mol of TMCD charged/DMT charged). The resulting polymer IV is also reported in Table 2.

Example 2a (Sn and Ti)

A mixture of 77.68 g (0.4 mol) of DMT, 38.53 g (0.62 mol) of EG, and 25.84 g (0.18 mol) of TMCD, was placed in a 500-milliliter flask equipped with an inlet for nitrogen, a metal stirrer, and a short distillation column. In addition, 0.23 ml of the Ti catalyst solution (targeting 25 ppm Ti), 0.08 ml of the Sn catalyst solution (targeting 15 ppm Sn), and 1.56 ml of the P stabilizer solution (targeting 40 ppm P) were added to the flask. The flask was placed in a Wood's metal bath already heated to 200° C. The stirring speed was set to 200 RPM at the beginning of the experiment. The contents of the flask were heated at 200° C. for 5 minutes and then the temperature was gradually increased to 275° C. over 240 minutes. The reaction mixture was then held at 275° C. for 20 minutes as the stirrer was slowed down to 100 rpm and a vacuum was gradually applied to 0.3 torr. The temperature of 275° C., vacuum of 0.3 torr, and stirring at 100 rpm was maintained for a total time of 100 minutes to remove excess unreacted diols. After 100 minutes, the run was complete and the polymer was allowed to cool and later removed from the reaction flask. The polymer was ground to 1 mm. The actual catalyst amounts were determined and shown in Table 1. The mol % TMCD in the polymer and b* of the ground polymer is shown in Table 2. The % TMCD incorporation reported in Table 2 was determined by taking the mol % TMCD in the polymer divided by the (mol of TMCD charged/DMT charged). For example 2a that would be 27.2/(0.18/0.40) resulting in 60.6%. The resulting polymer IV is also reported in Table 2.

Example 2b (Ti Only)

A mixture of 77.68 g (0.4 mol) of DMT, 38.53 g (0.62 mol) of EG, and 25.84 g (0.18 mol) of TMCD, was placed in a 500-milliliter flask equipped with an inlet for nitrogen, a metal stirrer, and a short distillation column. In addition, 0.30 ml of the Ti catalyst solution (targeting 32 ppm Ti) and 1.56 ml of the P stabilizer solution (targeting 40 ppm P) were added to the flask. The choice of 32 ppm Ti was to give the equivalent molar concentration of the total catalyst used in experiment 2a. The flask was placed in a Wood's metal bath already heated to 200° C. The stirring speed was set to 200 RPM at the beginning of the experiment. The contents of the flask were heated at 200° C. for 5 minutes and then the temperature was gradually increased to 275° C. over 240 minutes. The reaction mixture was then held at 275° C. for 20 minutes as the stirrer was slowed down to 100 rpm and a vacuum was gradually applied to 0.3 torr. The temperature of 275° C., vacuum of 0.3 torr, and stirring at 100 rpm was maintained for a total time of 100 minutes to remove excess unreacted diols. After 100 minutes, the run was complete and the polymer was allowed to cool and later removed from the reaction flask. The polymer was ground to 1 mm. The actual catalyst amounts were determined and shown in Table 1. The mol % TMCD in the polymer and b* of the ground polymer is shown in Table 2. The % TMCD incorporation reported in Table 2 was determined by taking the mol % TMCD in the polymer divided by the (mol of TMCD charged/DMT charged). The resulting polymer IV is also reported in Table 2.

Example 2c (Sn Only)

A mixture of 77.68 g (0.4 mol) of DMT, 38.83 g (0.62 mol) of EG, and 25.84 g (0.18 mol) of TMCD, was placed in a 500-milliliter flask equipped with an inlet for nitrogen, a metal stirrer, and a short distillation column. In addition, 0.42 ml of the Sn catalyst solution (targeting 77 ppm Sn), and 1.56 ml of the P stabilizer solution (targeting 40 ppm P) were added to the flask. The choice of 77 ppm Sn was to give the equivalent molar concentration of the total catalyst used in experiment 2a. The flask was placed in a Wood's metal bath already heated to 200° C. The stirring speed was set to 200 RPM at the beginning of the experiment. The contents of the flask were heated at 200° C. for 5 minutes and then the temperature was gradually increased to 275° C. over 240 minutes. The reaction mixture was then held at 275° C. for 20 minutes as the stirrer was slowed down to 100 rpm and a vacuum was gradually applied to 0.3 torr. The temperature of 275° C., vacuum of 0.3 torr, and stirring at 100 rpm was maintained for a total time of 100 minutes to remove excess unreacted diols. After 100 minutes, the run was complete and the polymer was allowed to cool and later removed from the reaction flask. The polymer was ground to 1 mm. The actual catalyst amounts were determined and shown in Table 1. The mol % TMCD in the polymer and b* of the ground polymer is shown in Table 2. The % TMCD incorporation reported in Table 2 was determined by taking the mol % TMCD in the polymer divided by the (mol of TMCD charged/DMT charged). The resulting polymer IV is also reported in Table 2.

Example 3a (Sn and Ti)

A mixture of 77.68 g (0.4 mol) of DMT, 34.56 g (0.56 mol) of EG, and 35.07 g (0.24 mol) of TMCD, was placed in a 500-milliliter flask equipped with an inlet for nitrogen, a metal stirrer, and a short distillation column. In addition, 0.24 ml of the Ti catalyst solution (targeting 25 ppm Ti), 0.09 ml of the Sn catalyst solution (targeting 15 ppm Sn), and 1.62 ml of the P stabilizer solution (targeting 40 ppm P) were added to the flask. The flask was placed in a Wood's metal bath already heated to 200° C. The stirring speed was set to 200 RPM at the beginning of the experiment. The contents of the flask were heated at 200° C. for 5 minutes and then the temperature was gradually increased to 275° C. over 240 minutes. The reaction mixture was then held at 275° C. for 20 minutes as the stirrer was slowed down to 100 rpm and a vacuum was gradually applied to 0.3 torr. The temperature of 275° C., vacuum of 0.3 torr, and stirring at 100 rpm was maintained for a total time of 100 minutes to remove excess unreacted diols. After 100 minutes, the run was complete and the polymer was allowed to cool and later removed from the reaction flask. The polymer was ground to 1 mm. The actual catalyst amounts were determined and shown in Table 1. The mol % TMCD in the polymer and b* of the ground polymer is shown in Table 2. The % TMCD incorporation reported in Table 2 was determined by taking the mol % TMCD in the polymer divided by the (mol of TMCD charged/DMT charged). For example 3a that would be 36.8/(0.24/0.40) resulting in 60.6%. The resulting polymer IV is also reported in Table 2.

Example 3b (Ti Only)

A mixture of 77.68 g (0.4 mol) of DMT, 34.56 g (0.58 mol) of EG, and 35.07 g (0.24 mol) of TMCD, was placed in a 500-milliliter flask equipped with an inlet for nitrogen, a metal stirrer, and a short distillation column. In addition, 0.31 ml of the Ti catalyst solution (targeting 32 ppm Ti) and 1.62 ml of the P stabilizer solution (targeting 40 ppm P) were added to the flask. The choice of 32 ppm Ti was to give the equivalent molar concentration of the total catalyst used in experiment 3a. The flask was placed in a Wood's metal bath already heated to 200° C. The stirring speed was set to 200 RPM at the beginning of the experiment. The contents of the flask were heated at 200° C. for 5 minutes and then the temperature was gradually increased to 275° C. over 240 minutes. The reaction mixture was then held at 275° C. for 20 minutes as the stirrer was slowed down to 100 rpm and a vacuum was gradually applied to 0.3 torr. The temperature of 275° C., vacuum of 0.3 torr, and stirring at 100 rpm was maintained for a total time of 100 minutes to remove excess unreacted diols. After 100 minutes, the run was complete and the polymer was allowed to cool and later removed from the reaction flask. The polymer was ground to 1 mm. The actual catalyst amounts were determined and shown in Table 1. The mol % TMCD in the polymer and b* of the ground polymer is shown in Table 2. The % TMCD incorporation reported in Table 2 was determined by taking the mol % TMCD in the polymer divided by the (mol of TMCD charged/DMT charged). The resulting polymer IV is also reported in Table 2.

Example 3c (Sn Only)

A mixture of 77.68 g (0.4 mol) of DMT, 34.56 g (0.56 mol) of EG, and 35.07 g (0.24 mol) of TMCD, was placed in a 500-milliliter flask equipped with an inlet for nitrogen, a metal stirrer, and a short distillation column. In addition, 0.44 ml of the Sn catalyst solution (targeting 77 ppm Sn), and 1.62 ml of the P stabilizer solution (targeting 40 ppm P) were added to the flask. The choice of 77 ppm Sn was to give the equivalent molar concentration of the total catalyst used in experiment 3a. The flask was placed in a Wood's metal bath already heated to 200° C. The stirring speed was set to 200 RPM at the beginning of the experiment. The contents of the flask were heated at 200° C. for 5 minutes and then the temperature was gradually increased to 275° C. over 240 minutes. The reaction mixture was then held at 275° C. for 20 minutes as the stirrer was slowed down to 100 rpm and a vacuum was gradually applied to 0.3 torr. The temperature of 275° C., vacuum of 0.3 torr, and stirring at 100 rpm was maintained for a total time of 100 minutes to remove excess unreacted diols. After 100 minutes, the run was complete and the polymer was allowed to cool and later removed from the reaction flask. The polymer was ground to 1 mm. The actual catalyst amounts were determined and shown in Table 1. The mol % TMCD in the polymer and b* of the ground polymer is shown in Table 2. The % TMCD incorporation reported in Table 2 was determined by taking the mol % TMCD in the polymer divided by the (mol of TMCD charged/DMT charged). The resulting polymer IV is also reported in Table 2.

TABLE 1

Raw Material Charges and Catalyst Analysis

| Ex. | Catalyst Metals | DMT (mol) | TMCD (mol) | EG (mol) | Ti (ppm) | Sn (ppm) | P (ppm) | Total Sn and Ti (μmol/g) | P (μmol/g) |
|---|---|---|---|---|---|---|---|---|---|
| 1a | Sn and Ti | 0.40 | 0.12 | 0.69 | 26 | 19 | 30 | 0.69 | 0.96 |
| 1b | Ti | 0.40 | 0.12 | 0.69 | 32 | 0 | 31 | 0.67 | 1.01 |
| 1c | Sn | 0.40 | 0.12 | 0.69 | 0 | 77 | 36 | 0.66 | 1.16 |
| 2a | Sn and Ti | 0.40 | 0.18 | 0.62 | 26 | 18 | 33 | 0.70 | 1.05 |
| 2b | Ti | 0.40 | 0.18 | 0.62 | 33 | 0 | 33 | 0.69 | 1.08 |
| 2c | Sn | 0.40 | 0.18 | 0.62 | 0 | 78 | 40 | 0.66 | 1.28 |
| 3a | Sn and Ti | 0.40 | 0.24 | 0.56 | 27 | 16 | 37 | 0.70 | 1.20 |
| 3b | Ti | 0.40 | 0.24 | 0.56 | 33 | 0 | 38 | 0.70 | 1.23 |
| 3c | Sn | 0.40 | 0.24 | 0.56 | 0 | 79 | 41 | 0.66 | 1.32 |

TABLE 2

TMCD incorporation, b*, and IV of preparations.

| Ex. | Catalyst Metals | TMCD in polymer (mol %) | TMCD Incorporation (%) | b* | IV (dL/g) |
|---|---|---|---|---|---|
| 1a | Sn and Ti | 16.9 | 58.6 | 9.0 | 0.83 |
| 1b | Ti | 16.5 | 57.3 | 4.8 | 0.76 |
| 1c | Sn | 13.3 | 46.3 | 19.3 | 0.71 |
| 2a | Sn and Ti | 27.1 | 60.6 | 6.7 | 0.77 |
| 2b | Ti | 25.0 | 55.9 | 4.4 | 0.73 |
| 2c | Sn | 27.2 | 60.8 | 14.2 | 0.66 |
| 3a | Sn and Ti | 36.8 | 60.6 | 5.2 | 0.67 |
| 3b | Ti | 26.5 | 43.6 | 3.7 | 0.66 |
| 3c | Sn | 38.1 | 62.7 | 10.1 | 0.62 |

A review of the examples and tables reveals that Example 1 represents attempts to make a material containing low amounts of TMCD (~15 mol % TMCD), Example 2 represents attempts to make a material containing medium amounts of TMCD (~26 mol % TMCD), and Example 3 represents attempts to make materials containing higher amounts of TMCD (~37 mol % TMCD).

It is desirable to have a catalyst system that can produce polyester with high TMCD incorporation (preferably greater than 50%), b* values as low as possible (at least less than 10), and the ability to achieve an IV in a reasonable time frame over the compositional range. A review of tables 1 and 2 reveals that Ti alone with P is useful to prepare materials with TMCD levels of 25 mol % (example 2b) and 26.5 mol % (example 3b). Sn alone with P cannot be used to prepare any useful materials due to b* value exceeding 10 (example 1c, 2c, 3c). In all cases, the Ti and P catalyst achieved the lowest b* values.

Example 4 (Ti/Mn/P)

This example illustrates the preparation of a copolyester with a target composition of 100 mole % dimethyl terephthalate residues, 63 mole % ethylene glycol residues and 37 mole % 2,2,4,4-tetramethyl-1,3-cyclobutanediol residues.

A mixture of 0.40 moles of dimethylterephthalate, 0.50 moles of ethylene glycol, 0.24 moles of 2,2,4,4-tetramethyl-1,3-cyclobutanediol, 0.76 grams of manganese(II) diacetate and 2.46 grams of titanium(IV) tetraisopropoxide was charged to a 500 milliliter round bottom flask and equipped with a nitrogen inlet, metal stirrer, a rubber stopper and a short distillation column interfaced to a vacuum system. The flask was then submerged in a Belmont bath preheated to 200° C. The stirring speed was set to 200 RPM at the beginning of the experiment. After all reagents had melted, the reaction temperature was slowly increased over 3 hours to 275° C. Once a temperature of 275° C. was achieved, 1.04 grams of Merpol A was added to the reaction mixture and vacuum was gradually applied over 20 minutes to 0.3 torr with stirring speed decreased to 100 RPM. This target vacuum was maintained for 160 minutes, during which a viscous, clear and slightly yellow polymer with afforded with an inherent viscosity of 0.648 dig. $^1$H NMR analysis revealed that the copolyester was composed of 37.77 mole % 2,2,4,4-tetramethyl-1,3-cyclobutanediol, 0.47 mole % diethylene glycol and 61.76 mole % ethylene glycol.

The above example was repeated with varying reaction conditions. The results are shown below in Table 3, which lists EG charges (moles), TMCD charges (moles), polycondensation temperature (C), polycondensation reaction time (min), inherent viscosity (dl/g), dimethylterephthalate (DMT) polymer content (mole %), ethylene glycol (EG) polymer content (mole %), 2,2,4,4-tetramethyl-1,3-cyclobutanediol (TMCD) polymer content (mole %), diethylene glycol (DEG) content (mole %), Mn concentration (ppm), Ti concentration (ppm), P concentration (ppm), L*, a* and b* values.

TABLE 3

Polyesters made from TMCD and EG using Ti/Mn/P.

| EG moles | TMCD moles | Polycon Temp | Polycon Time | IhV | DMT | EG | TMCD | DEG | Mn | Ti | P | L* | a* | b* |
|---|---|---|---|---|---|---|---|---|---|---|---|---|---|---|
| 0.50016 | 0.24 | 275 | 210 | 0.517 | 100 | 67.82 | 31.70 | 0.48 | 16.3 | 26.504 | 35.8 | 93.63 | −0.71 | 3.64 |
| 0.50016 | 0.24 | 275 | 150 | 0.543 | 100 | 59.14 | 40.34 | 0.52 | 55.8 | 47.728 | 20.6 | 93.25 | −0.94 | 5.25 |
| 0.50016 | 0.24 | 265 | 230 | 0.511 | 100 | 58.56 | 40.99 | 0.45 | 52.6 | 47.243 | 47.3 | 94.16 | −0.7 | 3.96 |
| 0.50016 | 0.24 | 275 | 160 | 0.648 | 100 | 61.76 | 37.77 | 0.47 | 27.2 | 47.317 | 6.4 | 92.08 | −0.87 | 7.19 |
| 0.50016 | 0.24 | 270 | 200 | 0.576 | 100 | 59.96 | 39.55 | 0.49 | 55 | 47.295 | 48.7 | 94.51 | −0.67 | 4.88 |
| 0.50016 | 0.24 | 275 | 160 | 0.601 | 100 | 62.37 | 37.16 | 0.47 | 27.2 | 47.441 | 62.7 | 94.96 | −0.46 | 3.8 |
| 0.50016 | 0.2304 | 265 | 230 | 0.541 | 100 | 60.56 | 39.04 | 0.40 | 55 | 50.97 | 19.2 | 90.31 | −0.77 | 5.47 |
| 0.50016 | 0.2304 | 275 | 170 | 0.616 | 100 | 60.65 | 38.71 | 0.64 | 54.1 | 48.026 | 75.3 | 90.89 | −0.69 | 4.08 |
| 0.50016 | 0.24 | 265 | 230 | 0.581 | 100 | 61.78 | 37.78 | 0.44 | 27.4 | 49.459 | 61.2 | 90.29 | −0.36 | 3.67 |

Example 5 (Larger Batch Polymer Process)

Copolyesters based on 2,2,4,4-tetramethyl-1,3-cyclobutanediol (TMCD) and EG were prepared as described below. Examples were prepared using a 100 lb batch reactor, similar to Example 2b above (for Ti and P process) and similar to Example 4 above (for Ti, Mg and P process), where DMT, EG, TMCD, catalyst and P were added to the reactor and the temperature was ramped to 275° C. over a period of 6 hours with agitation at 15 rpm. When the polymer temperature reached 275° C., full vacuum was applied. When the pressure reached <2 mm Hg, the polymer was exuded from the reactor and pelletized into product.

Several batches were made using a Ti and P process, resulting in polymers having TMCD in an amount ranging from 20.56 to 26.3 mole %, based on the diol content, IV ranging from 0.579 to 0.74 dl/g, Ti ranging from about 50 to about 60 ppm, and P ranging from about 70 to about 80 ppm.

Example 5a was prepared by blending different (Ti and P) batches of polymers having TMCD in an amount ranging from 23.99 to 26.03 mole %, based on the diol content, and IV ranging from 0.579 to 0.597 dl/g to provide a polymer blend having an average TMCD content of 25.3 mole % TMCD, a Tg of 95.6° C., and IV of 0.59 dl/g, residual Ti of about 50 ppm and residual P of about 70 ppm.

Example 5b was prepared by blending different (Ti and P) batches of polymers having TMCD in an amount ranging from 20.56 to 26.3 mole %, based on the diol content, and IV ranging from 0.594 to 0.74 dl/g to provide a polymer blend having an average TMCD content of 23.4 mole % TMCD, a Tg of 93.1° C., and IV of 0.66 dl/g, residual Ti of about 50 ppm and residual P of about 70 ppm.

Several batches were made using a Ti and P process, resulting in polymers having TMCD in an amount ranging from 32.66 to 37.72 mole %, based on the diol content, IV ranging from 0.563 to 0.651 dl/g, Ti ranging from about 50 to about 60 ppm, and P ranging from about 70 to about 80 ppm.

Example 5c was prepared by blending the different (Ti, Mg and P) batches of polymers to provide a polymer blend having an average TMCD content of 36.4 mole % TMCD, a Tg of 106.5° C., and IV of 0.59 dl/g, residual Ti of about 50 ppm and residual P of about 70 ppm

Example 6 (Mechanical and Dishwasher Durability Testing)

A polymer made according to Example 5c above was tested for Izod impact strength and for dishwasher durability. Izod impact strength testing was performed according to ASTM D 4182 at both 23° C. and −40° C. Results indicate that the polyester showed good impact strength at both temperatures, i.e., 3022 and 3932 J/m respectively. This impact performance is better than that of a PETG polyester which typically has an IV of 0.75±0.02 dL/g and impact strengths of 2589 and 3666 J/m, respectively.

Durability was tested via drop testing after dishwashing. Dishwashing was performed with both the Example 5c polyester and Makrolon 2458 polycarbonate (PC) from Covestro formed into beer mugs with handles. Eight replicates of each material were washed for each of 0, 100, 250, 500, 750, and 1000 cycles in two different commercial dishwashers. The first dishwasher is an Ecolab single chamber ES2000 HT system using Ecolab Solid Power XL detergent and Ecolab Solid Brilliance rinse aid, while the second dishwasher is an Ecolab conveyor EC44 system using the same detergents. The single chamber dishwasher typically had a wash temperature of 75° C. and a rinse temperature of 69° C., while the conveyor dishwasher had a wash temperature of 80-82° C. and a rinse temperature of 90-92° C. After washing was complete, beer mug samples for each material and cycle time were drop tested.

Drop testing consisted of initially placing a beer mug with the handle facing inward on a platform 122 cm high. The platform was then released and the mug would fall on a stainless steel plate. Each mug was dropped 5 times. In each material/cycle set, 4 mugs were filled with water 1" from the top for each drop, while 4 mugs remained unfilled. Drop testing results can be found in Tables 4 and 5. Results are provided for each of the 5 drops for each cup as either pass (P) or no pass (F). Once an F was noted no further drops were completed and no further notations are made. A beer mug drop is considered an F if a large crack forms, or the mug fractures into more than 1 piece such that the mug could no longer hold liquid. A beer mug is considered a P if only small dents, rough spots, or small knicks were noted such that the mug holds liquid without leaking. If a mug was broken prior to dropping it is noted as "broke in dishwasher."

TABLE 4

Drop impact testing results for Example 5c polyester and PC after washing in an Ecolab single chamber ES2000 HT system.

| Number of Dishwasher Cycles | Filled or Unfilled (F or U) | Ex 5c Results | PC Results |
|---|---|---|---|
| 0 | F | P, P, P, P, P<br>P, P, P, P, P<br>P, P, P, P, P<br>P, P, P, P, P | P, P, P, P, P<br>P, P, P, P, P<br>P, P, P, P, P<br>P, P, P, P, P |
| | U | P, P, P, P, P | P, P, P, P, P |

TABLE 4-continued

Drop impact testing results for Example 5c polyester and PC after washing in an Ecolab single chamber ES2000 HT system.

| Number of Dishwasher Cycles | Filled or Unfilled (F or U) | Ex 5c Results | PC Results |
|---|---|---|---|
|  |  | P, P, P, P, P | P, P, P, P, P |
|  |  | P, P, P, P, P | P, P, P, P, P |
|  |  | P, P, P, P, P | P, P, P, P, P |
| 100 | F | P, P, P, P, P | P, P, P, P, P |
|  |  | P, P, P, P, P | P, P, P, P, P |
|  |  | P, P, P, P, P | P, P, P, P, P |
|  |  | P, P, P, P, P | P, P, P, P, P |
|  | U | P, P, P, P, P | P, P, P, P, P |
|  |  | P, P, P, P, P | P, P, P, P, P |
|  |  | P, P, P, P, P | P, P, P, P, P |
|  |  | P, P, P, P, P | P, P, P, P, P |
| 250 | F | P, P, P, P, P | F |
|  |  | P, P, P, P, P | F |
|  |  | P, P, P, P, P | F |
|  |  | P, P, P, P, P | F |
|  | U | P, P, P, P, P | P, P, P, P, P |
|  |  | P, P, P, P, P | P, P, P, P, P |
|  |  | P, P, P, P, P | P, P, P, P, P |
|  |  | P, P, P, P, P | P, P, P, P, P |
| 500 | F | P, P, P, P, P | F |
|  |  | P, P, P, P, P | F |
|  |  | P, P, P, P, P | F |
|  |  | P, P, P, P, P | F |
|  | U | P, P, P, P, P | P, P, P, P, P |
|  |  | P, P, P, P, P | F |
|  |  | P, P, P, P, P | P, P, P, P, P |
|  |  | P, P, P, P, P | P, P, P, P, P |
| 750 | F | P, P, P, P, P | Broke in Dishwasher |
|  |  | P, P, P, P, P | Broke in Dishwasher |
|  |  | P, P, P, P, P | Broke in Dishwasher |
|  |  | P, P, P, P, P | Broke in Dishwasher |
|  | U | P, P, P, P, P | F |
|  |  | P, P, P, P, P | Broke in Dishwasher |
|  |  | P, P, P, P, P | P, P, P, P, P |
|  |  | P, P, P, P, P | Broke in Dishwasher |
| 1000 | F | P, P, P, P, P | Broke in Dishwasher |
|  |  | P, P, P, P, P | Broke in Dishwasher |
|  |  | P, P, P, P, P | Broke in Dishwasher |
|  |  | P, P, P, P, P | Broke in Dishwasher |
|  | U | P, P, P, P, P | Broke in Dishwasher |
|  |  | P, P, P, P, P | Broke in Dishwasher |
|  |  | P, P, P, P, P | P, F |
|  |  | P, P, P, P, P | P, F |

TABLE 5

Drop impact testing results for Example 5c polyester and PC after washing in an Ecolab conveyor EC44 system.

| Number of Dishwasher Cycles | Filled or Unfilled (F or U) | Ex 5c Results | PC Results |
|---|---|---|---|
| 0 | F | P, P, P, P, P | P, P, P, P, P |
|  |  | P, P, P, P, P | P, P, P, P, P |
|  |  | P, P, P, P, P | P, P, P, P, P |
|  |  | P, P, P, P, P | P, P, P, P, P |
|  | U | P, P, P, P, P | P, P, P, P, P |
|  |  | P, P, P, P, P | P, P, P, P, P |
|  |  | P, P, P, P, P | P, P, P, P, P |
|  |  | P, P, P, P, P | P, P, P, P, P |
| 100 | F | P, P, P, P, P | P, P, P, P, P |
|  |  | P, P, P, P, P | P, P, P, P, P |
|  |  | P, P, P, P, P | P, P, P, P, P |
|  |  | P, P, P, P, P | P, P, P, P, P |
|  | U | P, P, P, P, P | P, P, P, P, P |
|  |  | P, P, P, P, P | P, P, P, P, P |
|  |  | P, P, P, P, P | P, P, P, P, P |
|  |  | P, P, P, P, P | P, P, P, P, P |
| 250 | F | P, P, P, P, P | P, P, P, P, P |
|  |  | P, P, P, P, P | P, P, P, P, P |
|  |  | P, P, P, P, P | P, P, P, P, P |
|  |  | P, P, P, P, P | P, P, P, P, P |
|  | U | P, P, P, P, P | P, P, P, P, P |
|  |  | P, P, P, P, P | P, P, P, P, P |
|  |  | P, P, P, P, P | P, P, P, P, P |
|  |  | P, P, P, P, P | P, P, P, P, P |
| 500 | F | P, P, P, P, P | Broke in Dishwasher |
|  |  | P, P, P, P, P | P, P, P, P, P |
|  |  | P, P, P, P, P | Broke in Dishwasher |
|  |  | P, P, P, P, P | P, P, P, P, P |
|  | U | P, P, P, P, P | P, P, P, P, P |
|  |  | P, P, P, P, P | P, P, P, P, P |
|  |  | P, P, P, P, P | P, P, P, P, P |
|  |  | P, P, P, P, P | P, P, P, P, P |
| 750 | F | P, P, P, P, P | Broke in Dishwasher |
|  |  | F | Broke in Dishwasher |
|  |  | P, P, P, P, P | Broke in Dishwasher |
|  |  | P, F | Broke in Dishwasher |
|  | U | P, P, P, P, P | Broke in Dishwasher |
|  |  | P, P, P, P, P | Broke in Dishwasher |
|  |  | P, P, P, P, P | P, P, P, P, P |
|  |  | P, P, P, P, P | Broke in Dishwasher |
| 1000 | F | P, P, P, P, P | Broke in Dishwasher |
|  |  | P, P, P, P, P | Broke in Dishwasher |
|  |  | F | Broke in Dishwasher |
|  |  | F | Broke in Dishwasher |
|  | U | P, P, P, P, P | Broke in Dishwasher |
|  |  | P, P, P, P, P | Broke in Dishwasher |
|  |  | P, F | Broke in Dishwasher |
|  |  | P, P, P, P, P | Broke in Dishwasher |

A review of Table 4 reveals that in the single chamber dishwasher, PC mugs failed after 250 cycles when filled, and broke in the dishwasher after 750 cycles, while the Ex 5c polyester mugs did not have any failures after 1000 dishwasher cycles. A review of Table 5 reveals that in the conveyor dishwasher, PC mugs began breaking in the dishwasher after 500 cycles, while the Ex 5c polyester mugs did not break in the dishwasher after 1000 cycles, and only had 50% failure after 750 cycles when filled, and 25% failure after 1000 cycles when unfilled.

Example 7 (Continuous Process with Ti/P)

A continuous melt phase process was employed to produce a random copolyester where DMT was fed into the process molten along with a total molar diol excess comprised of EG and TMCD. Titanium catalyst and optionally, manganese catalysts were added at the beginning of the process. Additives, such as toners and P stabilizer were added after ester-exchange was complete. The process was a 3-stage synthesis consisting of ester exchange, followed by pre-polymer, and concluded with polycondensation to high molecular weight. Ester-exchange was accomplished in a series of CSTR reactors where temperature was increased and pressure decreased to react the DMT with EG/TMCD and liberate methanol. The temperature was gradually increased from about 225° C. to about 250° C. across the reactors with a concurrent decrease in pressure from about 50 psig to about 5 psig. The reaction product was further reacted in a second stage CSTR reactors starting at a slight vacuum and a temperature of about 250° C. and continuing to higher vacuum down to about 150 mm Hg and about 270°

C. All the CSTR reactors were stirred with a single shaft agitator running at less than 100 rpm. The product from the second stage was then reacted in continuous polycondensation reactors for final molecular weight build-up under high vacuum and temperatures starting at about 270° C. to about 280° C. Molten rods were extruded into a water bath and fed to a cutter to make pellets of the finished polyester. Inherent viscosity (IhV) as measured in a solution of 0.5 grams in 100 ml of a 60/40 solution of phenol/tetrachloroethane yielded a value of about 0.65 dl/g for the finished polyester having a glycol component containing about 23-25 mole % TMCD, about 75-77 mole % EG, and less than 2 mole % diethylene glycol, residues.

Example 8 (Continuous Process with Ti/Mn/P)

A continuous melt phase process was employed to produce a random copolyester where DMT was fed into the process molten along with a total molar diol excess comprised of EG and TMCD. Titanium and manganese catalysts were added at the beginning of the process. Additives, such as toners and P stabilizer were added after ester-exchange was complete. The process was a 3-stage synthesis consisting of ester exchange, followed by pre-polymer, and concluded with polycondensation to high molecular weight. Ester-exchange was accomplished in a series of CSTR reactors where temperature was increased and pressure decreased to react the DMT with EG/TMCD and liberate methanol. The temperature was gradually increased from about 225° C. to about 250° C. across the reactors with a concurrent decrease in pressure from about 50 psig to about 5 psig. The reaction product was further reacted in a second stage CSTR reactors starting at a slight vacuum and a temperature of about 250° C. and continuing to higher vacuum down to about 150 mm Hg and about 270° C. All the CSTR reactors were stirred with a single shaft agitator running at less than 100 rpm. The product from the second stage was then reacted in continuous polycondensation reactors for final molecular weight build-up under high vacuum and temperatures starting at about 270° C. to about 280° C. Molten rods were extruded into a water bath and fed to a cutter to make pellets of the finished polyester. Inherent viscosity (IhV) as measured in a solution of 0.5 grams in 100 ml of a 60/40 solution of phenol/tetrachloroethane yielded a value of about 0.59 dl/g for the finished polyester having a glycol component containing about 33-36 mole % TMCD, about 62-66 mole % EG, and less than 2 mole % diethylene glycol, residues.

Example 9 (Chemical Resistance Testing—Sunscreen)

An outer shell of a dual wall tumbler was utilized for testing as a part representative of drinkware used by customers. Each material tested was molded using the same injection molding equipment and mold. The wall thickness of the molded part was approx. 2 mm. The materials examined were as follows: (1) Tritan TX1000 (from Eastman), (2) Example 5b, (3) Example 5c; (4) polycarbonate PC 2658 (from Covestro); and (5) styrene acrylonitrile copolymer SAN Lustran 31 (from Ineos). The tumbler outer was divided into 4 sections using a marker, and each section was then divided into 6, creating 24 sections total. Four different people each applied one of the following sunscreens: Banana Boat SPF 30 Sport Spray, Banana Boat SPF 50 Sport Spray, Coppertone Kids SPF 50 spray, and Banana Boat SPF 100 Sport Lotion. The sunscreen was applied to their hands and rubbed in completely as if applying sunscreen during normal everyday usage. Each person then used a thumb or finger and touched the cup in a designated section for their sunscreen 0, 1, 2, 3, 4, and 5 minutes after application. The cups were then placed outside in the sun (27° C.) for 10, 30, or 60 minutes. Each cup was then washed once in a commercial dishwasher, an Ecolab conveyor EC44 system using Ecolab Solid Power XL detergent and Ecolab Solid Brilliance rinse aid with a wash temperature of 80-82° C. and a rinse temperature of 90-92° C. After washing all cups were air dried at room conditions for 24 h and then visually reviewed for any residual sunscreen marks. The marks were graded on the following scale: nothing visible (N), just barely visible (JB), barely visible (B), slightly visible (S), visible (V), and very visible (VV), where nothing visible looked the best and very visible looked the worst. The results are provided below in table 6.

TABLE 6

Exposure to Sunscreen.

| Material Tested | Time in Sun/ Time Since Sunscreen Application | Banana Boat 30 SPF Sport Spray | | | Banana Boat 50 SPF Sport Spray | | | Coppertone Kids SPF 50 Spray | | | Banana Boat SPF 100 Sport Lotion | | |
|---|---|---|---|---|---|---|---|---|---|---|---|---|---|
| | | 10 min | 30 min | 60 min | 10 min | 30 min | 60 min | 10 min | 30 min | 60 min | 10 min | 30 min | 60 min |
| Copolyester TX1000 | 0 | S | B | V | B | S | V | V | V | V | VV | VV | V |
| | 1 | S | B | JB | S | S | V | V | V | V | VV | V | V |
| | 2 | B | JB | V | S | S | S | S | V | V | V | V | — |
| | 3 | S | JB | — | S | S | S | V | V | V | V | VV | V |
| | 4 | S | JB | B | JB | S | B | V | V | V | V | S | B |
| | 5 | JB | JB | B | B | B | B | B | V | V | S | V | S |
| Copolyester Ex 5b | 0 | N | N | N | JB | JB | B | B | B | S | V | V | V |
| | 1 | N | N | N | JB | B | B | B | N | B | V | V | V |
| | 2 | N | N | N | N | JB | N | B | B | B | V | B | V |
| | 3 | N | N | N | N | N | N | B | B | B | V | S | V |
| | 4 | N | N | N | N | N | N | B | B | B | S | S | V |
| | 5 | N | N | N | N | N | N | B | B | JB | S | S | S |

TABLE 6-continued

Exposure to Sunscreen.

| Material Tested | Time in Sun/Time Since Sunscreen Application | Banana Boat 30 SPF Sport Spray | | | Banana Boat 50 SPF Sport Spray | | | Coppertone Kids SPF 50 Spray | | | Banana Boat SPF 100 Sport Lotion | | |
|---|---|---|---|---|---|---|---|---|---|---|---|---|---|
| | | 10 min | 30 min | 60 min | 10 min | 30 min | 60 min | 10 min | 30 min | 60 min | 10 min | 30 min | 60 min |
| Copolyester Ex 5c | 0 | JB | N | JB | JB | B | JB | V | B | S | V | V | V |
| | 1 | N | N | JB | JB | JB | B | V | B | B | V | V | V |
| | 2 | N | N | N | JB | N | B | S | B | B | V | V | V |
| | 3 | N | N | N | N | N | JB | S | B | S | V | S | V |
| | 4 | N | N | N | N | N | JB | S | B | B | V | V | S |
| | 5 | N | N | N | N | N | JB | S | B | B | S | V | B |
| PC | 0 | JB | JB | S | B | B | JB | B | S | B | V | V | V |
| | 1 | N | N | N | B | B | JB | B | S | S | V | V | V |
| | 2 | N | N | N | JB | JB | JB | B | S | S | V | V | V |
| | 3 | N | N | N | N | N | JB | B | B | B | V | V | V |
| | 4 | N | N | JB | N | N | JB | B | B | S | V | V | V |
| | 5 | N | N | JB | N | N | JB | JB | B | S | V | V | V |
| SAN | 0 | B | JB | JB | JB | B | B | S | S | S | V | V | V |
| | 1 | N | S | JB | S | B | B | S | S | V | V | V | V |
| | 2 | B | B | — | B | N | JB | V | B | S | B | V | V |
| | 3 | JB | N | JB | JB | N | N | S | S | — | S | V | V |
| | 4 | N | N | JB | N | JB | N | S | V | S | V | — | V |
| | 5 | N | N | JB | N | N | N | B | B | B | S | V | V |

A review of table 5 reveals that copolyester (2) Ex 5b generally had better sunscreen resistance compared to copolyester (2) Ex 5c for the sunscreens tested.

Example 10 (Chemical Resistance Testing—Citrus)

An outer shell of a dual wall tumbler was utilized for testing as a part representative of drinkware used by customers. Each material tested was molded using the same injection molding equipment and mold. The wall thickness of the molded part was approx. 2 mm. The materials examined were as follows: (1) Tritan TX1000 (from Eastman), (2) Example 5b, (3) Example 5c; polycarbonate PC 2658 (from Covestro); and styrene acrylonitrile copolymer SAN Lustran 31 (from Ineos). Two different people made mojitos in each cup, using the following recipe: Ten fresh mint leaves and ⅛ lime were placed in a cup. A muddler was used to crush the lime and mint leaves to release the mint and lime essential oils and juices. Two tablespoons of white sugar and ⅔ of a lime were added and muddled again to release the lime essential oils and juices. The cup was then filled with ice cubes and 1.5 oz of rum and ½ cup club soda were poured over the ice. The mixture was then stirred and each cup was placed in an over at 50° C. for 30 or 60 minutes. Cups were then removed from the oven, the mojito was removed and the cups were washed once in a commercial dishwasher, an Ecolab conveyor EC44 system using Ecolab Solid Power XL detergent and Ecolab Solid Brilliance rinse aid with a wash temperature of 80-82° C. and a rinse temperature of 90-92° C. After washing all cups were air dried at room conditions for 24 h and then visually reviewed for any residual essential oil marks. The marks are typically seen as material pitting, and appear hazy and/or white to the eye. Marks were graded on the following scale: nothing visible (N), just barely visible (JB), barely visible (B), slightly visible (S), visible (V), and very visible (VV), where nothing visible looked the best and very visible looked the worst. The process was repeated 7 times for each cup and the results are provided below in tables 7 and 8.

TABLE 7

30 minute exposure to Citrus

| Material Type | Exposure Number | | | | | | |
|---|---|---|---|---|---|---|---|
| | 1 | 2 | 3 | 4 | 5 | 6 | 7 |
| Copolyester TX1000 | B | S | V | V | V | V | VV |
| Copolyester EX 5b | JB | JB | B | B | S | S | V |
| Copolyester EX 5c | B | B | S | S | S | V | V |
| Copolyester PETG | JB | B | B | B | S | S | V |
| SAN | B | S | V | V | V | V | VV |
| PC | JB | JB | B | B | S | V | V |

TABLE 8

60 minute exposure to Citrus

| Material Type | Exposure Number | | | | | | |
|---|---|---|---|---|---|---|---|
| | 1 | 2 | 3 | 4 | 5 | 6 | 7 |
| Copolyester TX1000 | B | S | V | V | V | V | VV |
| Copolyester EX 5b | B | B | S | S | S | V | V |
| Copolyester EX 5c | B | B | S | S | V | V | VV |
| Copolyester PETG | B | S | S | S | S | V | V |
| SAN | S | S | V | V | V | VV | VV |
| PC | B | S | S | S | S | V | V |

A review of tables 7 and 8 reveals that copolyester (2) EX 5b generally had better citrus resistance compared to copolyester (3) EX 5c for both the 30 and 60 minute tests.

Example 11 (Spiral Flow Testing)

A Toyo 110 injection molding machine fitted with a spiral flow mold was used to conduct the material flow comparisons. The spiral flow mold cavity dimensions were 0.5"

wide×0.125" thick×60.0" long with marks indicating flow length spaced at 0.25" intervals. The materials tested were copolyesters having the following monomer residues: (1) TX1000 (from Eastman), (2) Example 5b, (3) Example 5c, and (4) PETG (from Eastman). The materials were dried prior to molding using desiccant drying conditions to less than 200 ppm moisture as confirmed by Karl Fisher analysis.

Temperature settings were adjusted to include typical processing conditions for each of the materials studied. Once the set barrel and nozzle temperatures reached equilibrium, material was purged by increasing back pressure to 500 psi to prevent the screw from recovering and allowing the material to freely flow from the nozzle while turning the screw at 150 rpm. After purge was completed, the back-pressure was decreased to 100 psi and the sled was moved forward until the nozzle coupled with the sprue bushing. The screw was then turned until a complete shot was loaded and the machine was placed in auto cycle.

Screw speed (150 rpm) and back pressure (100 psi) were kept constant for each of the experiments. An injection speed of 1 inch/second was constant along with injection pressures of 1000 psi and 1250 psi. Mold temperature was kept constant at 80° F. along with a cooling time of 22 seconds. The actual cycle time was kept constant at 38.4 seconds. Shot cushion was adjusted with each parameter change to remain between 0.05" and 0.10". The small cushion allowed reproducible results by keeping the melt temperature uniform.

Figure 2:
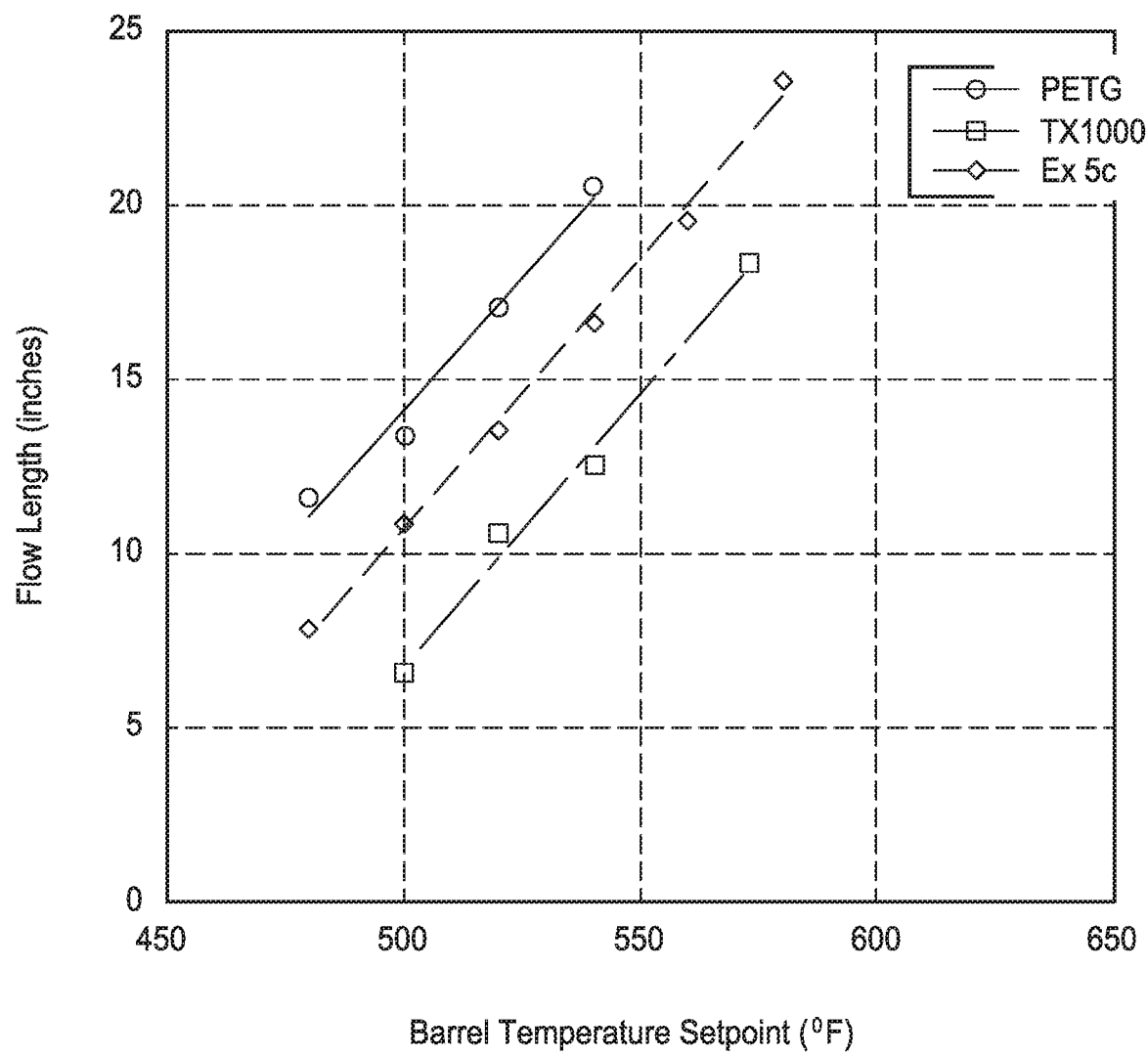
FIG. 2 is a graph depicting flow length as a function of barrel temperature for different polymer compositions in accordance with spiral flow testing in Example 11.

Once the parameters were input, the molding machine was placed in auto cycle and shots were discarded until the desired cushion was achieved. Ten shots were then collected and flow length was measured, averaged and recorded for each material and each condition. The results are shown in FIGS. 1 and 2. A review of FIGS. 1 and 2 reveals that copolyester (2) EX 5b had better spiral flow compared to copolyester (3) EX 5c at a given temperature. Thus, in one embodiment, the polyester composition according to the invention has a spiral flow length of greater than 30.5 cm (12 inches) at a temperature of 271° C. (520° F.), measured in accordance with this Example 11.

Example 12 (Weld Strength Testing)

I-beam shaped parts were molded and used to test the weld strength of an ultrasonic weld for the following materials: Example 7, Example 8, TX1000 (from Eastman), TX2000 (from Eastman), SAN (from Ineos), and PC 2658 (from Covestro).

All materials were used to injection mold I-beam style parts. The parts were made using a Toyo Plastar Si-110 Electric Injection Molding Machine model year 2000. The machine had a clamp tonnage of 110 and a shot size of 3.42 ounces. The machine was equipped with a general purpose screw. The machine was used to mold I-beam style parts for each material listed in table 8. The I-beams were molded at varying, optimal conditions for each material to ensure a quality part. The conditions used are shown below in Tables 9 and 10.

TABLE 9

Molding conditions for each material forming I-beam parts.

| Mat'l | Tg ° C. | Barrel Set ° F. | Nozzle Set ° F. | Melt Temp ° F. | Mold Set ° F. | Inject | Pack | Hold | Screw Recover (sec) | Actual Cycle Time | Screw Speed (RPM) |
|---|---|---|---|---|---|---|---|---|---|---|---|
| Ex. 7 | 93 | 500 | 500 | 524 | 100 | 1800/12 | 1500/6 | 1000/8 | 8.52 | 37.8 | 150 |
| TX1000 | 108 | 520 | 520 | 560 | 100 | 1800/12 | 1500/6 | 1000/8 | 8.47 | 37.8 | 150 |
| TX2000 | 118 | 520 | 520 | 562 | 100 | 1800/12 | 1500/6 | 1000/8 | 8.11 | 38.33 | 150 |
| Ex. 8 | 105 | 520 | 520 | n/a | 100 | 1800/12 | 1500/6 | 1000/8 | 8.27 | 37.8 | 150 |
| SAN | 105 | 450 | 450 | n/a | 130 | 1200/12 | 800/6 | 800/6 | n/a | n/a | 150 |
| PC 2658 | 150 | 570 | 570 | n/a | 170 | 1800/12 | 1400/6 | 1000/6 | 8.44 | 33.6 | 150 |

TABLE 10

Molding conditions Cont.

| Mat'l | Back press (PSI) | Peak Inject Press | Actual Fill Time (sec) | Cushion (in) | Cooling Time (sec | Screw Position | 4V | 3V | 2V | 1V |
|---|---|---|---|---|---|---|---|---|---|---|
| Ex. 7 | 100 | 1769 | n/a | 0.203 | 14 | 3.6 | 3.6/1 | 2/.75 | 0.75/2 | 0.28/1 |
| TX1000 | 100 | 1801 | 2.93 | 0.247 | 14 | 3.6 | 3.6/1 | 2/.75 | 0.75/2 | 0.28/1 |
| TX2000 | 100 | 1800 | 3.37 | 0.278 | 14 | 3.6 | 3.6/1 | 2/1 | 0.75/2 | 0.28/1 |
| Ex. 8 | 100 | 1800 | 2.75 | 0.282 | 14 | 3.6 | 3.6/1 | 2/1 | 0.75/2 | 0.28/1 |
| SAN | 100 | n/a | n/a | n/a | n/a | 3.6 | 3.6/1 | n/a | 0.75/2 | 0.28/1 |
| PC 2658 | 100 | 1755 | 2.56 | 0.282 | 12 | 3.6 | 3.6/1 | 2/2 | 0.75/2 | 0.28/1 |

The welding process involved taking two separate parts of the same material and allowing them to be welded together. In order to make a successful weld, several parameters had to be set, checked, and adjusted to ensure the integrity of the part and weld. Welds were made to half I-beams with an energy director to the half I-beam with a surface texture. The welds, of all materials, were based upon a set distance allowing for a consistent, reproducible weld. The welds were performed with a Dukane iQ "Melt Match" (15 kHz 4800 Watts) welder. The I-beams were welded at 50% weld amplitude, a trigger force of 75 psi, and a distance of 0.12 inches. The amount of energy applied to each material varied based upon what each material allowed at that set distance.

The process to test weld strength used an MTS Insight electromechanical 10 kN standard length machine. The standard preset I-beam conditions were selected, dialed in, and then secured to ensure consistency for each part. I-beams were placed inside the grips of the machine and then the machine was allowed to pull the I-beam apart. The machine slowly applied force by pulling each side of the welded beam until it separated. As it pulled the pieces apart, causing stress on the weld, the machine documented the amount of force required to break the weld. After the weld is broken, additional I-beams were tested to receive an average. The average was then analyzed and compared to the other materials tested. The results are shown in FIGS. 3 and 4.

Figure 3:
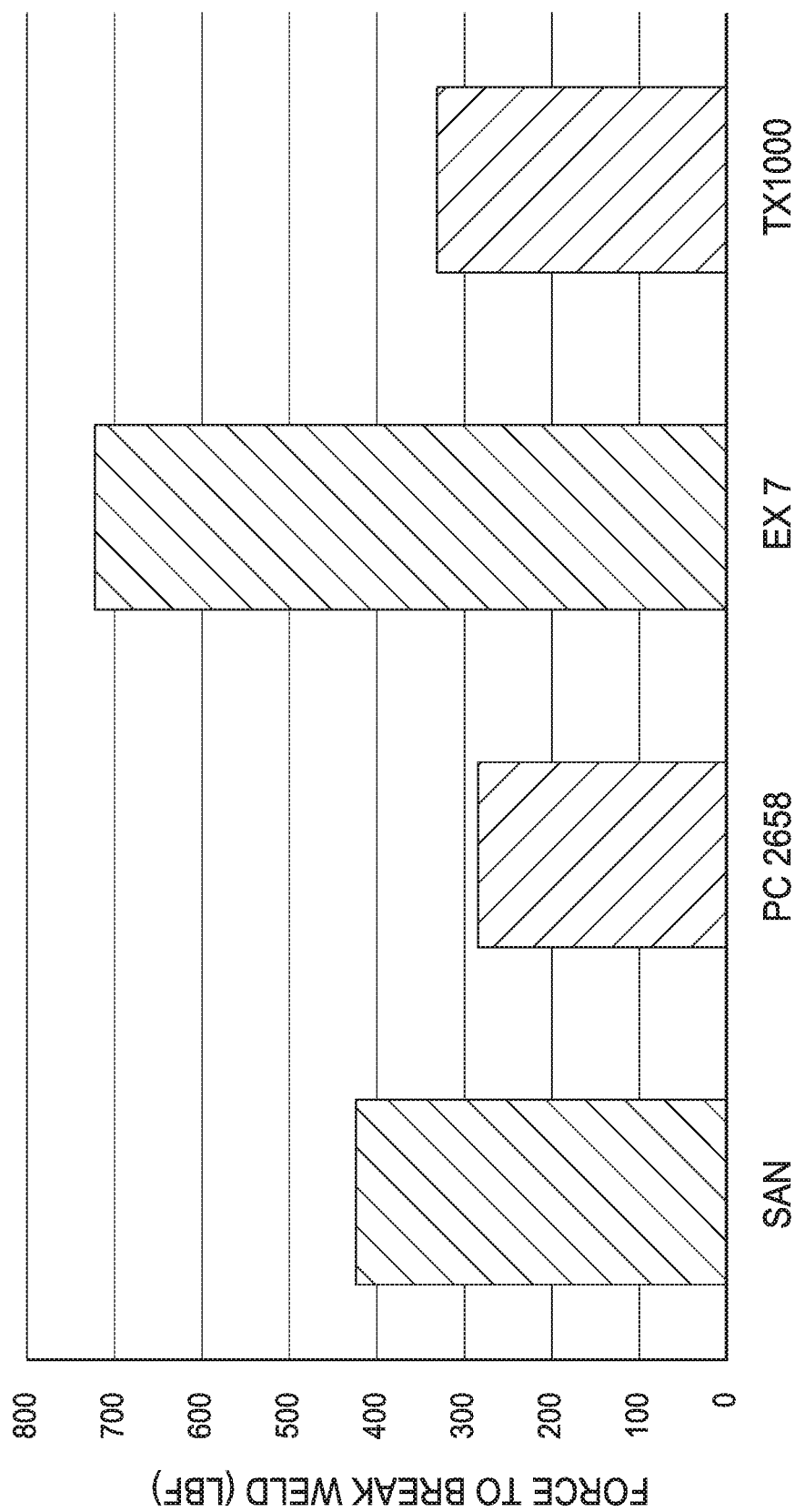
FIG. 3 is a graph depicting the force to break a weld for different polymer compositions in accordance with weld strength testing in Example 12.
Figure 4:
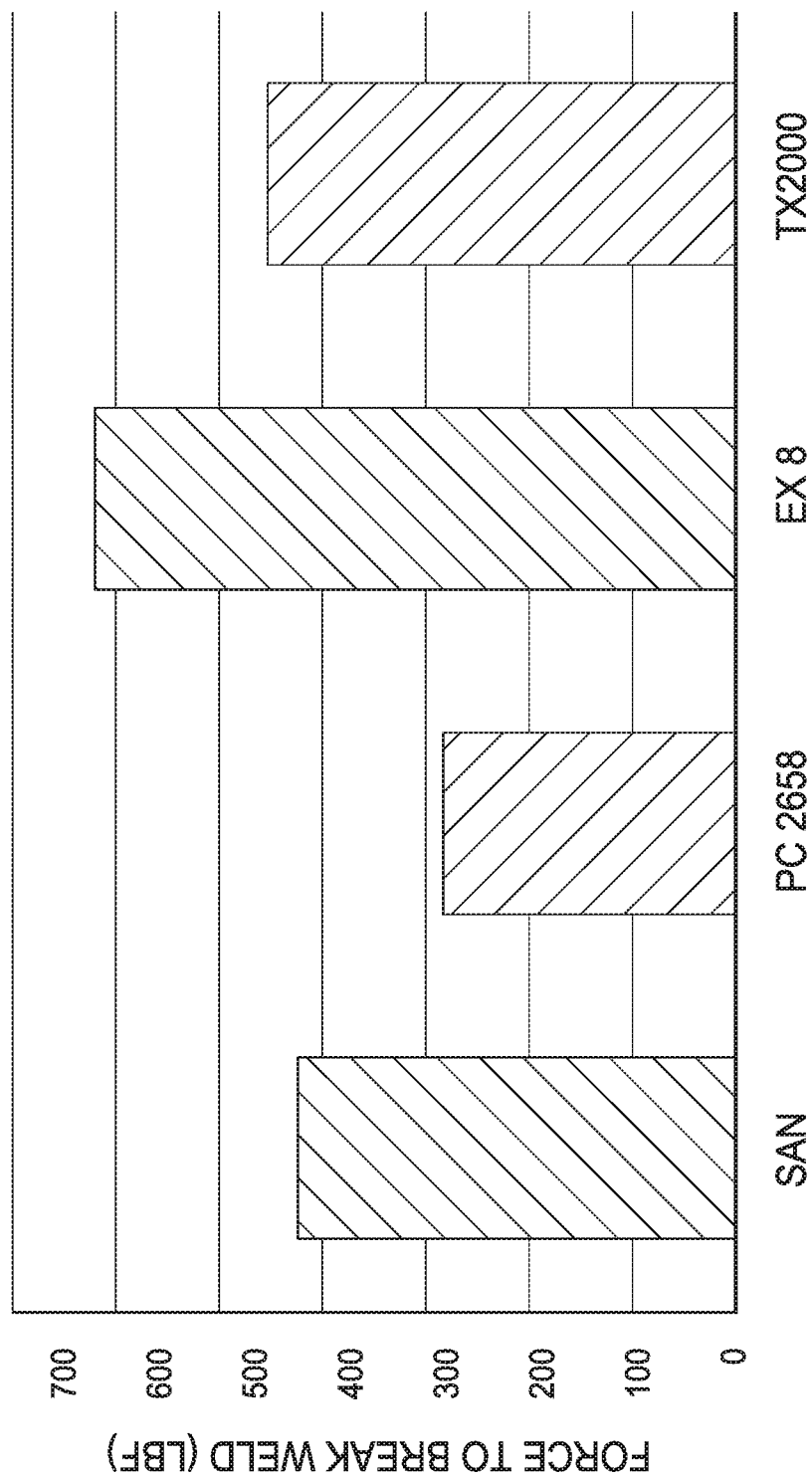
FIG. 4 is a graph depicting the force to break a weld for different polymer compositions in accordance with weld strength testing in Example 12.

A review of FIGS. 3 and 4 reveals that the copolyesters according to Examples 7 and 8 had higher weld strength that the other materials and the Example 7 material had higher weld strength than Example 8 material.

Example 13 (Thermal StabilityTesting)

Thermal stability testing was conducted on the following 4 materials: Example 5b copolyester, Example 5c copolyester, TX1000 and PETG. A Toyo 110 injection molding machine fitted with a 4"×4" single cavity cold runner plaque mold was used to conduct thermal stability studies. Four temperature settings (480° F., 520° F., 560° F., and 600° F.) and four polymer melt residence times (2 min, 3 min, 5 min, and 10 min) were applied to each of the materials tested. Barrel capacity of the Toyo 110 was determined to be ~3 shots of one 4"×4" plaque and cold runner. Polymer melt residence times were adjusted by increasing the cooling time, allowing the chosen melt residence times to be achieved. Screw speed (125 rpm) and back pressure (100 psi) were kept constant for each of the experiments.

Once the set barrel and nozzle temperatures had reached equilibrium, material was purged by increasing back pressure to 500 psi to prevent the screw from recovering and allowing the material to freely flow from the nozzle while turning the screw at 125 rpm. After purge was completed, the back-pressure was decreased to 100 psi and the sled was moved forward until the nozzle coupled with the sprue bushing. The screw was then turned until a complete shot was loaded and the machine was placed in auto cycle. The first 5 shots molded at each condition were discarded. The next 5 shots were retained and numbered in order of molding. After collecting the 5th shot at each molding condition, the sled was reversed and the next shot was injected into a five ounce paper cup and a melt temperature was recorded by inserting a thermocouple into the molten polymer, stirring as quickly as possible and recording the highest temperature observed. The sled was left in the reverse position, cycle time or temperature was then adjusted and the procedure was repeated until all the planned times and temperatures were achieved. The collected parts were submitted for IV and GPC analyses. The results are shown in FIGS. 5-7.

Figure 5:
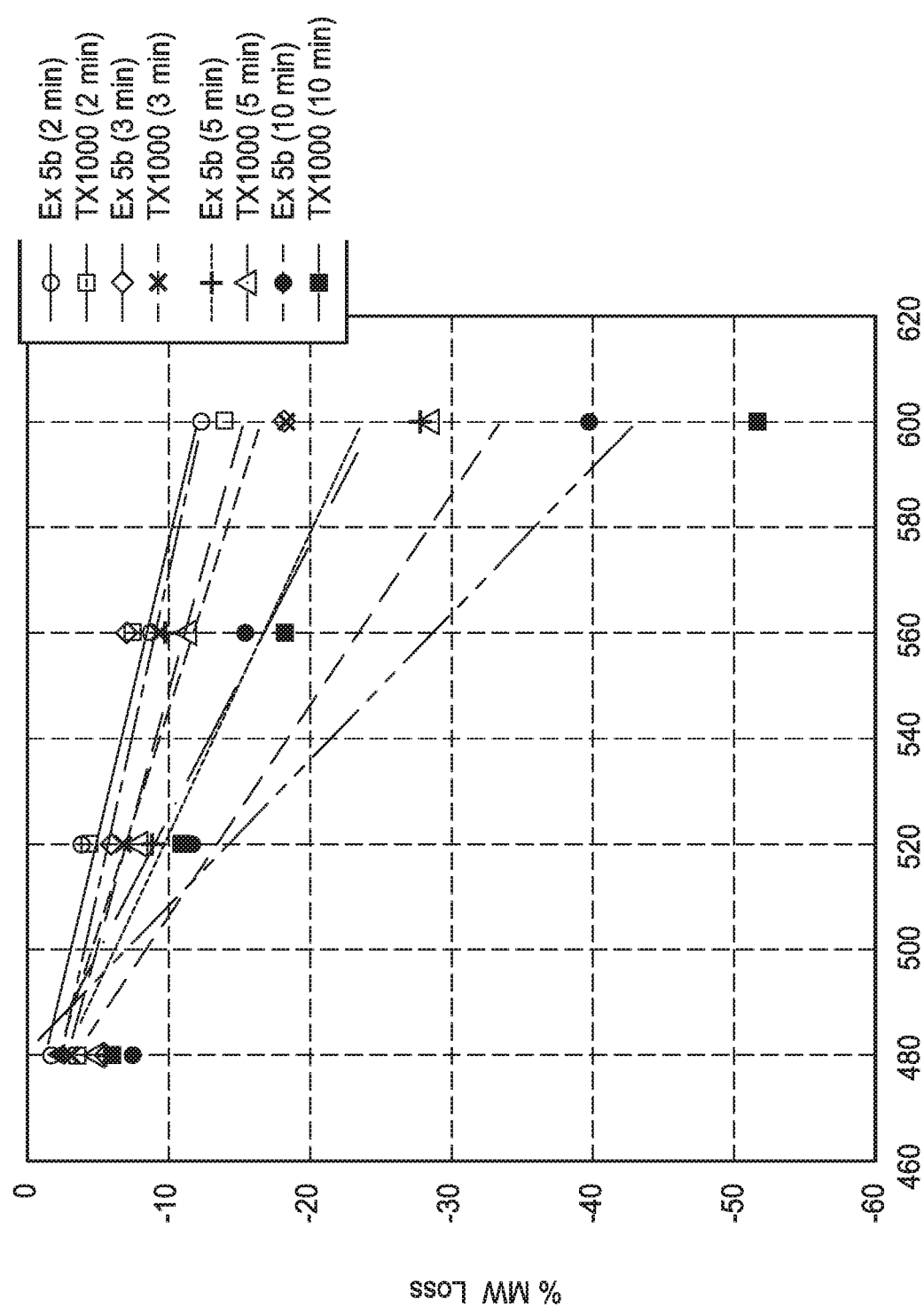
FIG. 5 is a graph depicting molecular weight loss as a function of barrel temperate and residence time for different polymer compositions in accordance with thermal stability testing in Example 13.
Figure 6:
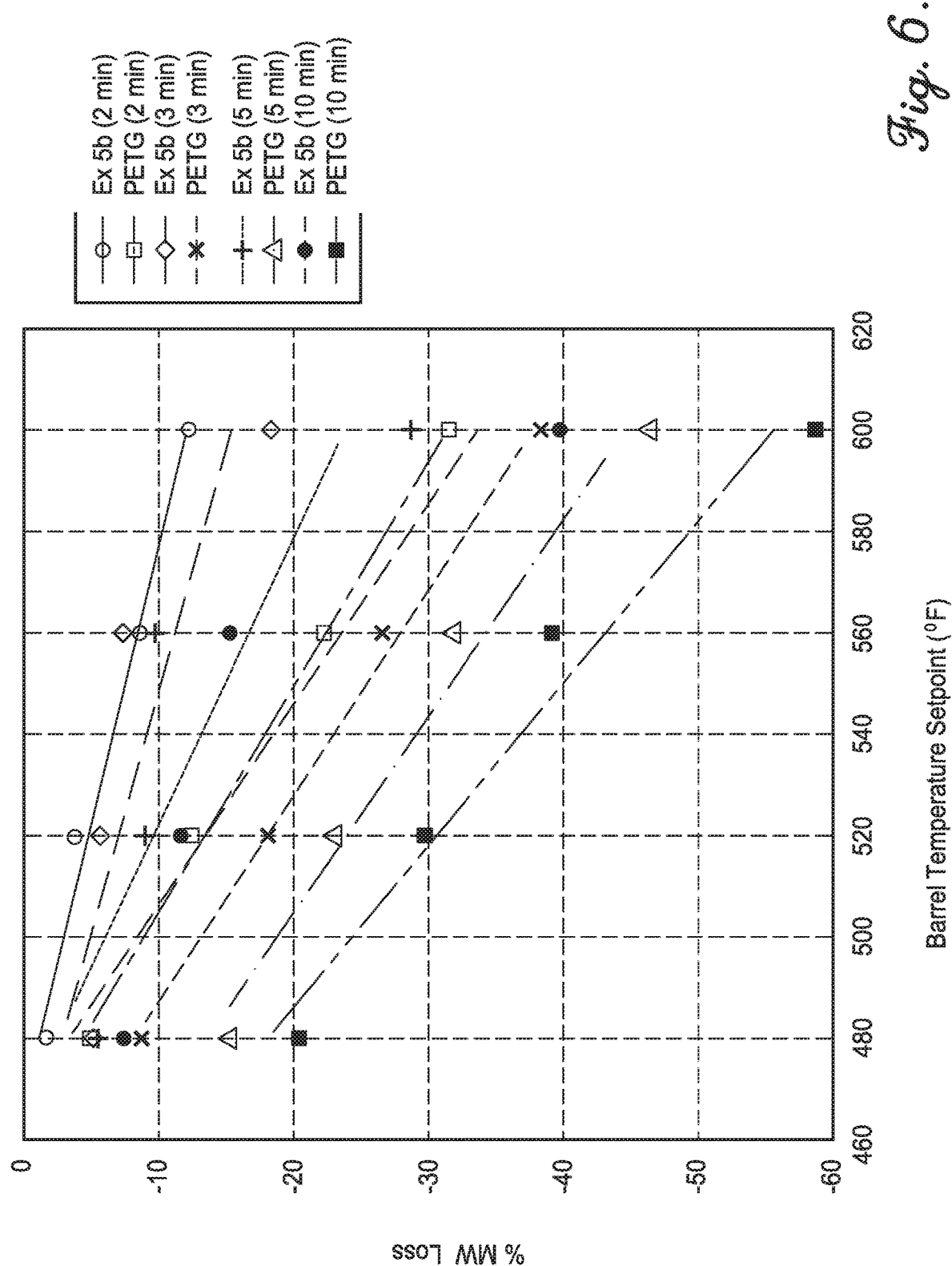
FIG. 6 is a graph depicting molecular weight loss as a function of barrel temperate and residence time for different polymer compositions in accordance with thermal stability testing in Example 13.
Figure 7:
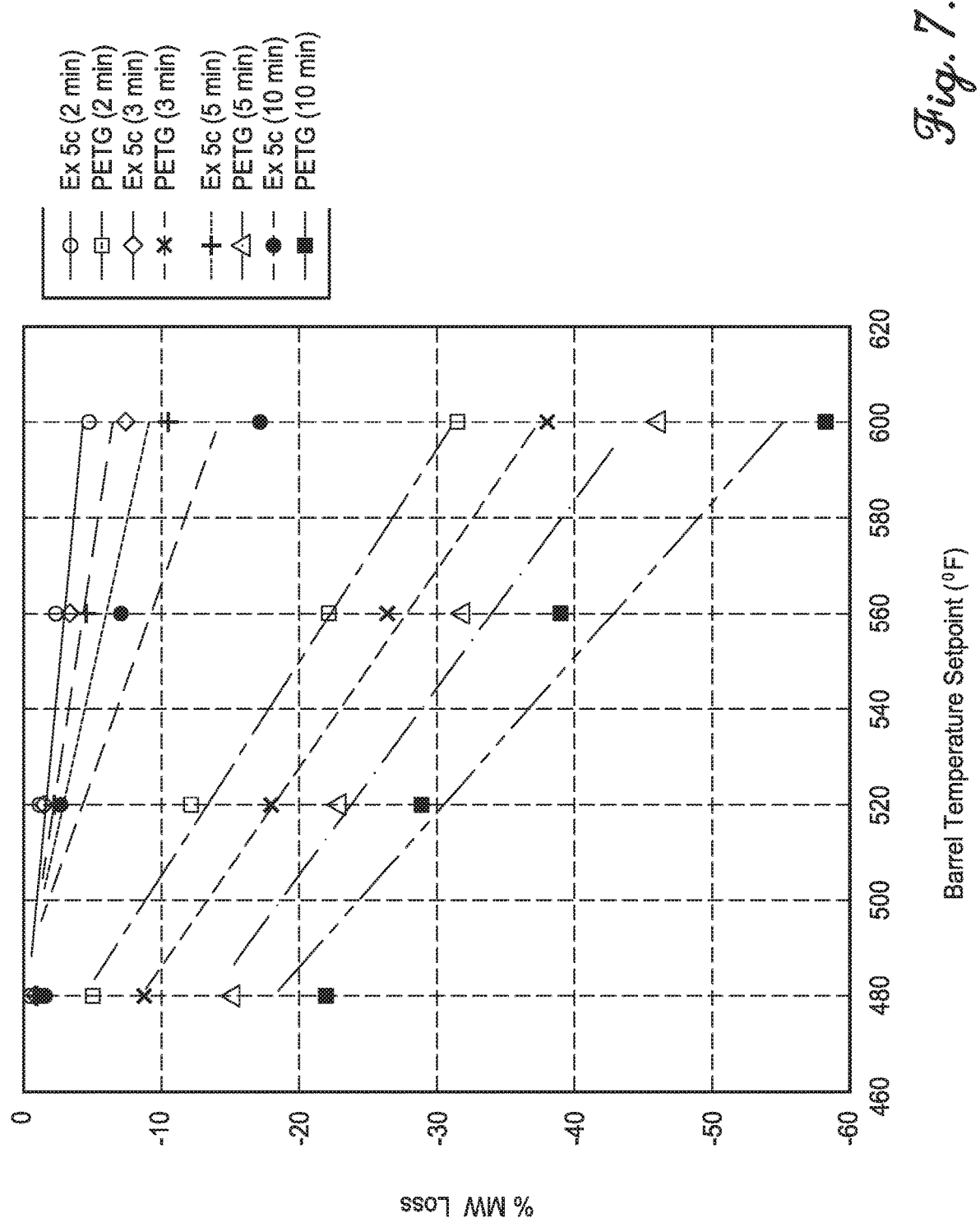
FIG. 7 is a graph depicting molecular weight loss as a function of barrel temperate and residence time for different polymer compositions in accordance with thermal stability testing in Example 13.

A review of FIGS. 5-7 reveals that the Example 5c material had better thermal stability than Example 5b material. Thus, in certain embodiments, the polyester compositions according to invention have less than 5% loss in inherent viscosity after being held at a temperature of 293° C. (560° F.) for 2 minutes. In certain embodiments, the polyester compositions according to invention have less than 5% loss in inherent viscosity after being held at a temperature of 271° C. (520° F.) for 10 minutes.

What is claimed is:
1. A polyester composition comprising at least one polyester which comprises:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component comprising:
(i) about 30 to about 42 mole % 2,2,4,4-tetramethyl-1,3-cyclobutanediol residues; and
(ii) about 58 to about 70 mole % ethylene glycol residues;
(c) a catalyst/stabilizer component which comprises:
(i) titanium atoms in the range of 10-60 ppm based on polymer weight,
(ii) manganese atoms in the range of 10-100 ppm based on polymer weight, and
(iii) phosphorus atoms in the range of 10-200 ppm based on polymer weight; and
wherein the total mole % of the dicarboxylic acid component is 100 mole %, and
wherein the total mole % of the glycol component is 100 mole %;
wherein the inherent viscosity of the polyester is from 0.50 to 0.70 dL/g as determined in 60/40 (wt/wt) phenol/tetrachloroethane at a concentration of 0.25 g/50 ml at 25° C.; and
wherein the L* color values for the polyester is 90 or greater, as determined by the L*a*b* color system measured following ASTM D 6290-98 and ASTM E308-99, using measurements from a Hunter Lab Ultrascan XE Spectrophotometer with the following parameters: (1) D65 illuminant, (2) 10 degree observer, (3) reflectance mode with specular angle included, (4) large area view, (5) 1" port size, and where the measurements were performed on polymer granules ground to pass a 1 mm sieve.

2. The polyester composition of claim 1, wherein the catalyst/stabilizer component comprises tin atoms in the range of 0-20 ppm based on polymer weight.

3. The polyester composition of claim 1, wherein the catalyst/stabilizer component comprises no intentionally added tin atoms.

4. The polyester composition of claim 1, wherein 2,2,4,4-tetramethyl-1,3-cyclobutanediol is present in the amount of about 32 to about 38 mole %.

5. The polyester composition of claim 1, wherein the 2,2,4,4-tetramethyl-1,3-cyclobutanediol residues is a mixture comprising about 55 to about 65 mole % of cis-2,2,4,4-tetramethyl-1,3-cyclobutanediol residues and about 35 to about 45 mole % of trans-2,2,4,4-tetramethyl-1,3-cyclobutanediol residues.

6. The polyester composition of claim 1, wherein the inherent viscosity of the polyester is from 0.54 to 0.65 dL/g.

7. The polyester composition of claim 1, wherein the polyester has a $T_g$ of 102 to 108° C.

8. The polyester composition of claim 1, wherein the weight ratio of P to total catalyst is from 0.15:1 to 1.0:1.

9. The polyester composition of claim 1, wherein the weight ratio of Ti to Mn is from 0.8:1 to 1.9:1.

10. The polyester composition of claim 1, comprising at least one phosphorus compound chosen from at least one of the following: triaryl phosphates, alkyl diaryl phosphates, and mixed alkyl aryl phosphates.

11. The polyester composition of claim 1, wherein the flexural modulus of the polyester is equal to or greater than 2000 MPa (290,000 psi).

12. The polyester composition of claim 1, wherein the polyester has a spiral flow length of greater than 30.5 cm (12 inches) at a temperature of 271° C. (520° F.), measured in accordance with Example 11.

13. The polyester composition of claim 1, wherein the polyester has less than 5% loss in inherent viscosity after being held at a temperature of 293° C. (560° F.) for 2 minutes.

14. The polyester composition of claim 1, wherein the polyester has a notched Izod impact strength of at least about 30 J/m (0.56 ft-lb/in) at 23° C. according to ASTM D256 with a 10-mil notch using a ⅛-inch thick bar.

15. The polyester composition of claim 1, wherein the polyester has two or more of the following properties chosen from: a $T_g$ of from about 100 to about 110° C. as measured by a TA 2100 Thermal Analyst Instrument at a scan rate of 20° C./min; a flexural modulus at 23° C. of from about 2200 MPa (319,000 psi) to about 2600 MPa (377,100 psi) as defined by ASTM D790; a notched Izod impact strength of about 30 J/m (0.56 ft-lb/in) to about 80 J/m (1.50 ft-lb/in) according to ASTM D256 with a 10-mil notch using a ⅛-inch thick bar at 23° C.; and a spiral flow length of greater than 30.5 cm (12 inches) at a temperature of 271° C. (520° F.), measured in accordance with Example 11.

16. The polyester composition of claim 1, wherein the b* color values for the polyesters useful in the invention is from −12 to less than 10 as determined by the L*a*b* color system.

17. A shaped article comprising at least one polyester which comprises:
(a) a dicarboxylic acid component comprising:
   (i) about 90 to about 100 mole % of terephthalic acid residues;
   (ii) about 0 to about 10 mole % of aromatic and/or aliphatic dicarboxylic acid residues having up to 20 carbon atoms; and
(b) a glycol component comprising:
   (i) about 30 to about 42 mole % 2,2,4,4-tetramethyl-1,3-cyclobutanediol residues; and
   (ii) about 58 to about 70 mole % ethylene glycol residues;
(c) a catalyst/stabilizer component which comprises:
   (i) titanium atoms in the range of 10-60 ppm based on polymer weight,
   (ii) manganese atoms in the range of 10-100 ppm based on polymer weight, and
   (iii) phosphorus atoms in the range of 10-200 ppm based on polymer weight; and
wherein the total mole % of the dicarboxylic acid component is 100 mole %, and
wherein the total mole % of the glycol component is 100 mole %;
wherein the inherent viscosity of the polyester is from 0.50 to 0.70 dL/g as determined in 60/40 (wt/wt) phenol/tetrachloroethane at a concentration of 0.25 g/50 ml at 25° C.; and
wherein the L* color values for the polyester is 90 or greater, as determined by the L*a*b* color system measured following ASTM 0 6290-98 and ASTM E308-99, using measurements from a Hunter Lab Ultrascan XE Spectrophotometer with the following parameters: (1) D65 illuminant, (2) 10 degree observer, (3) reflectance mode with specular angle included, (4) large area view, (5) 1" port size, and where the measurements were performed on polymer granules ground to pass a 1 mm sieve.

18. The shaped article of claim 17, wherein the article is a thermoformed film or sheet.

19. The polyester composition of claim 10, wherein the polyester composition comprises at least one additive chosen from colorants, mold release agents, phosphorus compounds other than those described in claim 10, plasticizers, nucleating agents, UV stabilizers, glass fiber, carbon fiber, fillers, impact modifiers, or a mixture thereof.

20. The shaped article of claim 17, wherein the polyester comprises at least one phosphorus compound chosen from at least one of the following:
triaryl phosphates, alkyl diaryl phosphates, and mixed alkyl aryl phosphates; and
wherein the polyester comprises at least one additive chosen from colorants, mold release agents, other phosphorus compounds, plasticizers, nucleating agents, UV stabilizers, glass fiber, carbon fiber, fillers, impact modifiers, or a mixture thereof.

* * * * *